US008825896B2

(12) United States Patent
Reed et al.

(10) Patent No.: US 8,825,896 B2
(45) Date of Patent: Sep. 2, 2014

(54) SCALABLE DISTRIBUTED PARALLEL ACCESS MEMORY SYSTEMS WITH INTERNET ROUTING APPLICATIONS

(75) Inventors: Coke S. Reed, Cranbury, NJ (US); David Murphy, Austin, TX (US)

(73) Assignee: Interactic Holdings, Inc., Austin, TX (US)

( * ) Notice: Subject to any disclaimer, the term of this patent is extended or adjusted under 35 U.S.C. 154(b) by 3663 days.

(21) Appl. No.: 10/866,461

(22) Filed: Jun. 10, 2004

(65) Prior Publication Data

US 2004/0267958 A1    Dec. 30, 2004

Related U.S. Application Data

(60) Provisional application No. 60/479,026, filed on Jun. 16, 2003.

(51) Int. Cl.
*G06F 15/173* (2006.01)
*H04L 12/56* (2006.01)
*H04L 29/08* (2006.01)

(52) U.S. Cl.
CPC .............. *H04L 45/00* (2013.01); *H04L 45/742* (2013.01); *H04L 45/7453* (2013.01); *H04L 67/12* (2013.01); *H04L 49/201* (2013.01); *H04L 49/3009* (2013.01)
USPC .......................................................... 709/238

(58) Field of Classification Search
USPC .......................................................... 706/238
See application file for complete search history.

(56) References Cited

U.S. PATENT DOCUMENTS

| | | | | |
|---|---|---|---|---|
| 5,926,101 A | * | 7/1999 | Dasgupta | 340/825.02 |
| 6,178,163 B1 | * | 1/2001 | Yuan et al. | 370/323 |
| 6,181,698 B1 | * | 1/2001 | Hariguchi | 370/392 |
| 6,181,898 B1 | * | 1/2001 | Sato | 399/103 |
| 6,308,148 B1 | * | 10/2001 | Bruins et al. | 703/27 |
| 6,308,219 B1 | * | 10/2001 | Hughes | 709/238 |
| 6,665,297 B1 | * | 12/2003 | Hariguchi et al. | 370/392 |
| 7,111,071 B1 | * | 9/2006 | Hooper | 709/238 |
| 2001/0040895 A1 | * | 11/2001 | Templin | 370/466 |
| 2001/0056416 A1 | * | 12/2001 | Garcia-Luna-Aceves | 707/2 |
| 2002/0012352 A1 | * | 1/2002 | Hansson et al. | 370/401 |
| 2003/0152266 A1 | * | 8/2003 | Ivers et al. | 382/169 |

OTHER PUBLICATIONS

Sangireddy et al., "High-speed IP routing with binary decision diagrams based hardware address lookup engine", Selected Areas in Communications, IEEE Journal on vol. 21, Issue 4, May 2003 pp. 513-521.*

Baer et al., "Memory hierarchy design for a multiprocessor look-up engine", Parallel Architectures and Compilation Techniques, 2003. PACT 2003. Proceedings. 12th International Conference on Sep. 27-Oct. 1, 2003 pp. 206-216.*

* cited by examiner

*Primary Examiner* — William Goodchild
(74) *Attorney, Agent, or Firm* — Ken J. Koestner

(57) ABSTRACT

In a system, a memory controller separates a memory into multiple banks and enables a plurality of selected banks to be accessed concurrently. The memory controller further comprises a logic that creates a representation of a tree structure in memory and builds routing tables accessed by pointers at nodes in the tree memory structure, and a logic that finds a target memory address based on a received Internet Protocol (IP) address used by the tree memory structure and the routing table.

33 Claims, 23 Drawing Sheets

| NODE | LF | RF | TP | AD |
|---|---|---|---|---|
| 0 | 1 | 1 | 2 | -1 |
| 2 | 1 | 1 | 4 | -1 |
| 4 | 0 | 0 | 0 | 2 |
| 6 | 0 | 0 | 0 | 4 |
| 8 | 1 | 1 | 10 | -1 |
| 10 | 1 | 0 | 20 | -1 |
| 12 | 0 | 1 | 22 | 5 |
| 14 | 0 | 0 | 0 | -1 |
| 16 | 0 | 1 | 18 | -1 |
| 18 | 0 | 0 | 0 | -1 |
| 20 | 0 | 0 | 0 | 8 |
| 22 | 0 | 0 | 0 | -1 |
| 24 | 1 | 0 | 26 | -1 |
| 26 | 0 | 0 | 0 | 10 |

MAINTREE MEMORY

| LF | RF | TP | AD |
|---|---|---|---|
| 1 | 1 | 6 | 1 |
| 1 | 0 | 8 | 3 |
| 1 | 1 | 12 | -1 |
| 0 | 0 | 0 | -1 |
| 0 | 0 | 0 | 7 |
| 0 | 1 | 14 | 6 |
| 1 | 1 | 16 | -1 |
| 0 | 0 | 0 | 9 |
| 0 | 0 | 0 | 11 |
| 0 | 0 | 0 | -1 |
| 1 | 0 | 24 | -1 |
| 0 | 0 | 0 | -1 |
| 0 | 0 | 0 | -1 |

| Ad | OP | Hops | Val |
|---|---|---|---|
| 1 | 5 | 6 | 94-.02 |
| 2 | 4 | 5 | 95-.04 |
| 3 | 1 | 8 | 92-.04 |
| 4 | 4 | 7 | 93-.04 |
| 5 | 3 | 4 | 96-.06 |
| 6 | 2 | 5 | 95-.06 |
| 7 | 0 | 4 | 96-.08 |
| 8 | 5 | 5 | 95-.10 |
| 9 | 7 | 3 | 97-.10 |
| 10 | 6 | 2 | 98-.12 |
| 11 | 5 | 2 | 98-.12 |

ROUTING TABLE

MAINTREE MEMORY

| NODE | LF | RF | TP | AD |
|------|----|----|----|----|
| 0 | 1 | 1 | 2 | -1 |
| 2 | 1 | 1 | 4 | -1 |
| 4 | 0 | 0 | 0 | 2 |
| 6 | 0 | 0 | 0 | 4 |
| 8 | 1 | 1 | 10 | -1 |
| 10 | 1 | 0 | 20 | 5 |
| 12 | 0 | 1 | 22 | -1 |
| 14 | 0 | 0 | 0 | -1 |
| 16 | 0 | 0 | 18 | 8 |
| 18 | 0 | 0 | 0 | -1 |
| 20 | 0 | 0 | 0 | -1 |
| 22 | 0 | 0 | 0 | -1 |
| 24 | 1 | 0 | 26 | 10 |
| 26 | 0 | 0 | 0 | -1 |

(Second table)

| LF | RF | TP | AD |
|----|----|----|----|
| 1 | 1 | 6 | 1 |
| 1 | 0 | 8 | 3 |
| 1 | 1 | 12 | -1 |
| 0 | 0 | 0 | -1 |
| 0 | 0 | 0 | 7 |
| 1 | 1 | 14 | 6 |
| 1 | 0 | 16 | -1 |
| 0 | 0 | 0 | 9 |
| 0 | 0 | 0 | 11 |
| 1 | 0 | 24 | -1 |
| 0 | 0 | 0 | -1 |
| 0 | 0 | 0 | -1 |

ROUTING TABLE

| Ad | OP | Hops | Val |
|----|----|------|-----|
| 1 | 5 | 6 | 94-.02 |
| 2 | 4 | 5 | 95-.04 |
| 3 | 1 | 8 | 92-.04 |
| 4 | 4 | 7 | 93-.04 |
| 5 | 3 | 4 | 96-.06 |
| 6 | 2 | 5 | 95-.06 |
| 7 | 0 | 4 | 96-.08 |
| 8 | 5 | 5 | 95-.10 |
| 9 | 7 | 3 | 97-.10 |
| 10 | 6 | 2 | 98-.12 |
| 11 | 5 | 2 | 98-.12 |

FIG. 1B

| NODE | LF | RF | TP | Addr | NODE | LF | RF | TP | Addr |
|------|----|----|----|------|------|----|----|----|------|
| 0 | 1 | 1 | 2 | -1 | 3 | 1 | 1 | 6 | -1 |
| 2 | 1 | 1 | 4 | -1 | 5 | 1 | 0 | 8 | 3 |
| 4 | 0 | 0 | 0 | 2 | 7 | 1 | 1 | 12 | -1 |
| 6 | 0 | 0 | 0 | 4 | 9 | 0 | 0 | 0 | -1 |
| 8 | 1 | 1 | 10 | -1 | 11 | 0 | 0 | 0 | 7 |
| 10 | 1 | 0 | 20 | -1 | 13 | 0 | 1 | 14 | 6 |
| 12 | 0 | 1 | 22 | 5 | 15 | 1 | 1 | 16 | -1 |
| 14 | 0 | 0 | 0 | -1 | 17 | 0 | 0 | 0 | 9 |
| 16 | 0 | 1 | 18 | -1 | 19 | 0 | 0 | 0 | 11 |
| 18 | 0 | 0 | 0 | 8 | 21 | 0 | 0 | 0 | -1 |
| 20 | 0 | 0 | 0 | -1 | 23 | 1 | 0 | 24 | -1 |
| 22 | 0 | 0 | 0 | -1 | 25 | 0 | 0 | 0 | -1 |
| 24 | 1 | 0 | 26 | -1 | 27 | 0 | 0 | 0 | -1 |
| 26 | 0 | 0 | 0 | 10 | | | | | |

MAIN-TREE MEMORY

FIG. 1C

| CALLOUT NUMBER | NODE LABEL | BINARY SEQUENCE ROOT |
|---|---|---|
| 302 | 0 | |
| 314 | 2 | 0 |
| 306 | 4 | 0,0 |
| 316 | 5 | 0,1 |
| 308 | 6 | 0,1,0 |
| 310 | 7 | 0,1,1 |
| 312 | 3 | 1 |

— 410

| NODE | LF | RF | TP | Ad |
|---|---|---|---|---|
| 0 | 1 | 1 | 2 | -1 |
| 2 | 1 | 1 | 4 | -1 |
| 4 | 0 | 0 | 0 | 1 |
| 6 | 0 | 0 | 0 | 2 |

| LF | RF | TP | Ad |
|---|---|---|---|
| 0 | 0 | 0 | 4 |
| 1 | 1 | 6 | -1 |
| 0 | 0 | 0 | 3 |

K-TREE MEMORY

| Ad | Op | Hops | Val |
|---|---|---|---|
| 1 | 0 | 4 | 95.82 |
| 2 | 7 | 3 | 96.80 |
| 3 | 6 | 2 | 97.80 |
| 4 | 4 | 5 | 94.84 |

ROUTING TABLE

FIG. 4A

| NODE | LF | RF | TP | AD |
|------|----|----|----|----|
| 0 | 1 | 1 | 2 | -1 |
| 2 | 1 | 1 | 4 | -1 |
| 4 | 1 | 0 | 6 | 1 |
| 6 | 1 | 1 | 8 | -1 |
| 8 | 1 | 1 | 22 | -1 |
| 10 | 0 | 0 | 0 | 3 |
| 12 | 0 | 1 | 14 | -1 |
| 14 | 0 | 0 | 0 | 1 |
| 16 | 1 | 0 | 18 | -1 |
| 18 | 1 | 1 | 20 | -1 |
| 20 | 0 | 0 | 0 | 5 |
| 22 | 0 | 1 | 26 | 7 |
| 24 | 0 | 0 | 0 | -1 |
| 26 | 0 | 0 | 0 | 9 |
| 28 | 0 | 0 | 0 | -1 |
| 30 | 0 | 0 | 0 | -1 |
| 32 | 0 | 1 | 34 | -1 |
| 34 | 0 | 0 | 0 | -1 |

| LF | RF | TP | AD |
|----|----|----|----|
| 1 | 1 | 0 | -1 |
| 1 | 0 | 10 | -1 |
| 0 | 0 | 24 | -1 |
| 0 | 0 | 0 | 2 |
| 1 | 1 | 12 | -1 |
| 1 | 0 | 30 | -1 |
| 0 | 0 | 16 | 4 |
| 0 | 0 | 0 | -1 |
| 0 | 1 | 0 | 6 |
| 1 | 0 | 28 | -1 |
| 0 | 0 | 0 | 8 |
| 0 | 0 | 0 | -1 |
| 0 | 0 | 0 | 10 |
| 1 | 1 | 32 | -1 |
| 0 | 0 | 0 | 11 |
| 0 | 0 | 0 | 12 |

S-TREE MEMORY

| Ad | OP | Hops | Val |
|----|----|------|-----|
| 1 | 5 | 6 | 93.88 |
| 2 | 4 | 5 | 94.84 |
| 3 | 1 | 8 | 91.88 |
| 4 | 4 | 7 | 92.84 |
| 5 | 3 | 4 | 95.78 |
| 6 | 2 | 5 | 94.78 |
| 7 | 0 | 4 | 95.82 |
| 8 | 5 | 5 | 94.84 |
| 9 | 7 | 3 | 96.80 |
| 10 | 6 | 2 | 97.80 |
| 11 | 5 | 2 | 97.82 |
| 12 | 7 | 1 | 98.80 |

ROUTING TABLE

SCALABLE DISTRIBUTED PARALLEL ACCESS MEMORY SYSTEMS WITH INTERNET ROUTING APPLICATIONS

RELATED PATENT AND PATENT APPLICATIONS

The disclosed system and operating method are related to subject matter disclosed in the following patents and patent applications that are incorporated by reference herein in their entirety:
1. U.S. Pat. No. 5,996,020 entitled, "A Multiple Level Minimum Logic Network", naming Coke S. Reed as inventor;
2. U.S. Pat. No. 6,289,021 entitled, "A Scaleable Low Latency Switch for Usage in an Interconnect Structure", naming John Hesse as inventor;
3. U.S. patent application Ser. No. 09/693,359 entitled, "Multiple Path Wormhole Interconnect", naming John Hesse as inventor;
4. U.S. patent application Ser. No. 09/693,357 entitled, "Scalable Wormhole-Routing Concentrator", naming John Hesse and Coke Reed as inventors;
5. U.S. patent application Ser. No. 09/693,603 entitled, "Scaleable Interconnect Structure for Parallel Computing and Parallel Memory Access", naming John Hesse and Coke Reed as inventors;
6. U.S. patent application Ser. No. 09/693,358 entitled, "Scalable Interconnect Structure Utilizing Quality-Of-Service Handling", naming Coke Reed and John Hesse as inventors;
7. U.S. patent application Ser. No. 09/692,073 entitled, "Scalable Method and Apparatus for Increasing Throughput in Multiple Level Minimum Logic Networks Using a Plurality of Control Lines", naming Coke Reed and John Hesse as inventors;
8. U.S. patent application Ser. No. 09/919,462 entitled, "Means and Apparatus for a Scaleable Congestion Free Switching System with Intelligent Control", naming John Hesse and Coke Reed as inventors;
9. U.S. patent application Ser. No. 10/123,382 entitled, "A Controlled Shared Memory Smart Switch System", naming Coke S. Reed and David Murphy as inventors;
10. U.S. patent application Ser. No. 10/289,902 entitled, "Means and Apparatus for a Scaleable Congestion Free Switching System with Intelligent Control II", naming Coke Reed and David Murphy as inventors;
11. Means and Apparatus for a Scaleable Network for Use in Computing and Data Storage Management, naming Coke Reed and David Murphy as inventors;
12. U.S. patent application Ser. No. 12/272,274 entitled, "Means and Apparatus for a Scaleable Congestion Free Switching System with Intelligent Control III", naming John Hesse, David Murphy and Coke Reed as inventors.

RELATED PUBLICATIONS

1. Anthony J. McAuley and Paul Francis, "Fast Routing Table Lookup Using CAMs" Proc. IEEE INFOCOM 1993, vol. 3 pp. 1382-1391, San Francisco, USA.
2. Merit Networks, Inc.

THE RELATED PATENTS AND PUBLICATIONS

The incorporated reference by Merit Networks studies the composition of the routing for a router. This information is mentioned in the section entitled "A Parameterized Example".

BACKGROUND OF THE INVENTION

In a wide variety of computing and communication systems information is stored in memory. A standard random access memory includes many memory address locations, some of which contain information. With conventional indexing schemes the data content of a memory cell is used with a hash or index to produce the address location of the data. The address has no real or direct relationship with the information contained in the data. In some applications, memory size is too large to practically address and access data using the conventional schemes. With large memories, an alternative technique for storing and accessing data is desired. Some of suitable alternative methods are termed content addressable memories or CAMs.

One application of content addressable memory is the storage of output ports based on Internet Protocol addresses. When a message arrives at a line card of an Internet Protocol router, the Internet Protocol address is examined. The message's target output port is based on the IP address. The current standard address is a binary sequence of the form $\{b_0, b_1, \ldots, b_{Nmax-1}\}$, with $Nmax=2^{32}$, so that the total number of Internet Protocol version 4 (IPv4) addresses is currently $2^{32}$. The number in base 10 is approximately 4 billion. A conventional memory with an address size of this magnitude is impractical for efficient access. Accordingly, some type of content addressable memory is generally used. Plans are in place to greatly expand the number of Internet Protocol addresses. The proposed Internet Protocol address standard version 6 (IPv6) sets Nmax to $2^{128}$, an increase to $2^{128}$ Internet Protocol addresses. The address size increase greatly elevates the storage and accessing complexity.

The number of entries in a target output lookup system grows with the number of output ports. The number of copies of the memory grows with the number of input ports. Therefore, for systems with a large number of ports, an answer to the problem of output port lookup based on Internet Protocol address is desired.

Various techniques have been devised to address storage complexity. For example, "Routing Lookups in Hardware at Memory Access Speeds", by Pankaj Gupta, Steven Lin and Nick McKeown. IEEE INFOCOM April 1998, vol. 3 pp. 1240-1247, San Francisco, USA, describes a data system that can be used effectively in looking up an Internet Protocol address (IPv4) provided that one has a particular data structure available. Unfortunately, the reference does not have a complete solution to the efficient construction and maintenance of the data structures.

SUMMARY OF THE INVENTION

In accordance with an embodiment of a system, a memory controller separates a memory into multiple banks and enables a plurality of selected banks to be accessed concurrently. The memory controller further comprises a logic that creates a representation of a tree structure in memory and builds routing tables accessed by pointers at nodes in the tree memory structure, and a logic that finds a target memory address based on a received Internet Protocol (IP) address used by the tree memory structure and the routing table.

BRIEF DESCRIPTION OF THE DRAWINGS

Embodiments of the illustrative systems and associated technique relating to both structure and method of operation, may best be understood by referring to the following description and accompanying drawings.

FIG. 1B is a tabular diagram that illustrates the main tree memory for storing the information in the tree and a routing table identifying output ports and desirability of the output ports based on the number of hops to the destination.

FIG. 1C is an alternative illustration showing the main tree memory that stores the information in the tree with labels of the odd numbered nodes shown in addition to the even numbered nodes.

FIG. 3A shows a first step in building an S-tree based on the application of a single route packet.

FIG. 3B illustrates the continued building of the S-tree based on the application of two additional route packets.

FIG. 3C illustrates the continued construction of the S-tree based on the application of an additional 9 route packets.

FIG. 3D illustrates a sub-tree tour following a left-hand-rule tour path.

FIG. 3E illustrates the storage of four K-trees in two K-tree memory banks.

FIG. 3F and FIG. 3G illustrate partial tours to update the K-tree directory and the Low Banks.

FIG. 4A is a table illustrating the association of callout numbers, node labels, and binary sequences with a K-tree having root 302, as depicted in FIG. 3D. FIG. 4A also illustrates the K-tree memory and routing tables associated with the same K-tree of FIG. 3D.

FIG. 4B is a table that illustrates the S-tree memory and associated routing table corresponding to the S-tree illustrated in FIG. 3C.

DETAILED DESCRIPTION

Figure 1A:
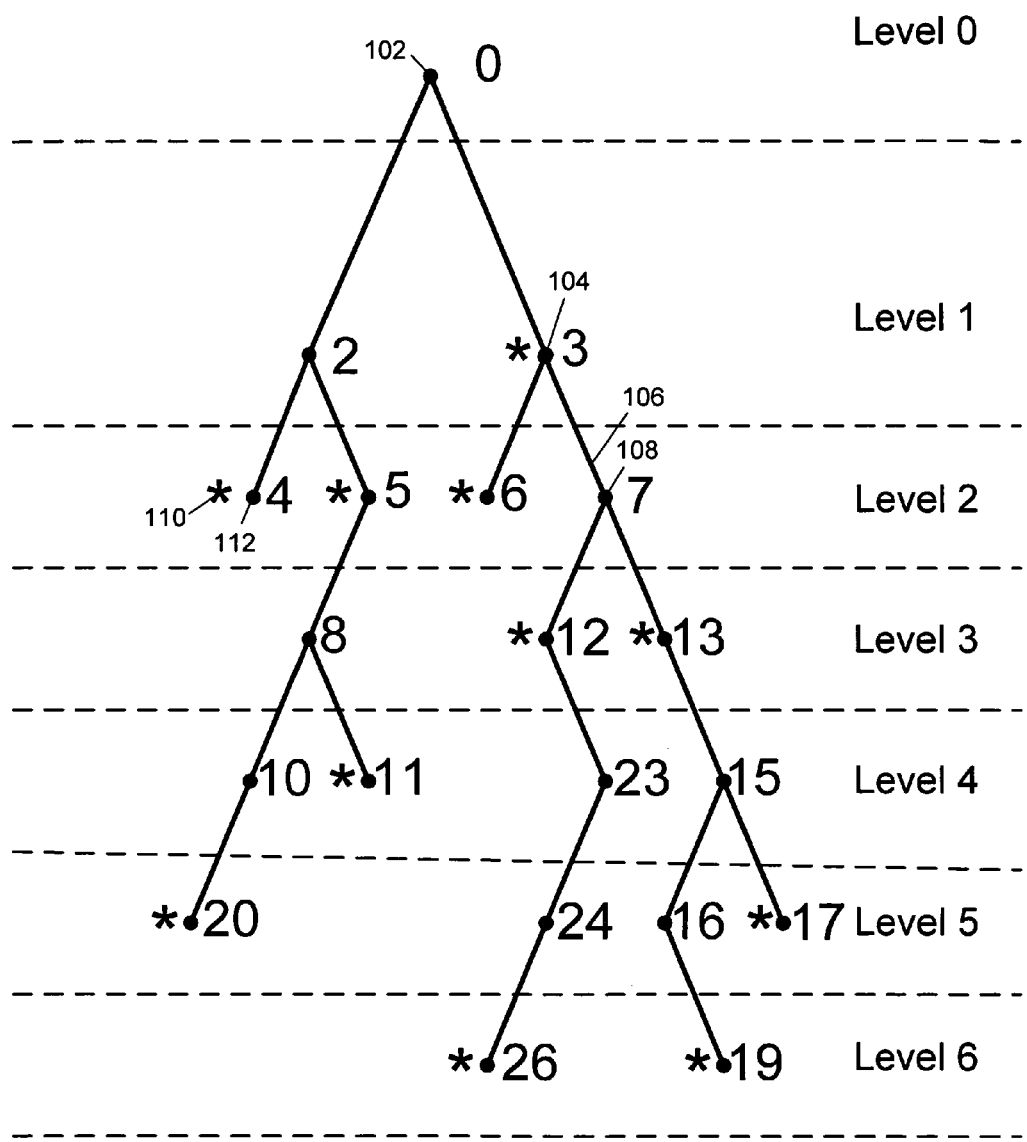
FIG. 1A is a schematic diagram showing a main data storage tree illustrating named nodes and edges.

What are desired are structures and operations for loading, updating and accessing data structures.

Accordingly to some embodiments, a central memory is divided into banks in a manner that enables access to a plurality of memory banks. In one embodiment, each of the banks is structured as a part of a large binary tree that is configured to accommodate data in the form that the data is received. Packets, the structure of which are the basis for a routing table, and an entire tree of pointers into the routing table are specified before defining various data banks and structures used by the input port devices to access the banks.

Route Packets

Entries in the tree are received from downstream routers. In an illustrative embodiment, the downstream packets are called route packets. Route packets have the form (Seq, Sig, Opt, RV, Opc). For a route packet RP:

$$RP=(Seq, Sig, Opt, RV, Opc).$$

The Seq field contains a binary sequence. For Internet Protocol standard IPv4, the length of Seq is 32. For Internet Protocol standard IPv6, the length of Seq is 48. The Sig field contains an integer from 1 to 32 for IPv4 and from 1 to 48 for IPv6. Arrival of a route packet (Seq, Sig, Opt, RV, Opc) at input port N of a router indicates that a message with leading Sig bits $\{b_0, b_1, \ldots, b_{Sig-1}\}$ of the Internet Protocol address equal to the leading Sig bits of Seq can reach the target IP address through output port Opt. The RV field identifies a measure of worth of the route packet output port.

For example, two route packets are RP1 and RP2 with RP1 equal to (Seq1, Sig1, Opt1, RV1, Opc1) and RP2 equal to (Seq2, Sig2, Opt2, RV2, Opc2). In an example, Sig1 is equal to Sig2 and the first Sig1 bits of Seq1, denoted by SQ, are equal to the first Sig2 bits of Seq2, also denoted by SQ since the two sequences are the same. A packet P has an Internet Protocol address IPa such that the first (Sig1=Sig2) bits of IPa also equal SQ. If RV1 is greater than RV2, the packet P is desired to be sent through output port Opt1. Similarly, if RV2 is greater than RV1, packet P is desired to be sent through output port Opt2. If RV1 is equal to RV2, then the choice of Opt1 or Opt2 can be arbitrary. A Val field based on RV can be defined in a number of ways. For a goal of selecting an output port that reduces or minimizes the number of hops to the final destination, then an acceptable Val function gives a larger Val for a fewer number of hops. An example of an acceptable Val function is Val equal to [C1—(the number of hops to the destination)] in which C1 is larger than the limit or bound on the number of hops to destination reported by a route packet. In one embodiment, the Val function is usefully defined so that two route packets with unequal Sig values also produce unequal magnitudes for Val. An example of such a useful definition for Val, a definition that is used hereinafter in the discussion of other embodiments, is $$Val=[C_1-RV-(Sig/C_2)],$$

where RV is the number of hops to the destination. In the equation, $C_2$ is a constant such that $C_2$ is greater than the maximum number of address bits in an internet protocol address. The function satisfies the two criteria that 1) fewer hops correspond to higher Val and 2) route packets with different Sig numbers generate different Val numbers. A route packet received in the form (Seq, Sig, Opt, Hops, Opc) can be converted to the form (Seq, Sig, Opt, Val, Opc) for use by the router so that a route packet may also be written as a functional term, as follows:

$$RP=(Seq, Sig, Opt, Val, Opc),$$

where the use of Val to replace RV assumes that RV has been converted to the appropriate Val as appropriate for a particular embodiment. The field Opc contains an operation code indicating how to handle the route packet data. Operation code functions include, but are not limited to: 1) examination for possible addition to the routing tables as is discussed immediately hereinafter; 2) removing an entry from the routing table data base; and 3) modifying the Val field in a routing table entry. In a simple embodiment, Opc is set to 0 to remove the route packet data from the database, and Opc is set to 1 to add the route packet data to the database.

Routing Table Memory Overview

The routing table memory, otherwise called the routing table, indirectly associates a partial Internet address with a list of ordered pairs with each of the pairs having an output port for the first entry of the pair and a value for the second member of the pair. The notation for the pair can be (Opt, Val). The partial Internet address is a binary sequence having a length of at least one but not longer than the total length of an Internet Protocol address, for example 32 bits for IPv4. The Val field provides a measure of worth of the output port Opt, with a larger value of Val corresponding to a larger merit of worth. In one embodiment, the output port of choice is that which transfers a message to the final destination using the minimal number of hops. In other embodiments, Val is the sum of the weights associated with hops in route to the target. In more complicated conditions, the Val field may indicate that one output port is more desirable for messages with a certain priority, while a different output port is desirable for messages with another priority. Accordingly, a message of a defined priority uses the table to find the best output port to use based on the partial Internet Protocol address and the message priority. A routing table memory entry RTE at address z is written:

$$RTE(z) = \{[Opt_1(z), Val_1(z)], [Opt_2(z), Val_2(z)], \ldots, [Opt_X(z), Val_X(z)]\}$$

For illustrative purposes, $[Opt^*(z), Val^*(z)]$ denotes a member of the sequence RTE(z) with the largest Val(z) entry. In the some embodiments, $[Opt^*(z), Val^*(z)]$ is $[Opt_1(z), Val_1(z)]$. In a slight variant, RTE(z) has the form $\{[Opt^*(z), Val^*(z)], pointer\}$, where the pointer points to $\{[Opt_2(z), Val_2(z)], [Opt_3(z), Val_3(z)], \ldots, [Opt_X(z), Val(z)_X]\}$. For some embodiments, particularly embodiments in which updating does not occur, the length of the sequence is always one. With a sequence length of one, the routing table memory entry RTE(z) has the form:

$$\text{Alternate } RTE(z) = [Opt^*(z), Val^*(z)].$$

The address z of the memory item RTE(z) is an integer pointer which is stored in a tree structure described immediately hereinafter. In one embodiment, a plurality of [Opt(z), Val(z)] pairs is listed in case one of the pairs is to be deleted when the list of pairs is updated. In other embodiments, only one pair is listed. One embodiment with only one pair listed uses two tree structures, a first structure that is currently in use to assign output ports to packets and a second structure that is in the process of being updated. Items in the routing table are accessed using a tree of pointers. The illustrative systems and methods can store, update, and use the tree structures to lookup target output ports.

Main Tree Structure

The illustrative method can efficiently determine output port information based on packet header information. The method utilizes a plurality of data structures. The data structure content changes with time based in part on the arrival of route packets and based in part on the arrival of data packets. The data structures are configured and altered using a system of sub-trees of the main tree. Individual nodes of the main tree comprise a data item. The nodes are accessed indirectly by chaining through the tree. The nodes point to data in the routing table. The tree is limited to a minimum size by enforcing a rule that all terminal nodes point to an entry in the routing table. Therefore, each node of the tree is associated with a binary sequence of length less than or equal to Nmax, but not every such binary sequence is associated with a node of the tree. Storage of all binary sequences of length less than or equal to Nmax with Nmax equal to 32 is impractical. Extension of storage to accommodate Nmax of 48 sequences is even less practical. Thus, the nodes of the tree are not referenced directly by associated binary sequences but rather indirectly by pointers.

In some embodiments, the main tree is not stored as a unit. For a predetermined integer parameter S, sub-trees with roots on level S are created, perhaps in parallel, and stored in a manner described hereinafter. A portion of the nodes of the binary tree have associated pointers that point to items in the routing table. Therefore, the routing table can be accessed via a tree structure.

The entire tree can be held in one contiguous portion of memory. The process of looking up a packet output port based on the Internet Protocol address $\{b_0, b_1, \ldots, b_{Nmax-1}\}$ defines a simple case in which Val is not dependent upon message packet priority. The target output can be located via searching the tree by moving from the root node $A_0$ located on level 0 along an edge to a level 1 node $A_1$ associated with the one long binary sequence $\{b_0\}$, then moving along an edge to a level 2 node $A_2$ associated with the two long binary sequence $\{b_0, b_1\}$, then moving along yet another edge to a level 3 node $A_3$ associated with the three long binary sequence $\{b_0, b_1, b_2\}$, and so forth, until the node associated with the Nmax long binary sequence $\{b_0, b_1, \ldots, b_{Nmax-1}\}$ is reached or until a stop flag is reached indicating the end of the tree down that sequence.

For each node Z of the tree, a unique binary sequence B equal to $\{b_0, b_1, \ldots, b_n\}$ exists such that Z is associated with B. Z is "defined" by B and B is said to be the "defining sequence" of Z. The nature of the main tree is such that binary sequences $\{b_0, b_1, \ldots, b_n\}$ exist with n<Nmax, for which the tree has no corresponding node. Each node Z of the tree has exactly one node sequence $X_0, X_1, X_2, \ldots, X_n$ such that: 1) each node $X_j$ of the sequence is on level j; 2) each adjacent pair of nodes $X_j$ and $X_{j+1}$ of the sequence are connected by an edge; and 3) Z is equal to $X_n$. The sequence $X_0, X_1, X_2, \ldots X_n$ is referred to as "the bridge to Z". As the tree is traversed along the bridge node sequence $X_0, X_1, X_2, \ldots$, a temporary storage location CB, called a "clipboard", is updated. At the root node $X_0$, the clipboard entry $Clip(X_0) = \{CO(X_0), CV(X_0)\}$ is initialized to (−1, −1) unless an RTE(s) is associated with $X_0$ via a pointer s, in which case $Clip(X_0)$ is set to $[Opt^*(s), Val^*(s)]$. Movement from a node $X_{n-1}$ on level n−1 to a node $X_n$ on level n causes the clipboard entry $Clip(X_n)$ to be equal to $Clip(X_{n-1})$ unless: 1) an RTE(t) equal to $[Opt^*(t), Val^*(t)]$ is associated with $X_n$ and 2) $Val^*(t)$ is greater than or equal to $CV(X_{n-1})$. When the two conditions are satisfied, $Clip(X_n)$ is set to $[Opt^*(t), Val^*(t)]$. In this manner, for each node Z of the tree, the optimal output port based on the bridge to Z is defined by the function Clip as follows:

$$Clip(Z) = \{CO(Z), CV(Z)\}.$$

In many circumstances that use backtracking, a history of the contents of the clipboard along the bridge to $X_N$ can be conveniently maintained at each step N. The history is captured in a sequence $Clip(X_0), Clip(X_1), Clip(X_2), \ldots, CliP(X_N)$.

Each node of the tree has a unique associated integer. The integer is defined as the "name" or "label" of the node. A node with label X is referred to as node X. The node label is also an address in a Main Tree Memory that stores data associated with the tree. The content of the Tree Memory at address location A comprises a four-long sequence of integers. For the node A, a tree data item at A, denoted by TD(A), has the form:

$$TD(A) = \{LF(A), RF(A), TP(A), Ad(A)\}.$$

The integer LF(A) is a flag (Left Flag at A) that indicates whether a node exists in the tree that is reached by branching to the left at node A. If LF(A) is equal to 0, then no such node exists. If LF(A) is equal to 1, then a node B is an immediate successor of node A and can be reached by branching left at node A. The edge of the tree connecting the two nodes A and B is denoted by (A, B). The integer RF(A) is a flag, Right Flag at A, indicating whether a node in the tree can be reached by branching to the right at node A. If RF(A) is equal to 0, no such node exists. If RF(A) is equal to 1, then a node C is an immediate successor of node A and can be reached by branching right at node A. The edge of the tree connecting the two nodes A and C is denoted by (A, C). If both LF(A) and RF(A) are set to zero, then A is a terminal node of the tree. If at least one of the integers LF(A) and RF(A) is set to one, then TP(A) is an integer that indicates the "name" of an immediate successor of A. In a convenient embodiment, TP(A) is always an even integer. If LF(A) is equal to 1, then node A has an immediate successor node B that is reached by branching left at A and B equal to TP(A). If RF(A) is equal to 1, then node A has an immediate successor node C that is reached by branching right at node A and C is equal to TP(A)+1. Some nodes of the tree are associated with a routing table memory entry. The field Ad(A) in TD(A) is an integer that points to the routing table entry RTE[Ad(A)]. Ad(A) is an integer that is the address in the routing table of the output port data associated with the node A. If no output port data is associated with node A, then Ad(A) is set to −1.

Output ports are identified for access based on the Internet Protocol address $\{b_0, b_1, \ldots, b_{Nmax-1}\}$. In a first example, the process begins at root node $A_0$ on level 0. In an embodiment discussed hereinafter, the process begins at level S. In yet another embodiment, the process begins at a level K, with K>S. In another embodiment, output ports are always found by using data structures defined hereinafter. In the various embodiments, the arrival of a data packet does not cause a tree to be traversed. The structures are constructed and updated by using the tree structures defined herein. The clipboard comprises a special memory location CB. The content of CB is initially set to (−1, −1). Information at the root level of the tree (level 0) is stored in Main Tree Memory address $A_0$. If Ad($A_0$) is equal to s and greater than or equal to 0, then [Opt*(s), Val*(s)] is placed on the "clipboard" at memory location CB, and thus CO($A_0$) is equal to Opt*(s) and CV($A_0$) is equal to Val*(s). However, if Ad($A_0$) is less than 0, then the contents of CB is unchanged, and thus CO($A_0$) is equal to CV($A_0$) and equal to −1. The process at level 0 is complete.

If $b_0$ is equal to 0 and LF($A_0$) is equal to 0, then the process ends and the contents of CB is the target output port. The process ends because $b_0$ equal to 0 means that the direction to the next node in the tree must be along the 0 path, the left edge, but LF($A_0$) equal to 0 implies that the tree does not extend further in the 0 direction. Similarly, if $b_0$ is equal to 1 and RF($A_0$) is equal to 0, then the process ends and the contents of CB is the target output port. If $b_0$ is equal to 0 and LF($A_0$) is equal to 1, then the information at level-one on the tree is at the address $A_1$, where $A_1$ is equal to TP($A_0$). If $b_0$ is equal to 1 and RF($A_0$) is equal to 1, then the information at level 1 on the tree is at the address $A_1$, where $A_1$ is equal to TP($A_0$) plus 1. At level 1 of the tree, $A_1$ is associated with the one bit binary sequence $\{b_0\}$.

If Ad($A_1$) is equal to −1, then the contents of the temporary storage location CB is left unchanged, and thus Clip($A_1$) is equal to Clip($A_0$). If Ad($A_1$) is equal to t and greater than or equal to 0 and CV($A_0$) is greater than Val*(t), then the contents of the clipboard is also left unchanged, and thus Clip($A_1$) is equal to Clip($A_0$). However, if t is greater than or equal to 0 and Val*(t) is greater than CV($A_0$), then the contents of CB equals Clip($A_1$) and is equal to [Opt*(t), Val*(t)]. By the definition of Val, CV($A_0$) can never be equal to Val*(t). Processing at level 1 is complete.

If $b_1$ is equal to 0 and LF($A_1$) is equal to 0, then the process ends and CB contains the target output port. Similarly, if $b_1$ is equal to 1 and RF($A_1$) is equal to 0, then the process ends and CB contains the target output port. If $b_1$ is equal to 0 and LF($A_1$) is equal to 1, then the information at level 2 on the tree is at the address TP($A_1$) and $A_2$ is equal to TP($A_1$). If $b_1$ is equal to 1 and RF($A_1$) is equal to 1, then the information at level 2 on the tree is at the address TP($A_1$)+1 and $A_2$ is equal to TP($A_1$)+1. In either case, $A_2$ is associated with the two bit binary sequence $\{b_0, b_1\}$.

If Ad($A_2$) is equal to −1, then the contents of the temporary storage location CB is left unchanged, and thus Clip($A_2$) is equal to Clip($A_1$). If Ad($A_2$) is equal to u≥0 and CV($A_1$) is greater than Val*(u), then the contents of the clipboard is also left unchanged, and thus Clip($A_2$) is equal to Clip($A_1$). However, if u is greater than or equal to 0 and Val*(u) is greater than CV($A_1$), then the contents of CB is equal to Clip($A_2$) and equal to [Opt*(u), Val*(u)]. Val*(u) can never be equal to CV($A_1$), Processing at level 2 is complete.

The inductive step at level N of the tree either terminates the process at level N or traverses from level N of the tree to level N+1 of the tree. If $b_N$ is equal to 0 and LF($A_N$) is equal to 0, then the process ends and CB contains the target output port. Similarly, if $b_N$ is equal to 1 and RF($A_N$) is equal to 0, then the process ends and CB contains the target output port. If $b_N$ is equal to 0 and LF($A_N$) is equal to 1, then the information at level N+1 on the tree is at the address TP($A_N$) and $A_{N+1}$ is equal to TP($A_N$). If $b_n$ is equal to 1 and RF($A_N$) is equal to 1, then the information at level N+1 on the tree is at the address TP($A_N$)+1 and $A_{N+1}$ is equal to TP($A_N$)+1. In either case, $A_{N+1}$ is associated with the N+1 bit binary sequence $\{b_0, b_1, \ldots, b_N\}$.

If Ad($A_{N+1}$) is equal to −1, then the contents of the temporary storage location CB are left unchanged, and thus Clip($A_{N+1}$) is equal to Clip($A_N$). If Ad($A_{N+1}$) is equal to v≥0 and CV($A_N$)≥Val*(v), then the contents of the clipboard is also left unchanged, and thus Clip($A_{N+1}$) is equal to Clip($A_N$). However, if v≥0 and Val*(v)>CV($A_N$), then the contents of CB is equal to Clip($A_{N+1}$) and equal to [Opt*(v), Val*(v)]. The inductive step at level N+1 is complete, concluding the discussion of looking up output ports using the main tree.

The process of adding items to the tree proceeds in a straight forward manner. The process is triggered by the arrival of a route packet (Seq, Sig, Opt, RV, Opc), where the Opc field indicates an add operation, for example by Opc equal to 1. The process is accomplished by chaining through the sequence Seq to the node $X_{Sig}$ on level Sig. A first case can chain through Seq to $X_{Sig}$ along existing tree nodes and edges. If a pointer to the routing table designates $X_{Sig}$, the routing table element pointed to by Ad($X_{Sig}$) is modified. If no such pointer exists, then Ad($X_{Sig}$) is modified to point to a new routing table entry containing Opt and Val from the route packet. In a second case, the existing tree does not chain through Seq to node $X_{Sig}$ on level Sig, but terminates at an existing node E on a level L, with L less than Sig. New nodes $X_{L+1}, X_{L+2}, \ldots, X_{Sig}$ are then added to the tree. The appropriate flag, LF(E) or RF(E), is changed from zero to one and TP(E) points to $X_{L+1}$. At node $X_{Sig}$, AD($X_{Sig}$) points to the new member of the routing table containing the Opt and Val from the arriving route packet.

The process of deleting items from the tree involves chaining through the tree to level Sig and deleting the proper pointer and altering the data item to which the pointer refers. If the alteration results in the deletion of the entire data item, then the location in the memory which holds that data item is released. During the process of traversing the tree, the proper information is saved to enable retracing the steps in case any of the LF or RF values are to be reset from 1 back to 0.

In one embodiment, the tree is constantly updated. In a second embodiment, two copies of the tree are maintained, but only one copy is continuously updated. Updating of the other copy takes place by periodically deleting the tree that is not updated and replacing with a copy of the updated one.

Defining Parameters of the Data Structure

Letters designating nine integers S, V, K, J, U, W, D, Q and M can be used as design parameters that define the system. Sub-trees of the main tree that have root nodes on level S of the main tree are termed S-trees. The sub-trees can be updated using parallel hardware. The number V banks of memory, called S-banks, store the S-trees. In one embodiment, each S-tree is in a separate bank, so that $V=2^S$. S-banks are conveniently constructed and updated with V separate processors with each processor capable of reading and writing a memory space allocated to the processor.

The S-banks are written as: $SB_0, SB_1, \ldots, SB_{V-1}$.

A directory with an address space defined as the set of S long binary sequences, referred to as the level S directory, contains data that summarizes the information contained in the tree nodes on levels 0 through S. The level S directory entry at address Z has the form:

$$LSE(Z)=\{SF(Z), SBN(Z), SBE(Z), SO(Z), SV(Z)\}$$

and is defined as follows. The binary sequence $\{b_0, b_1, \ldots, b_{S-1}\}$ is the binary representation of Z. The main tree is chained along $\{b_0, b_1, \ldots, b_{S-1}\}$ until either: 1) A level S node is reached, in which case that level S node is denoted by X; or 2) a terminal node is reached on a level T<S, in which case that terminal node is denoted by X. The first field SF(Z) is a flag that is set to 1 provided that X is on level S and X is a non-terminal node of the tree; otherwise SF(Z) is set to 0. If SF(Z)=0, then SBN(Z)=SBE(Z)=−1 and SO(Z) and SV(Z) are defined using Clip(X) so that SO(Z)=CO(X) and SV(Z)=CV(X). Otherwise, if SF(Z)=1, the fields are defined as follows. SBN(Z) indicates the S-bank containing the S-tree with root at X and SBE(Z) indicates the location of X within said S-bank. SO(Z) and SV(Z) are defined using Clip(X) so that SO(Z)=CO(X) and SV(Z)=CV(X). In the simple case with $V=2^S$, SBN(Z)=Z and SBE(Z)=0.

The integer K is greater than the integer S. Sub-trees of the main tree having root nodes that lie on level K of the main tree are referred to as K-trees. K-trees have root nodes on level K-S of the S-trees. The K-trees are stored in a K-tree memory that is composed of U banks of memory. Conveniently, but not necessarily, an integer J can be defined such that $U=2^J$. The memory banks that store the K-trees are referred to as K-banks.

The K-banks are written as $KB_0, KB_1, \ldots, KB_{U-1}$.

A directory having an address space that is the set of K long binary sequences, called the level K directory, contains data that summarizes the information contained in the tree nodes on levels 0 through K. The level K directory entry at address Z has the form:

$$LKE(Z)=\{KF(Z), KBN(Z), KBE(Z), KO(Z), KV(Z), KLB(Z)\}.$$

The level K directory is analogous to the level S directory. The binary sequence $\{b_0, b_1, \ldots, b_{K-1}\}$ is the binary representation of Z. The main tree is chained along $\{b_0, b_1, \ldots, b_{K-1}\}$ until either: 1) A level K node is reached, in which case the level K node is denoted by X; or 2) a terminal node is reached on a level T<K, in which case the terminal node is denoted by X. The first field KF(Z) is a flag that is set to 1 provided that a non-terminal, main-tree node X is defined by Z. Otherwise KF(Z) is set to 0. If KF(Z) is equal to 0, then KBN(Z) is equal to KBE(Z) and equal to −1 and SO(Z) and SV(Z) are defined using Clip(X) so that KO(Z) is equal to CO(X) and KV(Z) is equal to CV(X). Otherwise, if 0≤KBN(Z)≤U−1, then KBN(Z) indicates the K-bank containing the K-tree with root at X and KBE(Z) indicates the location of X within the K-bank. KO(Z) and KV(Z) are defined using Clip(X), so that KO(Z) is equal to CO(X) and KV(Z) is equal to CV(X). KLB(Z) is an integer that is used in embodiments employing Low Banks defined hereinafter. Since KLB(Z) is not used in all embodiments, LKE(Z) is sometimes written without the KLB(Z) parameter.

The format of a tree data entry is the same for the main tree, for an S-tree, and for a K-tree. In all cases, a data item at node A has the form:

$$TD(A)=\{LF(A), RF(A), TP(A), Ad(A)\}.$$

In some embodiments, yet another data structure is used that is called a low-order-bit memory (Low Memory) because, in situations used, the output port assignment depends on low order bits in the Internet Protocol address. Such lookups depend on more than K bits of the address, and therefore cannot be ascertained using only the KO(Z) field of the level K directory. The Low Memory is built using the K-trees. The Low Memory is divided into W banks, the Low Banks, which are denoted by:

$$LB_0, LB_1, \ldots, LB_{W-1}.$$

An integer D exists such that each of the Low Banks has an address space of size $2^D$. The contents of the $n^{th}$ Low Bank at the D long polybit address Z is written:

$$LB_n(Z)=\{LBF(Z), MBX(Z), LO(Z), LV(Z), Use(Z)\}.$$

LBF(Z) is a flag that is set to 0 to indicate no data is in the remaining fields and is set to 1 to indicate the presence of data in the fields. MBX(Z) is a polybit sequence of length (Nmax−D) that is described hereinafter. LO(Z) is an output port, LV(Z) is a value associated with LO(Z), and Use(Z) is an integer related to the amount of time since the last use of the port value LO(Z). The role of the Low Memory is described hereinafter. In various embodiments, the disclosed structures and techniques can efficiently maintain and use the data structures defined herein. In some embodiments, more than two directories are used. For embodiments with more than two directories, in addition to the level S and K directories, a next directory is used on level M, where M>K. The level M directory contains Q banks.

Level S Directory and Level K Directory

The main tree is used to construct the level K directory. The level S directory can be constructed by the same method. The directories can be constructed by a more efficient method. The level K directory has $2^K$ addresses that are filled sequentially from 0 to $2^K-1$. A description of directory loading at address X can be described using a binary sequence $\{b_0, b_1, \ldots, b_{k-1}\}$ that corresponds to the binary representation of X. Term $x_0$ denotes the root node of the main tree. Term $x_1$ denoted the main tree node such that the node sequence $\{x_0, x_1\}$ is defined by the binary sequence $\{b_0\}$. Term $x_2$ denoted the node of the main tree such that the node sequence $\{x_0, x_1, x_2\}$ corresponds to the binary sequence $\{b_0, b_1\}$. The process continues until a node on level K is reached or until the process is stopped by a flag. The process constructs a node sequence $\{x_0, x_1, \ldots, x_J\}$ with $J \leq K$.

Node $x_J$ is a terminal node of the tree provided that 1) J<K or 2) J=K and $LF(x_J)=LR(x_J)=0$. If $x_J$ is a terminal node, the level K directory entry at the terminal node X is defined by $LKE(X)=\{KF(X), KBN(X), KBE(X), KO(X), KV(X), KLB(X)\}$, where $KF(X)=0$, $KBN(X)=KBE(X)=-1$, and $Clip(x_J)$ is used to set KO(X) to $CO(x_J)$ and KV(X) to $CV(x_J)$. The optional variable KLB that is used in embodiments employing low banks is discussed hereinafter.

If $x_J$ is not a terminal node of the tree, then J is equal to K and one or both of the flags $LF(x_K)$ and $RF(x_K)$ is set to one. Under these conditions, the level K directory entry LKE(X) is defined by first setting KF(X)=1, indicating that a K-tree with root at X is stored in a K-bank. The process of filling in the level K directory entries at 0, 1, ..., (X−1) has located K-trees in various banks of the K-tree memory. In a first embodiment, a K-bank $KB_{MinN}$ is selected that presently contains a minimum number, possibly zero, of K-tree nodes and KBN(X) is set to MinN. In a second embodiment, a K-bank $KB_{MinT}$ is selected that presently contains a minimum number of K-trees and KBN(X) is set to MinT. In the various embodiments, Min is set to MinN or MinT, as is appropriate. If $KB_{Min}$ does not already contain a K-tree, KBE(X) is set to 0. If $KB_{Min}$ already contains one or more K-trees, selected integers are used as labels of the K-tree nodes in $KB_{Min}$. KBE(X) denotes an even positive integer that is not already used to label a node of a K-tree already in $KB_{Min}$. The procedure can use a list of available integers. If K is equal to 24 and Nmax is equal to 32, then each K-tree has less than 514 nodes, so that if $KB_{Min}$ already contains L trees, KBE(X) can be set to (514·L). In yet another simple embodiment, the label of a node in the main tree is the same as the label of the corresponding node in the K-tree located in a K-bank, so that KBE(X) is set to the label of the level K node that is the root of the given K-tree. KO(X) is set to $CO(x_J)$ and KV(X) to $CV(x_J)$.

The method for constructing the level K directory may also be used to construct the level S directory, except that the setting of SBN and SBE may be easier than the setting of KBN and KBE. Other more efficient methods of building the directories are disclosed herein.

In systems that select a most desirable output port depending upon the QoS of the message, the process can be modified in two ways. In a first embodiment, a group of ranges of quality of service are defined so that within a defined range of the group, the choice of most desirable output port does not depend on QoS. A separate directory is built for each range of quality of service. The directories can be conveniently constructed simultaneously while chaining through the tree. A second embodiment uses only one directory. Multiple entries of most desirable output port are placed in the same directory. Each of the entries can have a dedicated field. The single directory can be loaded in the same order as the multiple directories.

Storing the K-Trees in Memory Banks

In some embodiments, the number of K-banks is significantly larger than the number of line cards. Systems employing structures and techniques described in related patent application No. 10 have only one output port lookup per message packet, and therefore, on average, have fewer lookups than message packet segments. Moreover, some message packets have output ports assigned by a level K directory lookup so that accessing the K-banks for such message packets is unnecessary. Special memory, for example the Low Banks, is used for some messages that do not access the K-banks. As a result, any given K-bank is accessed infrequently. Some embodiments have an additional level M directory with M>K with the K banks used to update the level M directory but not to lookup output ports for arriving messages.

The K-tree memory banks, called K-banks, are placed in a location that is accessible by each of the line cards. Simultaneous accessing of the K-banks by the line cards is enabled by using interconnect structures specified in the listed related patents and patent applications. The system illustrative system has U K-banks. In many embodiments, U is less than or equal to $2^J$. With a possible wide variance in the number of nodes per K-tree, some of the K-banks may be configured to hold more K-trees than other K-banks to roughly equalize the number of nodes per K-bank. Therefore, the K-banks can be used to attain a degree of balance in the tree structure. Some embodiments have multiple copies of the K-banks, further reducing the frequency of requests to any K-bank and also decreasing the physical distance from an input port to the closest appropriate K-bank.

When a message packet enters an input port and the target output port for the message is not found in the special memory and the message packet's final output port is not resolved in the level K directory, then the target output port address can be looked up in the K-banks. The level K directory points to the K-tree that is used to resolve the message packet's output port. A network of the type described in the listed related patents and patent applications connects the line cards to the K-banks. Packets referred to as "request port" packets are sent to logic associated with the requisite memory bank and cause the tree lookup process described hereinabove to produce a target output port. The request packet header, which is used to direct the request packet to the designated memory bank, is built using level K directory information. The request packet payload contains the memory bank address of the sub-tree. The request packet also contains contents to be placed on the clipboard at the beginning of the K-tree search. The request packet payload also contains the address of the input port that sent the request packet. The lookup in the K-tree is accomplished by chaining through a binary sequence as described hereinabove. The target output port is returned in a "port answer" packet to the line card that sent the "request port" packet. Additional identification information is included in both the "request port" and the "answer port" packets.

Construction and use of the packets is similar to the construction and use of the request and answer packets described in listed reference patent applications No. 8 and No. 10. Lookup into the sub-tree can be done using standard memory or by using special purpose processor-in-memory (PIM) chips described hereinafter. Information in the K-trees can be used to construct yet another type of memory structure referred to as Low Banks.

Special Routing Tables and the Low Banks

In several instances message output ports are looked up in memory other than the level-K directory and the K-banks. A first instance occurs for message packets having an indicator in the header that additional message packets bound for the same address are to follow, for example in file transfers. Data packets with followers have one type of header indicator. Message packets that are followers have another type of indicator in the header. Data packets between the first and last packets contain both leader and follower indicators in the header and can have a local routing table for exclusive use or can share local routing tables with other types of message packets that use local routing tables. In one embodiment, storage is used only for messages with output ports that cannot be resolved by using only the level K directory.

A second instance occurs for message packets that have a special classification of guaranteed service. In effect, streams of the packets use a dedicated bandwidth in the form of a virtual circuit connection. Packets in the streams also contain header information indicating level of service. Output port information can be stored with messages utilizing the follower indicator or can have a dedicated routing table. In some applications counts of messages of selected types are maintained to make proper charges and ensure that messages of a selected classification do not use more bandwidth than a predetermined amount. The output port lookup function can be conveniently incorporated with billing and bandwidth enforcement functions. Therefore separate and in some cases local memory can be conveniently used for messages with headers indicating a guaranteed service classification.

A third instance occurs for message packets outside the first two categories that cannot be looked up in the level K directory. The messages can be looked up by traversing the K-trees in the K-banks or can be looked up in a special "Low Order Bit Memory" that is built from the K-trees. The "Low Order Bit Memory" is divided into W "Low Banks" denoted by $LB_0, LB_1, \ldots, LB_W$. In one embodiment, the Low Banks are stored locally on the line card. In a second embodiment, the Low Banks are stored in a central location. In a third embodiment, multiple copies of the Low Banks are included with several line cards sharing a single copy.

The following describes an efficient method of constructing and using the Low Banks. Each address of a Low Bank entry is part of an Internet Protocol address. The entry contains the rest of the address along with information including the target output port. In some embodiments with the most desirable target output port dependent on quality of service, multiple target output ports and associated information are included for each port. In the illustrative case, the most desirable system output port for a message packet does not depend on the quality of service (QoS) of the message. In this case, the convenient form of Val is defined by $Val=[C_1-RV-(Sig/C_2)]$, where RV is the number of hops to the destination.

If the output port for a message cannot be found in the special routing tables or in the level K directory, then the Low Banks are used in the following manner. The Internet Protocol address X, an Nmax long polybit, is divided into two parts: part $X_A$ is the address of a Low Bank entry and part $X_B$ is a second field of the Low Bank entry. In a first example, $X_A$ can include the first two bytes with $X_B$ containing of the remaining bytes. In a second example, $X_A$ can include the second two bytes with $X_B$ containing the remaining bytes. In a third example, $X_A$ can be the even bits of the address and $X_B$ can be the odd bits of the address. In general, the set $X_A$ is defined by a mask MA, wherein a 1 bit in the mask indicates the location of a bit in $X_A$. The set $X_B$ is defined by the mask MB, wherein a 1 bit in the mask MB indicates the location of a bit in $X_B$. Each of the Nmax locations in the address is in either $X_A$ or $X_B$, but not both. The integer D denotes the number of ones in the mask MA, and thus, (Nmax−D) denotes the number of ones in the mask MB. W banks are contained in the Low Bank lookup memory with each bank having $2^D$ addresses. The W Low Banks are denoted by $LB_0, LB_1, \ldots, LB_{W-1}$.

The mask MA is applied to the Internet Protocol address X to produce the D long polybit $X_A$. Each of the Low Banks is examined at address $X_A$. Each memory access returns five data fields of the form:

$$\{LBF(X_A), MBX(X_A), LO(X_A), LV(X_A), Use(X_A)\}.$$

The field $LBF(X_A)$ is a one bit flag that is set to 1 to indicate that valid lookup data is stored at the address $X_A$ and set to 0 when no valid data is stored. An output port is found if a Low Bank $LB_N$ exists such that at address $X_A$ of $LB_N$, $LBF(X_A)=1$ and $MBX(X_A)=X_B$. $LO(X_A)$ is the desired output port and the field $LV(X_A)$ is a value associated with an output port $LO(X_A)$. Following the successful finding of an output port, $Use(X_A)$ is set to zero in bank $LB_N$ and $Use(X_A)$ is incremented by one in each of the other Low Banks.

If none of the Low Banks contain the output port at local address $X_A$, then the output port is obtained by searching the appropriate K-tree and information associated with the output port is placed in the $N^{th}$ Low Bank at address $X_A$ provided that either: 1) for that bank, $LBF(X_A)$ is equal to 0 or 2) no bank exists with $LBF(X_A)$ is equal to 0 and the $N^{th}$ bank is a Low Bank with the largest value of $Use(X_A)$. The output port is obtained by searching the designated K-tree in the following manner. The first K bits of the Internet Protocol address, denoted by the K long polybit Z, are used as an address of the level K directory. The root of the K-tree to be searched is contained in $KB_{KBN(Z)}$ at $KBE(Z)$. The K-tree is searched and, upon completing the search, at address $X_A$ in the $N^{th}$ Low Bank $LBF(X_A)$ is set to 1, $MBX(X_A)$ is set to $X_B$, and $LO(X_A)$, and $LV(X_A)$ are set to the contents of the clipboard at the end of the tree search. In each Low Bank, $Use(X_A)$ is incremented by 1 and then in the $N^{th}$ Low Bank, $Use(X_A)$ is set to 0.

The Low Banks are updated when a change is made to the level K directory or to a K-tree and the change alters the contents of the Low Banks. One method described herein uses a linked list data structure. The linked list is referred to as LL. Each member of LL includes an ordered triple of integers of the form (Num, MXA, LLP), where Num points to a specific Low Bank $LB_N$, MXA points to an address within $LB_N$, and LLP points to another member of LL.

A list of integers is available to be used as items in the linked list. The list of integers is called A VLL. When an item is added to Low Bank $LB_N$ at address $X_A$, the associated level K directory entry LKE(Z) is examined. In case KLB(Z) is equal to S with S not equal to −1, then KLB(Z) is not altered. The content of LL at S is examined and if S points to another entry T of LL, then T is examined and the process is continued until an entry of the form (Num, MXA, −1) is found. The entry is changed to (Num, MXA, V), where V is taken from A VlL, and a new entry (N, $X_A$, −1) is added to the linked list LL at address V. If KLB(Z) is equal to −1, KLB(Z) is changed to an integer I taken from A VLL and the entry (N, $X_A$, −1) is added to LL at address I.

When an item is removed from Low Bank memory location $X_A$ in $LB_N$, the associated Level K directory address Z is identified as the first K bits of the Internet Protocol address derived from the Low Bank memory location by recombining $X_A$ and $X_B$ using the masks MA and MB. The entry [Num, MXA, W] is in the linked list LL at address KLB(Z) and is not pointed to by any other member of the list. Beginning with [Num, MXA, W], the links can be followed to the member [N, $X_A$, T] to be deleted. The member can be removed and the links reconnected. If KLB(Z) is the memory location to be deleted, and W is equal to −1, then LKE(Z) is modified by resetting KLB(Z) to −1.

When a route packet RP arrives that may alter the content of a Low Bank entry because of the alteration of a level K directory entry at address Z or because of the alteration of the K-tree pointed to by the level K directory entry at Z, then an update-low-bank packet (ULB packet) is sent to a processor that manages the Low Banks. The ULB packet has the form:

$$ULB=\{DF,LBP,RP]\}.$$

The delete flag field DF is set to zero if the route packet RP caused the deletion of an entire K-tree and is otherwise set to one. The LBP field contains the value of KLB(Z) prior to the arrival and processing of the route packet. RP is the arriving route packet. The Low Bank processor is able to go through the linked list to find all of the Low Bank Memory locations that may be affected by the arrival of RP and alter the contents as appropriate. A packet can affect multiple level K directory entries so that multiple update-low-bank packets are sent.

In the present illustrative embodiment, only the output ports found in the K-trees are stored in the Low Memory so that the number of entries can be kept low and updating is an infrequent event. Moreover, only IP addresses that have previously been used are stored in the Low Memory so that the amount of data stored in the Low Banks is reduced or minimized.

Some local memory can best be served by special handling, for example memory that is reserved for special high priority messages with guaranteed throughput or messages that use special bookkeeping. Specially-handled local memory can be accessed each time to update predetermined statistics and guarantee that the contracted bandwidth is not violated. The combination of the three techniques forms an economic, low-latency scheme that can scale up to the new standards. An expanded version of the updating and use of the Low Banks is presented hereinafter.

A Parameterized Example

One example has S set to 6, J set to 9 ($U=2^9=512$), and K set to 24. The level K directory contains $2^{24}$ entries. A copy of the level K directory is included at each of the input ports, or line cards in some applications of the system. The level K directory has an address space of size $2^{24}$ with the contents of each address containing only a few bytes so that the data is reasonably stored at each input port. Corresponding to an Internet Protocol address ($b_0, b_1, \ldots, b_{31}$), the first 24 bits serve as an address into the directory. In an alternative embodiment, several input ports share a single level K directory, the level K directory is divided into banks and the banks are addressed via a switch of the type described in the listed related patents and patent applications.

An incoming message causes a lookup into the level K directory. A level K directory data entry at the location $Z=(b_0, b_1, \ldots, b_{23})$ has the form $\{KF(Z), KBN(Z), KBE(Z), KO(Z), KV(Z), KLB(Z)\}$, where $KF(Z)$ is a one bit flag. IF $KF(Z)$ is equal to 0, the process is completed. The existence of $KF(Z)$ is equal to 1 in the first field causes a parallel lookup into the Low Banks. A Low Bank hit ends the process. If misses occur in all W of the Low Banks, then the designated K-tree is searched and the Low Banks are updated. An alternative embodiment has no Low Banks and when $KF(Z)$ is equal to 1, the appropriate K-tree is located in the K-banks and the K-tree is searched for the output port.

The third reference gives data on the routing table of one backbone router. In the example, 99.93% of the entries in the routing table were derived from 24 or fewer bits of the IP addresses. Therefore, in the great majority of the cases, the target output port is located in a single access of the level K directory. Moreover, given that the parameter W is sufficiently large, a suitable number empty data positions are available in the Low Banks so that an arriving data packet does not force a write over existing data.

In many computing, entertainment, and communication systems, limited data movement capabilities can limit performance. In aspects of data movement, switching, and management, the related patents and patent applications listed hereinabove represent a substantial advance in the art. The listed patents and patent applications are incorporated by reference and form the foundation of the present disclosure.

In various embodiments, the disclosed system is control logic for accessing information in a storage system. In a particular embodiment, the disclosed system includes control logic for data storage devices using content addressable memories (CAMs). In some applications, the control logic performs output port number lookup based on the Internet Protocol (IP) address.

The structures and operating methods disclosed herein address the difficulties of large-capacity content addressable memories using tree structures in a novel way. Moreover, the present disclosure solves addressing problems in a manner that can scale to the proposed Internet Protocol addressing standard (IPv6). Moreover, the present disclosure describes a method whereby multiple input ports can simultaneously access the data structure. Simultaneous access can be attained using the structures and techniques described in the listed patent and patent application references, enabling the construction of an extremely fast, cost effective, energy efficient, and reliable Internet Protocol router with a small footprint.

Some embodiments of the present disclosure address the complexity of addressing under the IPv6 standard and establish methods of managing the expanded standard.

Various embodiments employ several types of lookup tables. A first type of data structure contains special addresses that can be associated with a single input port. A second type of data structure is called a directory and is associated with an integer K and gives output port information contained in route packets that are based on K or fewer bits. One embodiment includes a plurality of directories such that a first directory corresponds to K bits and a second directory corresponds to M bits, where M is an integer greater than K. Additional directories may be used that correspond to integers greater than M. A third type of data structure is a tree that is used to build and maintain the directories and, in some embodiments, is also used to locate data in the routing tables. A fourth type of data structure uses hashing for the economical storage of information accessed using the tree structure with the information simultaneously stored in routing tables.

In some embodiments, data structures can be divided into memory banks in a manner that enables simultaneous access of data structures.

Some embodiments include one central memory management system that enables extremely efficient local lookup memory at the input ports. Local efficiency is particularly useful in Internet Protocol systems running at high speed. The fast, efficient communication between the central memory management and the input port line cards is enabled by the use of switches of the type described in the referenced related patents and patent applications. A system utilizing central memory management is particularly useful in routers that have a large port count. The total cost of the central memory management can be amortized over the large number of line cards. Switches in the referenced related patents and patent applications have latency that is lower than a single lookup in conventional 60 ns DRAM, improve throughput performance.

The data structures disclosed herein can be used with structures and techniques disclosed in the referenced related patent applications Nos. 8, 9, and 10 to construct a high bandwidth, intelligent router with a large number of ports.

Referring to FIG. 1A, a data tree is shown that can be used to find entries in the routing table utilizing a method of storing the data in multiple memory banks. The method of parallel access to the various banks can use switches of the type described in the listed related patents and patent applications. The data tree and associated routing tables can be used by all of the input ports.

The illustrative system includes central data storage and utilizes an efficient method of building and using local line card memories. A collection of algorithms are utilized that build, maintain and use data structures.

Tree Memory Structure

In an illustrative embodiment, the tree memory structure has multiple aspects including: 1) Representing the main tree in memory and building routing tables that are accessed via pointers at nodes in the main tree memory; 2) Using route packets to add nodes to the main tree and data to the routing table; and 3) Finding a target output port based on an IP address by using the main tree and the routing table. The tree illustrated in FIG. 1A is representative of a tree with its root node at level 0 or a sub-tree with root at level S (an S-tree) or a sub-tree with root at level K (a K-tree). The symbol * indicates the presence of a pointer to the routing table. The method of treating each of the three aspects is the same.

The illustrative tree and method operate with a root at level 0. The memory structure of the tree with root at level 0 has the same form as the S-bank memory structure and the K-bank memory structure with the exception that if S is a small integer, only one bank of memory may practically be used for the tree with root at level 0. One embodiment has one level 0 memory bank, the main tree memory, to hold data associated with nodes on levels from level 0 through level S−1; V memory banks hold data associated with nodes on levels from level S through level K−1, called the S-banks; and U memory banks hold nodes that are on levels K and above, called the K-banks.

The tree illustrated in FIG. 1A contains a root node 102 and other nodes including the nodes 104 and 108 and an edge 106. The nodes have node labels including the label 112, which indicates the node name or node label of 4. The node with callout 104 has label 3 and is referred to as node 3. Node labels are obtained from a list of available pointer values. Edge 106 connecting node 3 to node 7 is referred to as edge (3, 7). Some nodes point to routing table entries and are identified with an asterisk. Node 4 has a pointer to a routing table entry as indicated by asterisk 110.

FIG. 1A can be used to show representation of the main tree in memory and the manner that the main tree memory structure points to items in a routing table. Each of the numbered nodes of the tree is defined by a binary sequence. In general, each level N node of the main tree is defined by a binary sequence $\{b_0, b_1, \ldots, b_{N-1}\}$ of length N. However, some binary sequences of length N do not correspond to any main tree nodes. Node 11 on level 4 is defined by the 4 long binary sequence $\{0, 1, 0, 1\}$. Branching to the left from a node on level N to a node on level N+1 corresponds to adding a zero to the binary sequence that defines the level N node. Branching to the right from a node on level N to a node on level N+1 corresponds to adding a one to the binary sequence that defines the level N node. In this way, the sequence $\{0\}$ containing the single bit 0 defines node 2 and the sequence $\{1\}$ containing the single bit 1 defines node 3. Branching to the right from node 2 to node 5 adds a one to the binary sequence $\{0\}$ defining node 2. Therefore, the binary sequence defining node 5 is $\{0, 1\}$. Branching to the left from node 5 to node 8 adds a 0 to the binary sequence defining node 5. Therefore, the binary sequence defining node 8 is $\{0, 1, 0\}$. By applying these rules, the binary sequence defining node 24 at level 5 is the five long sequence $\{1, 1, 0, 1, 0\}$. An asterisk by a node indicates an output port associated with that node. For example, the asterisk by node 11 indicates that an output port is associated with node 11. The binary sequence $\{0, 1, 0, 1\}$ defines node 11.

The main tree memory shown in FIG. 1B is used to store the tree illustrated in FIG. 1A. The first column of the leftmost portion of main tree memory contains the number N of an even numbered node. The next four columns in row N store data associated with node N. The remaining four columns contain data associated with the odd numbered node N+1. In an alternate embodiment illustrated in FIG. 1C, the odd numbered nodes are included explicitly. The routing table illustrated in FIG. 1B is consistent with the type of main tree memory depicted in FIG. 1C as well as that depicted in FIG. 1B.

Referring to FIG. 1B, the column heading LF refers to the left flag of the node N. If LF is set to 1, then a tree node exists that can be reached by branching to the left at node N. If LF is set to 0, then no tree nodes can be reached by branching to the left at node N. LF is equal to 0 for node 12, but LF is equal to 1 for node 8. The column RF refers to the right flag at node N that is set to 1 to indicate the existence of nodes reachable by branching right at node N and is set to 0 to indicate that no such nodes exist. For example, the right flag at node 12 is set to 1, but the right flag at node 6 is set to zero. The column headings TP refer to tree pointers and are used to indicate the immediate successors of a node N. If N has an immediate successor by branching to the left, then that successor has the label TP. If N has an immediate successor by branching to the right, then the successor has the label TP+1. The column value Ad gives the address in the routing table that contains the output port OP, the number of hops (Hops) needed to reach an output port from OP, and a value of the output port Op, which is set to 100−Hops−Sig/50. Sig is the level of the node that points to the routing table. Ad is set to −1 for any node that does not have associated output port information.

The leftmost column of the main tree memory contains the node label N. The next four columns contain data pertaining to N. The remaining four columns describe data pertaining to the node N+1. For example, data concerning node 13 is to be found in the last four columns of the main tree memory on the node 12 row. Node 13 has no successors to the left, but does have successors to the right. Therefore, LF is set to 0 and RF is set to one. The immediate successor to the right is 15, for example TP+1=14+1=15. The last column of row 12 is a pointer to the location of the output port in the routing table. The variable is set to 6. Row 6 of the routing table, the row with Ad equal to 6, has OP equal to 2, Hops equal to 5, and Val equal to 100−Hops−(level of node 13)/50=95−0.06=94.94. Since the binary sequence defining node 13 on the main tree is $\{1, 1, 1\}$, a message having an Internet Protocol address beginning with the sequence $\{1, 1, 1\}$ can reach the designated destination in 5 hops by exiting the router from output port 2.

Figure 2A:
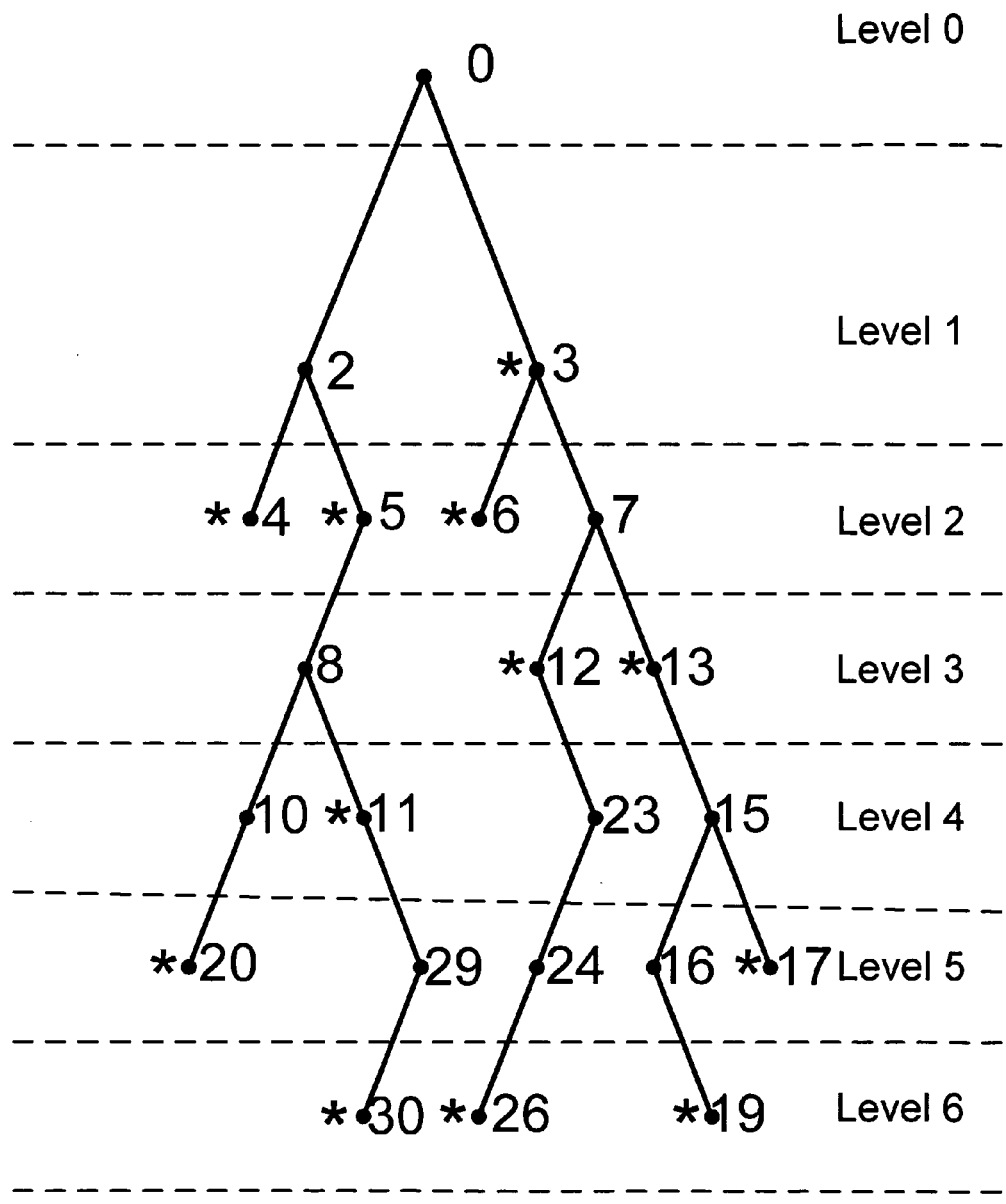
FIG. 2A is a schematic diagram depicting a main data storage tree that is obtained by adding data to the tree of FIG. 1A.
Figure 2B:
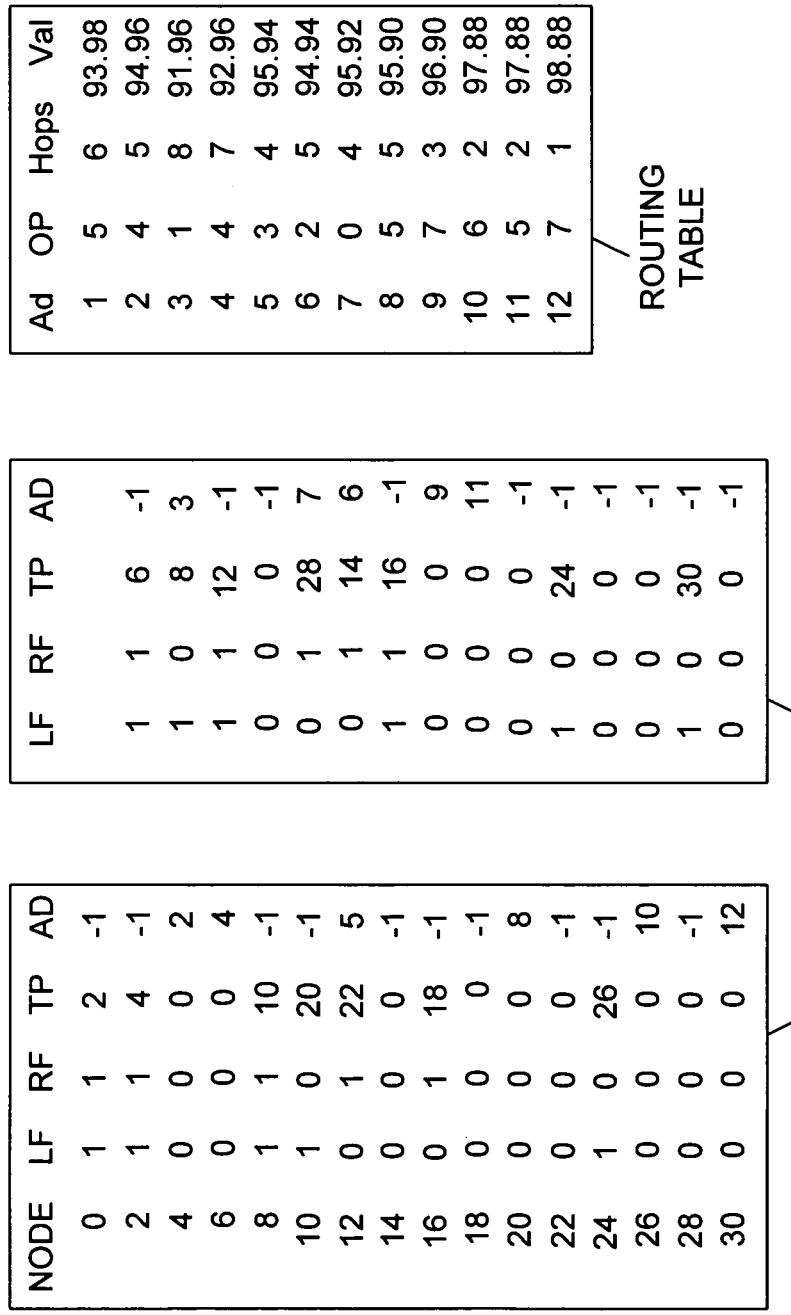
FIG. 2B is a schematic tabular diagram that illustrates the main tree memory and the routing table that is associated with FIG. 2A.

The following describes how a route packet causes data to be added to the routing table and how the added data is pointed to by a tree node. Adding, deleting and updating data is a straight forward process. For example, the process can add the information contained in a route packet of the form (Seq, Sig, Opt, RV, Opc), where Seq=$\{0, 1, 0, 1, 1, 0, b_6, \ldots, b_{Nmax-1}\}$, Sig=6, Opt=7, RV=Hops=1, Val=100−Hops−Sig/50=99−0.12=98.88, and Opc=1. The information in the route packet indicates that a packet having an address beginning with the Sig long sequence $\{0, 1, 0, 1, 1, 0\}$ can reach the designated destination in 1 hop from output port 7. The setting of the operation code Opc to 1 indicates that information is to be added to the routing table. Information is added into the routing table by tracing away from the tree root node using the Internet Protocol address until address termination, then altering a flag, changing a pointer value, and continuing. The process is illustrated in FIG. 2A by the addition of the nodes 29 and 30 in the main tree. The process begins at node 0. Since the first value of the binary sequence is 0, branching to the left is indicated. At node 0, LF is equal to 1 and TP equal to 2 indicating that branching left from node 0 leads to node 2. The next value of the binary sequence is 1 indicating branching to the right from node 2. Since the main tree memory entry for node 2 shows that RF is equal to 1 and TP is equal to 4, the right branch from node 2 goes to node 5 (TP+1=4+1=5), continuing in this manner until node 11 is reached. The four long binary sequence associated with the level 4 node 11 is $\{0, 1, 0, 1\}$. The next step branches to the right to the level 5 node associated with $\{0, 1, 0, 1, 1\}$, but in FIG. 1B the RF value of node 11 is set to 0. Therefore, the value is set to 1 as illustrated in FIG. 2B. Also, a new TP is assigned to node 11. The new TP value is obtained from a list of available pointer values (not shown). Assuming that the next available even integer is 28, the TP value of 28 is assigned to node 11 so that branching to the right from node 11 leads to node 29 (28+1). The integer 28 is removed from the list of available even integers. In the next step, the integer 30 is assigned to the level 6 node associated with $\{0, 1, 0, 1, 1, 0\}$ and a pointer into the routing table is assigned to node 30. The pointer is taken from a list available integers to be used in the Ad field of the main tree memory and, consequently, in the Ad field of the routing table. The list of available Ad integers is not shown. In the example, the value of Ad is 12. Finally, the integer 12 is removed from the list of available Ad values and the entries OP=7, Hops=1 and Val=99−6/50=99−0.12=98.88 are placed in the routing table at address 12. Changes to FIG. 1B are illustrated in FIG. 2B.

An output port is looked up using the tree and the routing table. The method is illustrated herein by finding the target output port corresponding to a message header containing the binary sequence $\{1, 1, 0, 1, 0, 1, 1, 0, b_8, \ldots, b_{Nmax-1}\}$. Beginning at the top line of main tree memory associated with node 0, RF is equal to 1 and TP is equal to 2, indicating that branching to the right from node 0 leads to node 2+1. Therefore, the first step taken is along the edge (0, 3) to the level 1 node 3 associated with the one long binary sequence $\{1\}$. The main tree memory indicates that the node 3 Ad value is 1. Therefore, 1 is the address of the output port information associated with node 3 in the routing table. The contents of the routing table at address 1 is Opt=5, Hops=6, and Val=94−0.02=93.98. The data items Opt=5 and Val=93.98 are stored on a clipboard at memory location CB. At main tree memory location 3, RF is equal to 1 and TP is equal to 6. Since the leading two bit binary sequence is $\{1, 1\}$, the next step is to move along edge (3, 7) to node 7. Since node 7 Ad value is −1, contents of CB are unchanged. At main tree memory location 7, LF is equal to 1 and TP is equal to 12. Since the leading three bit binary sequence is $\{1, 1, 0\}$, the next step is to move along edge (7, 12) to node 12. The node 12 Ad value is 5 and the (Opt, Val) contents at routing table address 5 is (3, 95.94). Since the current value of CB is (5, 93.98) and since 93.98<95.94, the CB contents is updated to (3, 95.94). Node 12 has RF is equal to 1 and TP is equal to 22, so the next move is along edge (12, 23) to the level 4 node 23 associated with the sequence $\{1, 1, 0, 1\}$. The Ad value of node 23 is −1, so the CB value is not updated. Consistent with the first five bits $\{1, 1, 0, 1, 0\}$ of the Internet Protocol address, in conjunction with LF equal to 1 and TP equal to 24 at node 23, the next move is to the level 5 node with label 24. Since the node 24 Ad value is −1, the value of CB is not updated. The first six bits $\{1, 1, 0, 1, 0, 1\}$ of the Internet Protocol address indicate a branching to the right at node 24, but the value of RF is 0 and thus that move is not allowed. The process terminates. The value of CB indicates the proper output port and value pair (3, 95.94). Thus, the router sends the packet with Internet Protocol address of the form $\{1, 1, 0, 1, 0, 1, 1, 0, b_8, \ldots, b_{31}\}$ through output port 3 to a downstream router with the downstream router at three hops from the packet's final target.

The Level S Directory

The level S directory is a memory with $2^S$ addresses. The level S directory entry at the S long binary sequence Z address is written as:

$$LSE(Z)=\{SF(Z), SBN(Z), SBE(Z), SO(Z), SV(Z)\}.$$

The five fields of LSE(Z) are defined hereinbefore in the "Defining Parameters of the Data Structure" section. In effective embodiments, S is small enough that the directory can be filled quickly by the techniques described hereinbefore. In an embodiment with S is less than the minimum value of Sig for all of the route packets and each S tree is in a separate bank, each level S directory item is simply defined by:

$$LSE(Z)=\{1, Z, 0, -1, -1\}.$$

A main purpose of the level S directory is to point to the location of the S-trees in the S-banks.

The S-Banks

Sub-trees with roots on level S are stored in the S-banks, which are denoted by $\{SB_0, SB_1, \ldots, SB_{V-1}\}$. As many as V processors can be used to create and load S-trees into the S banks, for example in a parallel fashion with each processor loading a separate bank. The route packets are placed in V separate sets. In a first embodiment, each tree is placed in a separate S-bank, so that $V=2^S$. In a second embodiment, the number of S-banks is not equal to the number of S-trees and multiple S-trees are placed in the same S-bank. In the first embodiment, memory is added to an S-Bank as used while the S-Bank is being loaded so that two S-banks may differ in size.

The route packets, if any, that have a Sig value not exceeding S can be used to construct the level S directory. The S-banks are loaded using route packets with Sig values greater than S. In one embodiment, only route packets with S<Sig≤K are used and a directory of level K is built in exactly the same manner as the Low Bank directory of level S.

In one embodiment, all route packets have Sig values greater than S. The route packets are placed in a collection of V mutually exclusive sets: $\{RP_0, RP_1, \ldots, RP_{V-1}\}$. The route packet P is placed in set $RP_Q$ provided that the first S bits of the binary address of Seq define the binary representation of Q. The route packets in the set $RP_Q$ are used to load S-bank $SB_Q$.

An S-tree can be constructed using information in a collection of route packets. In a small example illustrated in FIG. 3A, S is equal to 4, K is equal to 7 and V is equal to $2^S$ or 16. The S-banks are enumerated as $\{S_0, S_1, \ldots S_{15}\}$. In the illustrative example, Q=13, so all route packets (Seq, Sig, Opt, RV, Opc) in $RP_Q$ have the first four entries in Seq equal to $\{1, 1, 0, 1\}$ because 1101 is the binary representation of 13. Thus the root node 320 of the S-tree is defined on level S by the sequence $\{1, 1, 0, 1\}$. In an example, 12 route packets are contained in $RP_Q$ with the first three route packets being:

($\{1,1,0,1,0,0,0,1, \ldots, b_{Nmax-1}\}$, 8, Opt, RV, Opc), ($\{1,1,0,1,1,1,0,1,0,0, \ldots, b_{Nmax-1}\}$, 11, Opt, RV, Opc) and ($\{1,1,0,1,0,0, \ldots, b_{Nmax-1}\}$, 6, Opt, RV, Opc).

Figure 3A:
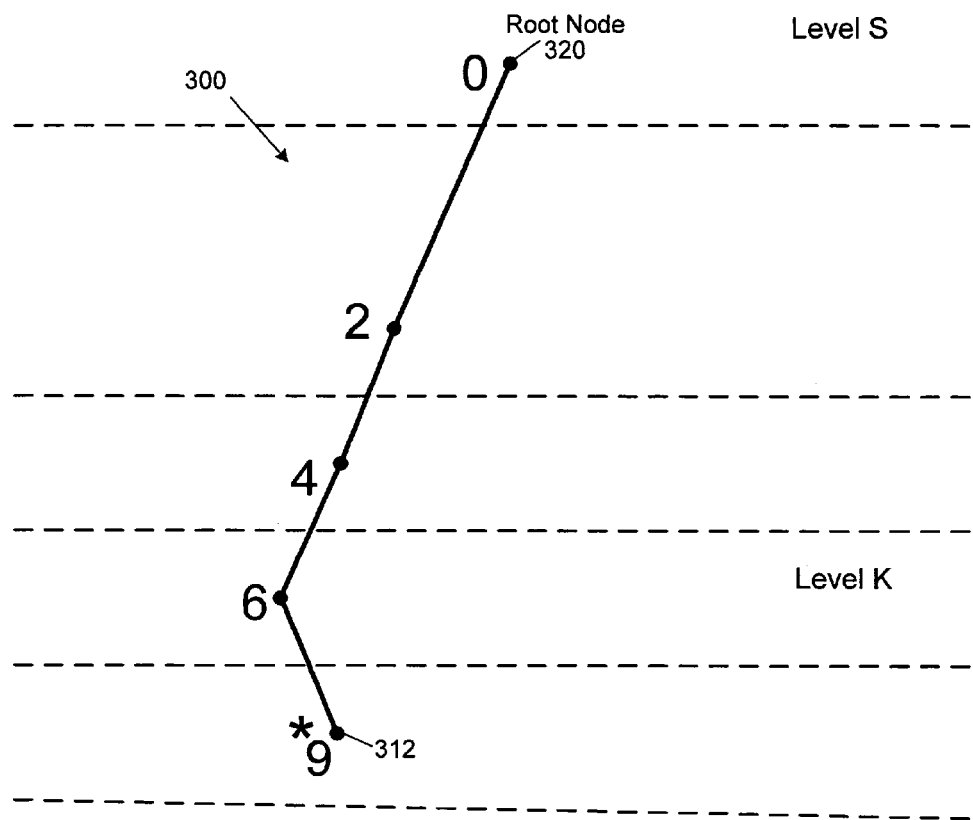
FIGS. 3A through 3G are a tree diagrams showing construction of a routing tree.
Figure 3B:
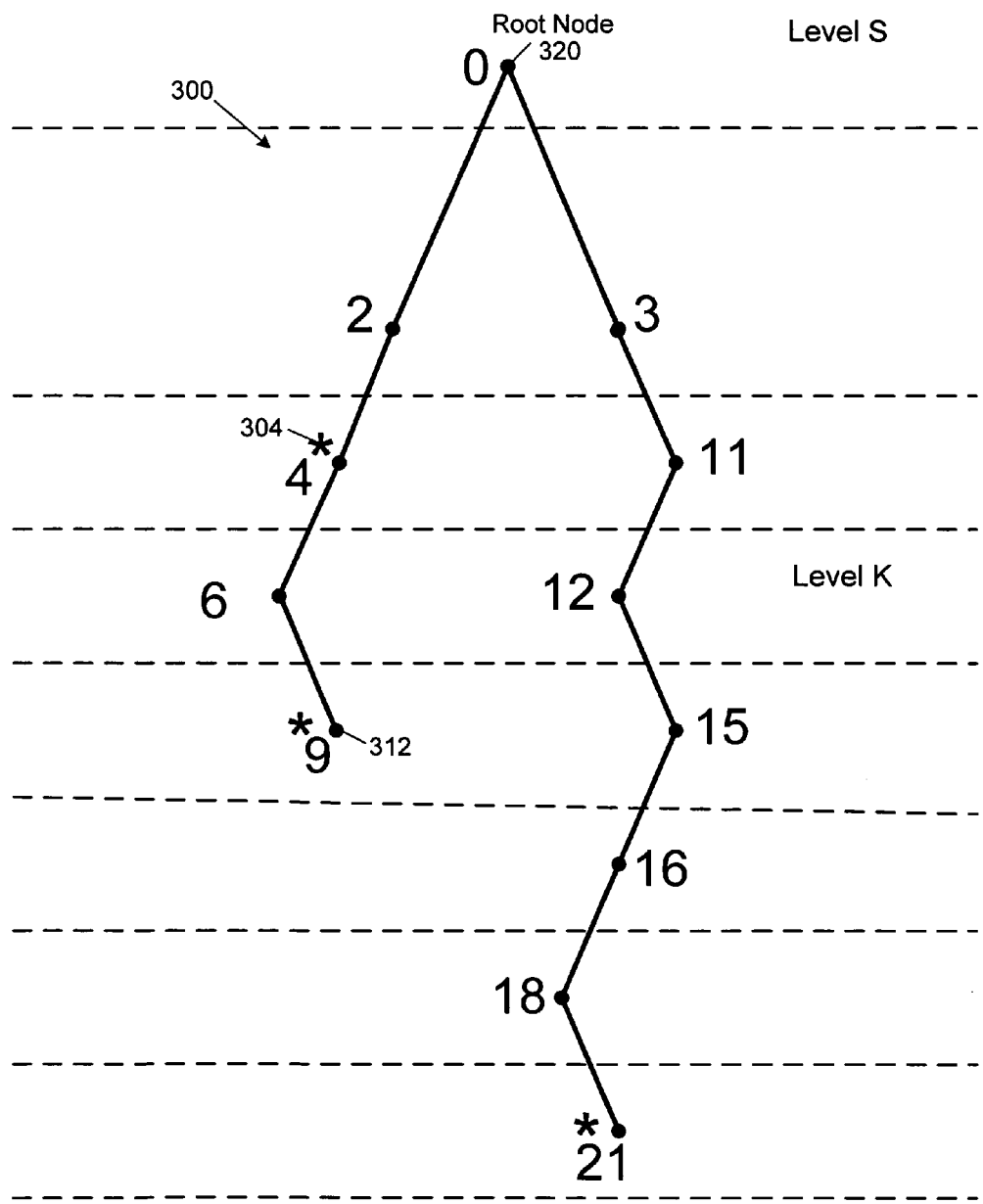
Figure 3C:
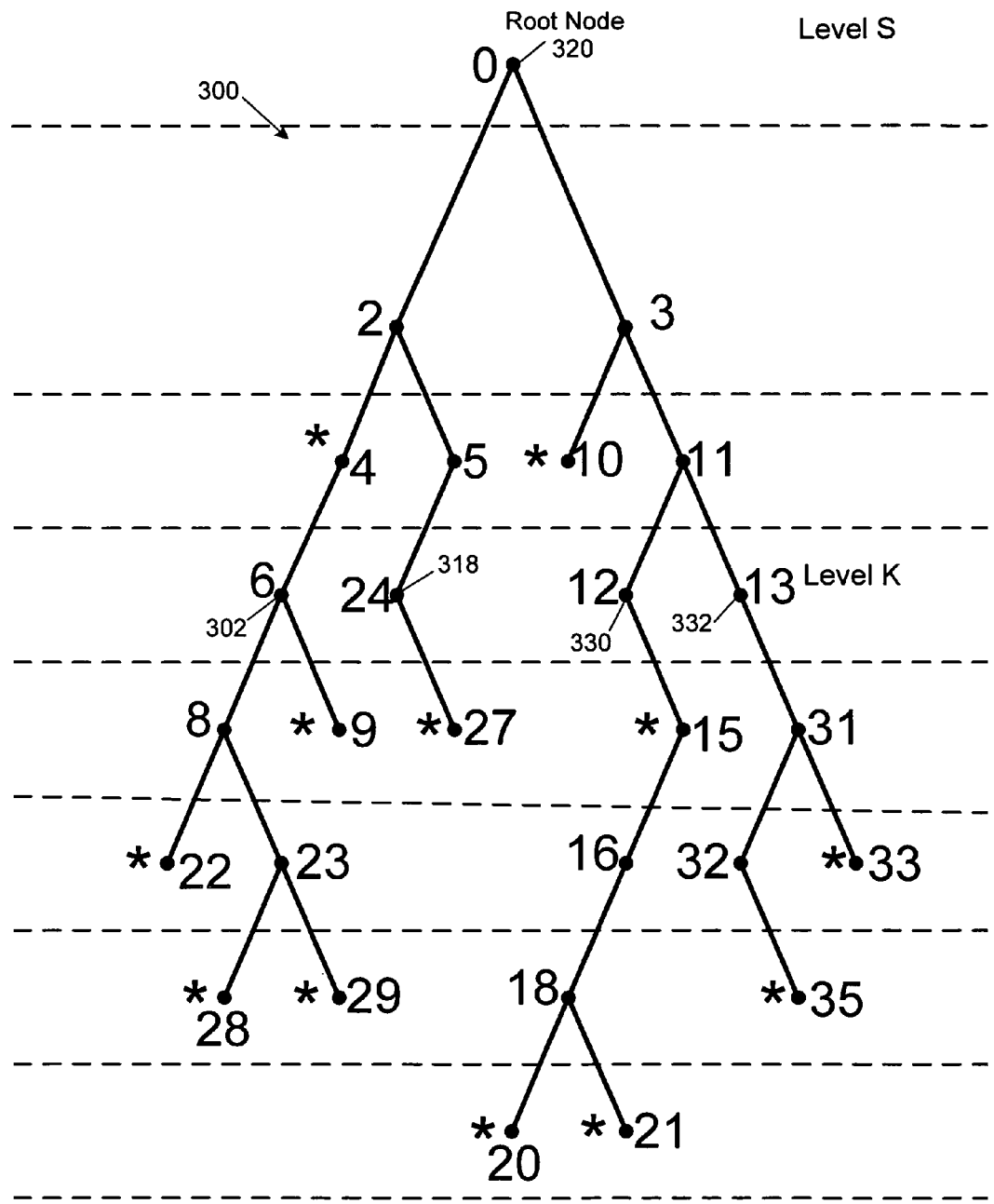

The operation control fields Opc indicate data is to be added to the tree. FIG. 3A illustrates the tree after the first route packet has been used to create the first part of the tree. A set of available numbers (not shown) are used to assign to nodes as the nodes are added to the S-tree that is loaded into $SB_Q$. FIG. 3B shows the S-tree with root at node 0 in $SB_{13}$ after the information in the first three route packets has caused the tree to be altered. The third route packet does not add nodes or edges to the tree but adds an asterisk 304 at node 4. FIG. 3C illustrates the S-tree after additional route packets have been used to alter the S-tree. Node labels are applied during placement on the tree subject to the conditions: 1) branching to the left uses an even node label while branching to the right uses an odd node label; 2) two nodes with a common predecessor use adjacent integers as labels. The extra node labeling conditions are illustrative of one of a large class of labeling conditions. Removing the conditions does not substantially alter the system and method. Labeling of nodes depends upon the order of route packets processing. Removal of a node may, in some conditions, cause labels to be returned to the available list.

The K-Banks and the Level K Directory

Sub-trees with roots on level K are stored in K-banks denoted by $\{KB_0, KB_1, \ldots, KB_{U-1}\}$. In the illustrative embodiment, an integer J exists such that $U=2^J$. The level K directory addresses are the K long binary sequences. A level K data entry at address $B=\{b_0, b_1, \ldots, b_{K-1}\}$ has the form:

$$LKE(B)=\{KF(B), KBN(B), KBE(B), KO(B), KV(B), KLB(B)\}.$$

The KF(B) field is set to 1 to indicate that a main tree node A is on a level L, which is greater than K, such that A is reached in the main tree by following a binary sequence of the form $\{b_0, b_1, \ldots, b_{K-1}, b_K, \ldots, b_L\}$. Accordingly, a K-tree at $B=\{b_0, b_1, \ldots b_{K-1}\}$ has a K-tree root in $KB_{KBN(B)}$ at address KBE(B). KBE(B) is the label for the root of the K-tree in K-Bank $KB_{KBN(B)}$. Traversing the main tree along the bridge B results in placing the values $\{KO(B), KV(B)\}$ on the clipboard. KLB(B) as discussed in the section entitled Low Banks.

The K-trees, the level K directory, and the K-banks can be built from the S-trees in the S-banks. Storage of S-trees in banks enables parallel construction and updating of both the level K directory and the K-banks. The level K directory references the K-banks. In a first embodiment, each input port contains a copy of the level K directory. In a second embodiment, a plurality of input ports shares a level K directory. In a third embodiment, only one level K directory is shared by all of the input ports. In the second and third embodiments, a level K directory is divided into multiple banks with the banks accessed using a switch of the type described in the listed related patents and patent applications. In the second and third embodiments, a given level K directory bank is associated with one or more K-banks. Each level K directory bank and associated K-banks are conveniently placed in close proximity to the hardware that searches a K-tree pointed to by KBN(B), KBE(B). The level K directory and the K-banks can be accessed in parallel. The interconnect structure of listed related patents and patent applications No. 1 to 7 can be effectively used to attain parallel lookup into multiple banks. Various embodiments can use a plurality of level K directories.

The described techniques are completely general with respect to the parameters S, J, and K. In one embodiment, parameters are conveniently set to S=4, J=8, and K=24. In the small illustrative example presented in FIG. 3A through FIG. 3E, S=4, J is unspecified, and K=7.

The K-banks are written as $\{KB_0, KB_1, \ldots, KB_{U-1}\}$. In one embodiment, K-banks can contain a plurality of K-trees. Associated with the K-bank is a routing table containing the routing information pointed to by trees in the K-bank. Loading of the K-banks and associated routing table is described. A program manages filling of the K-banks so that the K-banks hold approximately the same amount of data. The $2^S$ processors simultaneously fill the $2^J$ banks. In embodiments with J>S, only a portion of the K banks are filled at any time.

One algorithm for allotting K-trees to the K-banks uses an increasing sequence of control numbers $CN_0, CN_1, \ldots, CN_{N-1}$ between 0 and 100 to define parameters for the process. A processor begins filling an empty K-bank with K-trees until the K-bank is more than $CN_0\%$ full and then begins to fill a second K-bank. After all of the K-banks are at least $CN_0\%$ full, the K-banks receive additional trees until $CN_1\%$ full and so forth until all of the K-trees are placed in K-banks. The J-banks can be loaded with approximately the same amount of data. The process of creating the level K directory and loading the K-banks can occur at the same time.

Figure 3D:
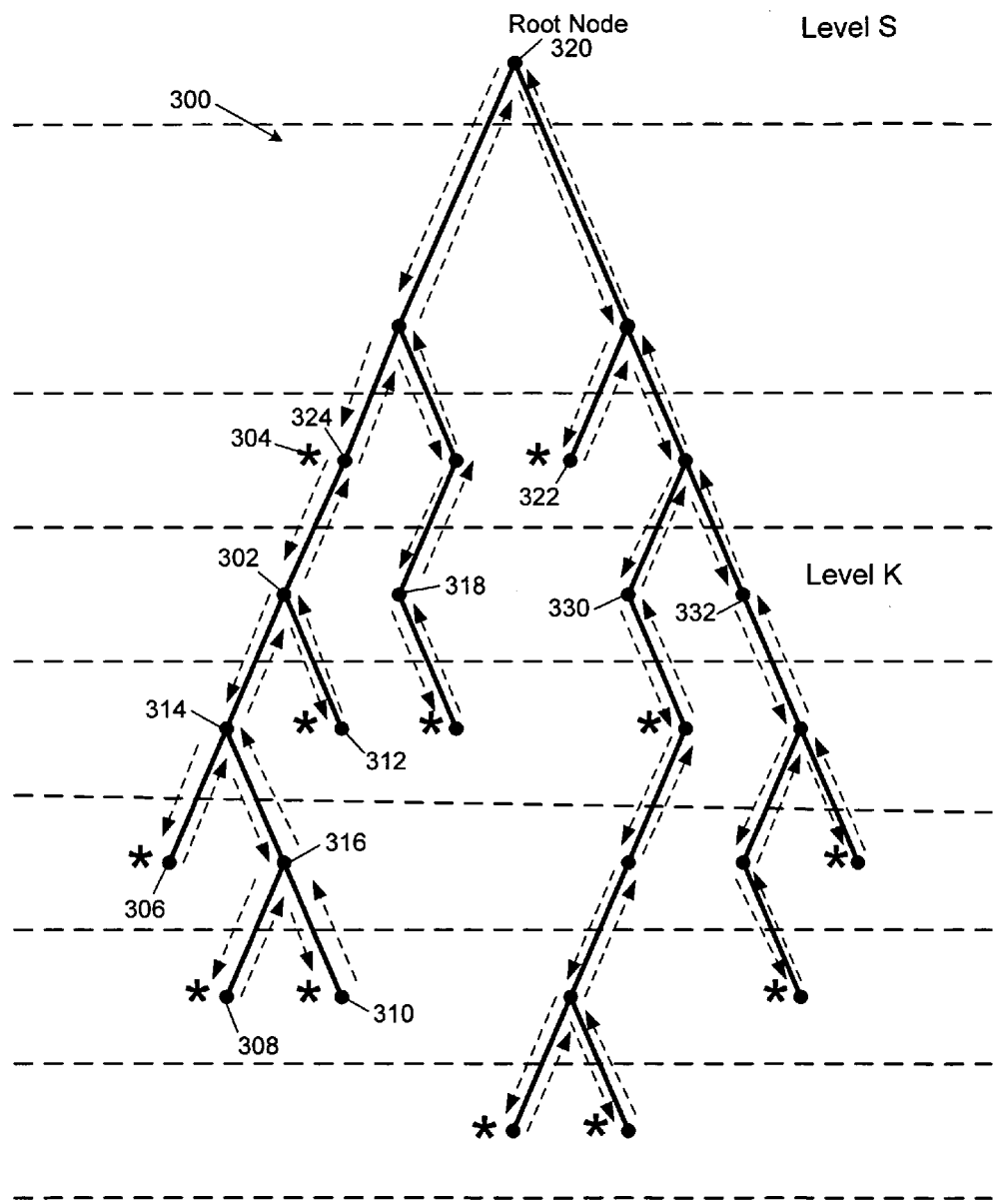

The process can proceed in parallel with $2^S$ processors working concurrently. The process is accomplished by traversing each of the $2^S$ trees as illustrated in the model of FIG. 3D. FIG. 3D depicts a method for retracing steps in the tree that uses a bit of added bookkeeping that involves maintaining a running update of a backup sequence that allows moving toward the root node of the tree. If V is node of the main tree on level L, then $V_0, V_1, \ldots, V_{L-1}$ denote the bridge to V and the backup sequence $BU_0, BU_1, \ldots, BU_{L-1}$ is defined so that each member $BU_n$ of the backup sequence contains three fields: 1) the label of node $V_n$; 2) the defining binary sequence of the node $V_n$; and 3) contents of the clipboard at the node $V_n$. $BU_0$ contains the label of the level S root node, the contents of the clipboard at level S, and the S long binary sequence that defines the S-tree root. When moving from node A on level N to node B on level N+1, $BU_N$ is loaded with the label A, the binary sequence that defines A, and the contents of the clipboard at node A. The sequence allows retracing the tree and also tracking of clipboard data and binary sequences. The backup sequence is used in touring the tree. In another embodiment that uses more memory but perhaps saves some time, the predecessor of a node N is stored in an additional field in TD(A).

In practical applications, the trees are generally larger than in the illustrative model. In the model, an S-tree has a root on level 4 of the main tree and a K-tree has a root on level 7 of the main tree, equivalent to level 3 of the S-tree. Four K-trees are illustrated in the model. Referring to FIG. 3D, $KT_1$ conveniently denotes the K-tree with root node 302, $KT_2$ denotes the K-tree with root node 318, $KT_3$ denotes the K-tree with root node at 330, and $KT_4$ denotes the K-tree with root node at 332. In the illustrative example of FIG. 3E, $KT_1$ and $KT_2$ are stored in K-bank 380, which is arbitrarily designated to be $KB_W$, while $KT_3$ and $KT_4$ are stored in K-bank 382, arbitrarily designated by $KB_X$. One of the processors is assigned the task of loading the K-tree directory and the K-banks associated with the S-tree illustrated in FIG. 3D. The method of touring the sub-tree 300, illustrated in FIG. 3D, follows the left-hand rule. S-tree 300 is denoted by $T_S$. The left-hand rule is named because holding the left hand against the edge enables a complete tour of the tree. The root 320 of the S-tree $T_S$ is defined by an S long binary sequence of zeros and ones denoted by $\{b_0, b_1, \ldots, b_{S-1}\}$. The process of loading the portion of the level K directory at addresses with leading address bits $\{b_0, b_1, \ldots, b_{S-1}\}$ includes the steps of following the arrows. The tour begins by branching to the left for three steps, using the contents of the memory at the nodes, to the level K node 302. Because node 302 is on level K, when node 302 is reached in the tour, data is placed in the K-tree directory at address $\{b_0, b_1, \ldots, b_{S-1}, 0, 0, 0\}$. A data entry in the level K directory at B has the form $\{KF(B), KBN(B), KBE(B), KO(B), KV(B), KLB(B)\}$. The data entry at address $B=\{b_0, b_1, \ldots, b_{S-1}, 0, 0, 0\}$ sets KF(B) to 1 because a K-tree is at the location, sets the K-bank number KBN(B) to W to point to $KB_W$, sets KBE(B) to 0 as the label for the root of the K-tree at node 302, and sets [KO(B), KV(B)] to the present contents of CB. The clipboard is last examined and possibly updated with the data associated with asterisk 304. KLB(B) is initialized to −1 when the level K directory is built. Therefore, the sub-tree directory entry at address $\{b_0, b_1, \ldots, b_{S-1}, 0, 0, 0\}$ is [1, W, 0, KO(B), KV(B), −1].

Figure 3E:
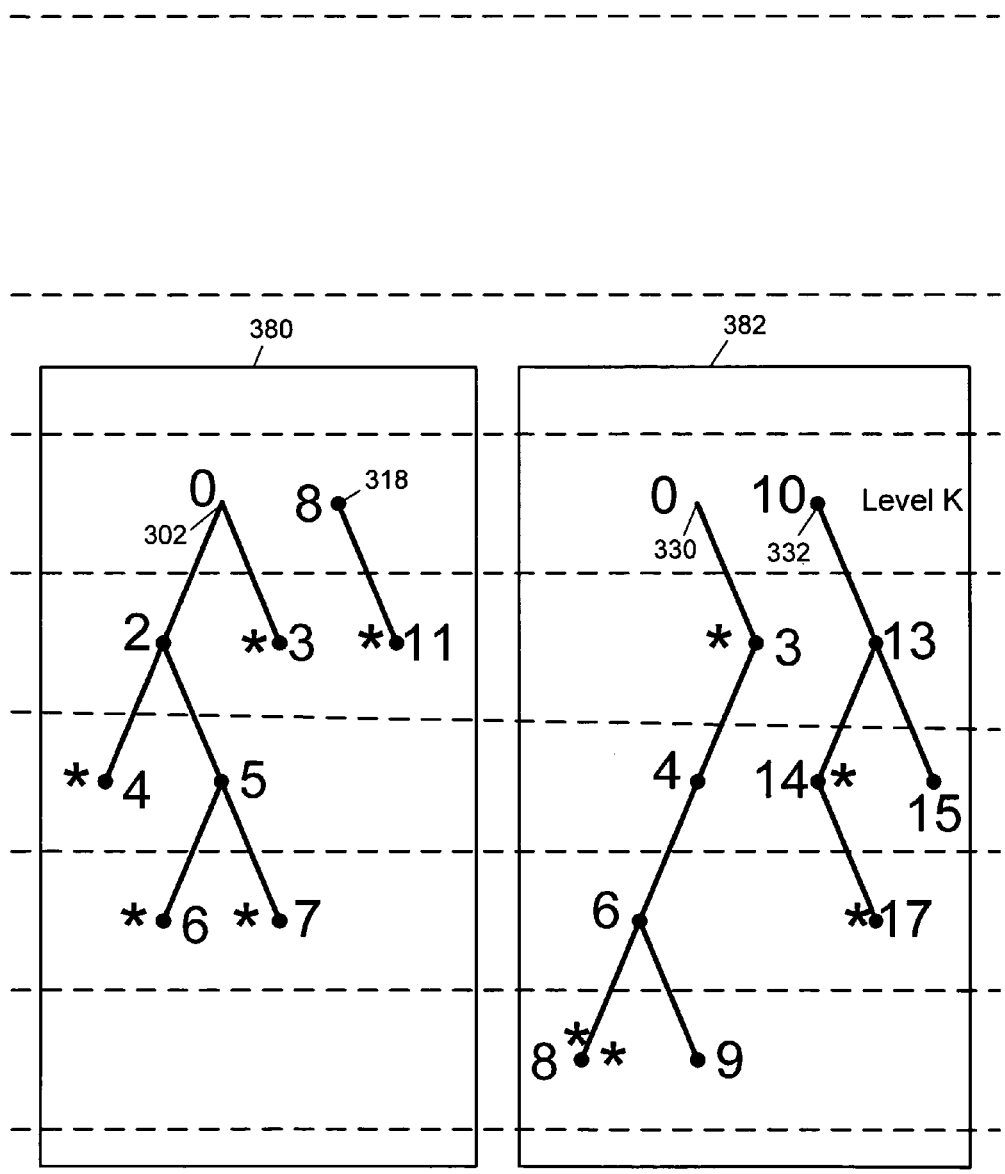

Node 302 is the root node of $KT_1$, the K-tree including edges and nodes that can be reached by branching away from node 302. The sub-tree $KT_1$ is stored in one of the K-banks. When the traversal of the tree reaches node 302, one of the K-banks 380 is chosen to hold the data stored in the sub-tree with root at 302. FIG. 3E illustrates two K-banks, a first K-bank 380 and a second K-bank 382. Associated with K-bank 380 is a list of labels, for example integers, available to be assigned to the nodes of the K-trees that are loaded into K-bank 380. No two nodes on K-trees in the same K-bank are allowed to have the same label even if the nodes are on different K-trees. A node number is chosen from the list to be the node number for node 302 that identifies node 302 in the K-bank. In the illustrative example, node 302 can be the first node to be placed in the bank and thus is assigned the label 0. Node 302 has the identifying label 6 with respect to $T_S$ as well as the identifying label 0 with respect to the K-tree with root at 302. Therefore node 302, node 6 of an S-tree as illustrated in FIG. 3C, and node 0 of a K-tree illustrated in FIG. 3E each identify the same node. The entry in S-bank memory corresponding to node 302 is $\{1, 1, TP(6), Ad(6)\}$ where the two leading ones indicate that the tree branches to the left and to the right at node 302, TP(6) is the label of node 314 in the S-tree, and Ad(6) is −1 because no asterisk is at node 302. Since node 302 is reached by three left branches from the root node of $T_S$, node 302 is identified with the K long sequence $\{b_0, b_1, \ldots, b_{S-1}, 0, 0, 0\}$.

The method of loading the tree $KT_1$ into the K-bank 380 is described assuming for simplicity that no nodes have been placed in K-bank 380. Therefore, the node located at 302 is designated by 0 in the K-tree. The K-tree with root at node 302 is traversed in the manner indicated by the arrows in FIG. 3D. As the tree is toured, the nodes are visited in the order illustrated in table 410 of FIG. 4A. In FIG. 4A, the node labels and associated binary sequences relative to the $KT_1$ root node 302 are also listed.

The main tree binary sequence corresponding to node 314 is $\{b_0, b_1, \ldots, b_{S-1}, 0, 0, 0, 0\}$. Relative to the K-tree $KT_1$, the node located at 302 is at level 0 and has the label 0. FIG. 3E shows the K-tree $KT_1$ labels. FIG. 4A shows the tree $KT_1$ labels with associated binary sequences, associated nodes of $KT_1$, and the K-tree memory for $KT_1$. The tour produces four entries in the K-bank routing table. Entries are pointed to by the Ad field in the K-tree memory. The Val field for a node N in the routing table is computed using the level of node N relative to the entire tree with root node on level zero. For example, the first entry in the routing table corresponds to node 312 of FIG. 3D. The node has label 9 on the S tree and label 3 on the K-tree and is on level 8 of the main tree. A message with leading eight bits $\{b_0, b_1, \ldots, b_{S-1}, 0, 0, 0, 1\}$ can reach the target destination in 5 hops through output port 4. Given $C_1$=100 and $C_2$=50, the node has an associated Val=100−5−8/50=94.84.

By continuing to retrace steps on the tour, the process moves from node 302 to 324. Node 324 has no branch extending to the right. Therefore, no K-long binary sequences $\{b_0, b_1, \ldots, b_{S-1}, 0, 0, 1\}$ are reachable in the tree. The K-tree directory entry at sequence $\{b_0, b_1, \ldots, b_{S-1}, 0, 0, 1\}$ is (0, 0, 0, Opt, Val, −1), where the first 0 indicates that no K-tree is at node $\{b_0, b_1, \ldots, b_{S-1}, 0, 0, 1\}$ and the (Opt, Val) pair are the contents of the clipboard at node 324. To retrace steps in the tree, all of the node information including the contents of the clipboard is saved for each node in the bridge from the S-tree root to the current node on the tour. The next entries into the directory occur at address $\{b_0, b_1, \ldots, b_{S-1}, 0, 1, 0\}$ which correspond to the level K node 318 and at address $\{b_0, b_1, \ldots, b_{S-1}, 0, 1, 1\}$ with no corresponding level K node.

The tour continues to retrace steps toward the root 320 then away from the root to node 322. Since both LF and RF are zero at node 322 no level K nodes have associated binary sequences beginning with $\{b_0, b_1, \ldots, b_{S-1}, 1, 0\}$. The directory entries at $\{b_0, b_1, \ldots, b_{S-1}, 1, 0, 0\}$ and $\{b_0, b_1, \ldots, b_{S-1}, 1, 0, 1\}$ are both set to (0, 0, 0, Opt, Val) with Opt and Val being the contents of CB at node 322. Node 322 points to a routing table entry so that the contents of CB at node 322 is either the routing table entry pointed to by node 322 or the contents of the clipboard at node 320. In embodiments utilizing Low banks, the two directory entries are set to (0, 0, 0, Opt, Val, −1). Use of the final variable is described the discussion of Low Banks. Nodes on level K−1 with one flag set to 0 cause one entry in the sub-tree directory to be filled. Nodes on level K−1 with two flags set to 0 cause two entries in the sub-tree directory to be filled. Nodes on level K−n with both flags set to zero cause $2^n$ sub-tree directory entries to be filled with the same value. The entries have the form (0, 0, 0, Opt, Val), where the (Opt, Val) pairs are the contents of CB at the node with the two flags set to zero. Nodes on level K-n with only one flag set to zero cause $(1/2) \cdot 2^n = 2^{n-1}$ identical entries in the sub-tree directory. The above example serves as an outline and introduction to the formal definition of the algorithm for filling the level K directory by touring the S-trees.

The algorithm for filling in the level K directory is defined using the functions Bin(X), LBin(X), and RBin(X). For each S-tree node X of the main tree, Bin(X) denotes the binary sequence associated with X. Bin(X) denotes the binary sequence in the main tree that defines X. For the node X on level L, Bin(X) has the form:

$$Bin(X) = \{b_0(X), b_1(X), \ldots, b_{L-1}(X)\}.$$

For each S-tree node X on level L with L<K, LBin(X) denotes all K long binary sequences beginning with the binary sequence $\{b_0(X), b_1(X), \ldots, b_{L-1}(X), 0\}$. That is to say, LBin(X) denotes the set including all of the K long binary sequences of the form $\{b_0(X), b_1(X), \ldots, b_{L-1}(X), 0, b_{L+1}, b_{L+2}, \ldots, b_{K-1}\}$. Similarly, RBin(X) denotes the set including the K long binary sequences of the form $\{b_0(X), b_1(X), \ldots, b_{L-1}(X), 1, b_{L+1}, b_{L+2}, \ldots, b_{K+1}\}$.

Accordingly, for X on level L with L<K $$LBin(X) = \text{All } \{b_0(X), b_1(X), \ldots, b_{L-1}(X), 0, b_{L+1}, b_{L+2}, \ldots, b_{K+1}\}.$$

$$RBin(X) = \text{All } \{b_0(X), b_1(X), \ldots, b_{L-1}(X), 1, b_{L+1}, b_{L+2}, \ldots, b_{K+1}\}.$$

The algorithm for filling in the level K directory involves touring the S-tree using the left-hand rule. At each node Y of the tour, some information is kept in temporary storage including the nodes of the bridge from the root of the S-tree to Y and, for each node Z of the bridge, Clip(Z)=[CO(Z), CV(Z)] and the defining binary sequence of Z.

During the tour:
When moving from a node Y on level L−1 to a node X on level L with L<K and LF(X)=0 and RF(X)=1, {0, 0, 0, CO(X), CV(X), −1} is written to all of the level K directory locations with addresses in LBin(X).

When moving from a node Y on level L−1 to a node X on level L with L<K and LF(X)=RF(X)=0, {0, 0, 0, CO(X), CV(X), −1} is written to all of the level K directory locations with addresses in LBin(X) and also to all of the level K directory locations with addresses in RBin(X).

When moving from a node Y on level L+1 to a node X on level L with L<K and RF(X)=0 and LF(X)=1, {0, 0, 0, CO(X), CV(X), −1} is written to all of the level K directory locations with addresses in RBin(X).

When moving from a node Y on level K−1 to a node X on level K and both LF(X) and RF(X) equal 0, the value {0, 0, 0, 0, CO(X), CV(X), −1} is written to the level K directory location with address Bin(X).

When moving from a node Y on level K−1 to a node X on level K and at least one of LF(X) and RF(X) equals 1, the value {1, KBN(X), KBE(X), CO(X), CV(X)} with KBN(X) an available K-bank number and KBE(X) and available node label in $KB_{KBN(X)}$ is written to the level K directory location with address Bin(X).

Applying the algorithm to an S-tree with the binary sequence $\{b_0, b_1, \ldots, b_{S-1}\}$ defining the root, all level K directory locations with addresses beginning $\{b_0, b_1, \ldots, b_{S-1}\}$ are filled. As a consequence of using the tour process, the level K directory entries are generated sequentially such that if an entry X is generated before an entry Y, then the address of X is less than the address of Y. The level K directory is filled sequentially beginning at $\{b_0, b_1, \ldots, b_{S-1}, 0, 0, \ldots, 0\}$ on level K and proceeding to $\{b_0, b_1, \ldots, b_{S-1}, 1, 1, \ldots, 1\}$ on level K. To build the entire level K directory, the algorithm is applied to all S-trees. An S-tree with the binary sequence $\{b_0, b_1, \ldots, b_{S-1}\}$ defining a root determines only those members of the level K directory having addresses beginning with $\{b_0, b_1, \ldots, b_{S-1}\}$. Therefore, if the level K is divided into $2^s$ banks that can be accessed independently, then the level K directory can be built in parallel using up to $2^S$ processors.

In FIG. 3C, four sub-trees (K-trees) have roots on level K. The roots are located at nodes 6, 24, 12 and 13. FIG. 3E illustrates two K-banks. Each of the two K-banks holds two K-trees. The labels W and X are used to set K-bank 380 to $KB_W$ and to set K-bank 382 to $KB_X$. Node 302 on level K has label 6 in FIG. 3C and is associated with the K-long binary sequence $(b_0, b_1, \ldots, b_{S-1}, 0, 0, 0)$. Contents of the level K directory at address $(b_0, b_1, \ldots, b_{S-1}, 0, 0, 0)$ is {1, W, 0, CO(6), CV(6)}, where the leading 1 is a flag indicating the presence of a K-tree. The second entry W indicates the K-bank number holding the K-tree with root at 302. The third entry of 0 indicates the location of the K-tree within that bank and CO(6) and CV(6) are the contents of the clipboard at node 4 of FIG. 3C. Node 4 is the last possible opportunity for the value of the clipboard to be updated. Contents of the directory at address $(b_0, b_1, \ldots, b_{S-1}, 0, 1, 0)$ is {1, W, 8, CO(24), CV(24)}, where the third entry of 8 indicates the node label of the node 318 in $KB_W$ and the CO(24) and CV(24) values are the contents of the clipboard at node 320. Content of the clipboard at node 320 can be (−1, −1). Node 318 has label 24 in the S-tree and label 8 in the K-tree.

FIG. 4B shows the S-tree memory holding the S-tree with root node 320 illustrated in FIG. 3C. FIG. 4A shows the K-tree memory holding the K-tree with root node 302 illustrated in bank 380 of FIG. 3E. Routing tables of FIG. 4A and FIG. 4B illustrate the translation of pointers from the S-tree memory to the K-tree memory. Node 22 of FIG. 3C is an example of the pointer structures. The S-tree memory of FIG. 4B indicates that node 22 points to line 7 in the routing table associated with the S-tree. Line 7 associates an (Opt, Val) pair (0, 95.82) with node 22. Node 4 of the K-tree has a root at 302. Node 4 of the K-tree is node 22 of the S-tree. In the K-tree memory illustrated in FIG. 4A, node 4 points to line 2 in the K-tree routing table, which associates the same (Opt, Val) pair (0, 95.82) with node 4.

An Algorithm for a Left-Hand-Rule Tour of a Sub-Tree

In the last section, FIG. 3D illustrated an example of a left hand tour of the main tree. The present section presents a general method for performing a tour of a sub-tree using the left-hand rule. X is the root node of the sub-tree ST. X is on level L of the main tree is not an end node of the sub-tree, for example a terminal node of the main tree. The illustrative procedure identifies the sequence $SQ=(n_0, n_1, \ldots, n_E)$ of nodes visited during a left-hand-rule tour of ST. The first term of SQ is X and the last term of SQ is also X so that $n_0=n_E=X$. The steps for identifying other nodes in SQ include:

1. Examining $LF(n_0)$ and $RF(n_0)$. If both fields are set to 0, then X is an end node and the tour is complete.
2. If $LF(n_0)=1$, then $n_1=TP(n_0)$ with $n_1$ on level L+1.
3. If $LF(n_0)=0$, but $RF(n_0)=1$, then the level L+1 node $n_1=TP(n_0)+1$.
4. Defining $n_{T+1}$ by induction based on $n_T$ and $n_{T-1}$ including consideration of six cases:
   A. If the level of $n_{T-1}$ is less than the level of $n_T$ and $n_T$ is an end node, $LF(n_T)$ and $RF(n_T)$ are both set to zero, then $n_{T+1}$ is equal to $n_{T-1}$, with $n_{T+1}$ on a level one less than the level of $n_T$ and an edge exists between $n_{T+1}$ and $n_T$.
   B. The level of $n_{T-1}$ is less than the level of $n_T$ and $n_T$ is not an end node, for example at least one of $LF(n_T)$ and $RF(n_T)$ is not zero. If $LF(n_T)$ is equal to 1, then $n_{T+1}$ is equal to $TP(n_T)$. If $LF(N_T)$ is equal to 0, then $RF(N_T)$ is equal to 1 and $n_{T-1}$ is equal to $TP(n_T)+1$.
   C. If the level of $n_{T-1}$ is greater than the level of $n_T$ and $RF(n_T)$ is equal to 1, then $n_{T+1}$ is equal to $TP(n_T)+1$.
   D. If the level of $n_{T-1}$ is greater than the level of $n_T$, $RF(n_T)$ is equal to 0, and $n_T$ is not equal to X, then $n_{T+1}$ is the node on the level one less than the level of $n_T$ such that an edge of the tree exists between $n_T$ and $n_{T+1}$.
   E. If the level of $n_{T-1}$ is greater than the level of $n_T$, $RF(n_T)$ is equal to 0, and $n_T$ is equal to X, then the tour is complete and $n_T$ is equal to $n_E$ and equal to X.
   F. If the level of $n_{T-1}$ is greater than the level of $n_T$, $RF(n_T)$ is equal to 1, $n_T$ is equal to X and $n_{T-1}$ is equal to $TP(X)+1$ then the tour is complete and $n_T$ is equal to $n_E$ and equal to X.

Examples of Updating the Level K Directory and the K-trees.

Arrival of a route packet results in the updating of the routing table and may also alter the level K directory. Route packet arrival may initiate a partial tour of a tree with the partial tour potentially changing the level K directory in the manner of the complete tour to build the level K directory. Route packets are first used to add or subtract information in the routing tables and to modify the data structures pointing to the routing tables. Then the route packets are used to update the level K directory. Finally, data may cause the sending of a packet to one or more Low Bank processors, which may update data in the Low Banks. Updating of the level K directory may be accomplished by making a partial tour of the tree. The partial tour visits those tree nodes which: 1) are affected by the route packet information; 2) may affect the contents of the level K directory or 3) may affect the Low Banks. The partial tour may change some of the level K directory entries in the manner a tour building the K-tree directory changes the entries. Some examples describe the partial tour updating procedure. In an illustrative embodiment, if a routing table entry is written $\{(Opt_1, Val_1), (Opt_2, Val_2), \ldots, (Opt_X, Val_X)\}$, then $Val_1 \geq Val_n$ for all $1 \leq n \leq X$.

The database modification can result from arrival of a route packet with Opc equal to 1 and the addition of data. In a first case, the route packet points to an existing node W and the route packet (Opt, Val) pair has $Val \leq Val_1$ of the routing table entry pointed to by node W. (Opt, Val) is inserted into the list of (Opt, Val) pairs pointed to by W, but after $(Opt_1, Val_1)$, so that the list now contains X+1 items, but the directory is not changed. In a second case, the added (Opt, Val) pair is at a node W that does not point to the routing table. Node W may be an existing node or may be defined during the process. A pointer is placed at node W pointing to the new routing table entry $\{(Opt_1, Val_1)\}$, with $(Opt_1, Val_1)=(Opt, Val)$. In a third case, the node W specified by the route packet points to a routing table entry of the form $\{(Opt_1, Val_1), (Opt_2, Val_2), \ldots, (Opt_X, Val_X)\}$, with the new entry $Val > Val_1$. The new (Opt, Val) pair is added to the routing table so that the routing table has X+1 entries for node W and routing table entries are rearranged so that $(Opt_1, Val_1)$ is set to the arriving (Opt, Val) pair.

Figure 5:
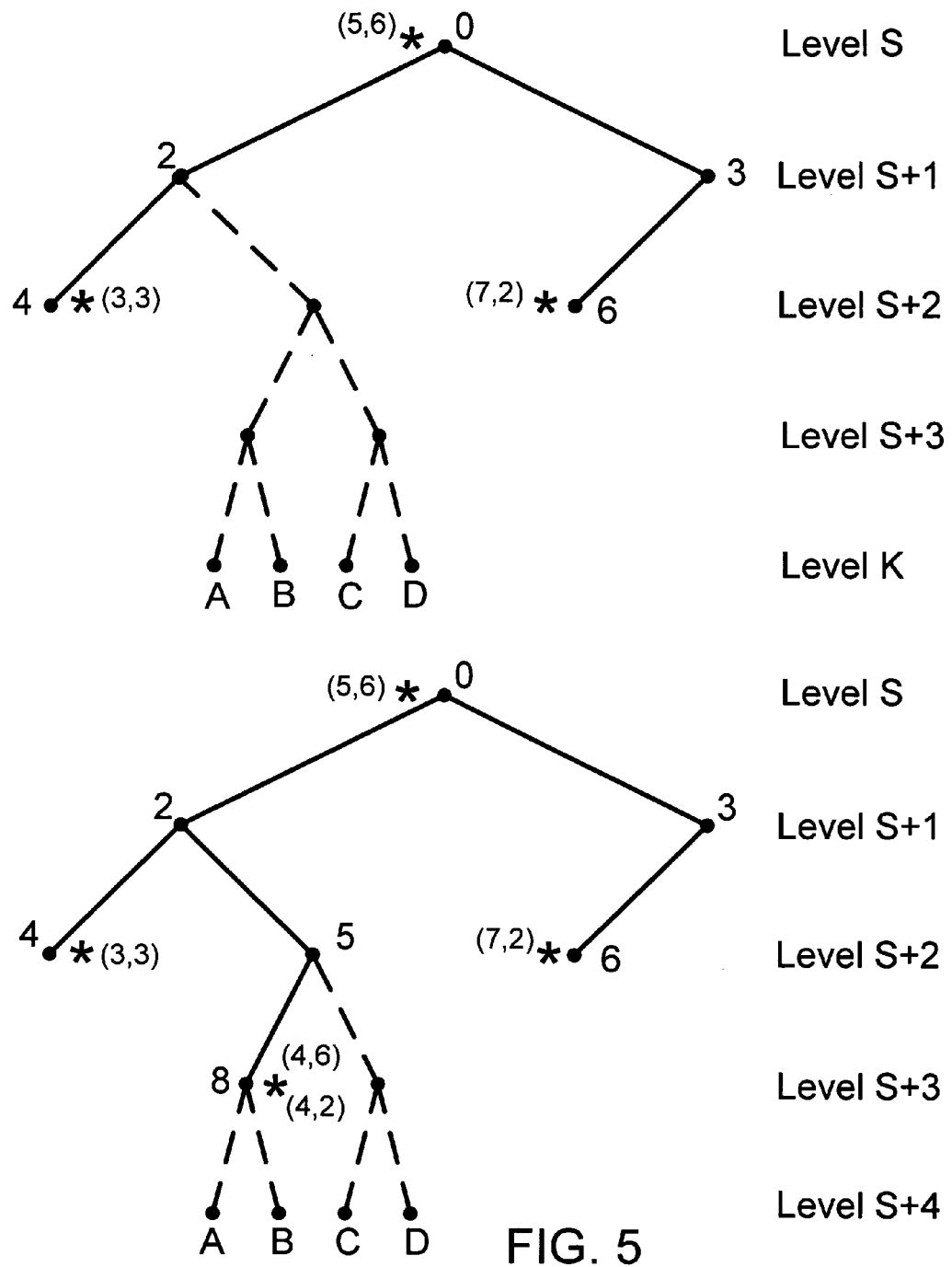
FIG. 5 is a tree diagram that illustrates the addition of nodes and branches to an S-tree.

Referring to the small five node S-tree illustrated in the upper half of FIG. 5, the pair (5, 6) at node 0 is routing table data indicating that the message packet with leading bits of $(b_0, b_1, \ldots, b_{S-1})$ can reach target in 6 hops by exiting through output port 5. Thus for node 0, the (Opt, Val) pair is (5, $94-S/C_2$). The integer pairs (3, 3) and (7, 2) also give (Opt, Hops) information associated with nodes 4 and 6 respectively. The tour that loads the level K directory proceeds from node 0 to node 2 and then to node 4. At node 4, all level K directory addresses with leading bits $(b_0, b_1, \ldots, b_{S-1}, 0, 0)$ are filled with (Opt, Val) fields set to $(3, 97-(S+2)/C_2)$, clipboard contents at node 4. The tour continues to node 2 where the four level K directory addresses (A, B, C, D), each having S+2 level leading bits $(b_0, b_1, \ldots, b_{S-1}, 0, 1)$, are filled with (Opt, Val) fields set to $(5, 94-S/C_2)$, clipboard contents at node 2.

Referring again to the upper half of FIG. 5, a first route packet arrives with $Seq=(b_0, b_1, \ldots, b_{S-1}, 0, 1, 0, \ldots, b_{Nmax})$, Sig=S+3, (Opt, Hops)=(4, 6) so that (Opt, Val)=(4, $94-(S+3)/C_2$), and Opc is equal to 1 indicating that the route packet adds data to the tree. The packet adds node 5 and node 8 to the tree as illustrated in lower half of FIG. 5, and the (Opt, Val) at node 8 is (4, $94-(S+3)/C_2$). The level K directory entries A and B have (Opt, Val) fields filled with $(5, 94-S/C_2)$, clipboard contents at node 8, while the directory entries at C and D also have (Opt, Val) fields filled with $(5, 94-S/C_2)$, clipboard contents at node 5. Therefore, the first route packet addition to the data structure does not affect the level K directory. A route packet with Opc equal to 1 adds a terminal node to the tree at a level L<K, but does not alter the level K directory. A message with and IP address of the form $(b_0, b_1, \ldots, b_{S-1}, 0, 1, 0, \ldots, b_{Nmax})$ can reach destination in 6 hops by exiting either output port 5 or output port 4. In the example, output port 5 is chosen over output port 4 because the level S Val for 6 hops $(94-S/C_2)$ is greater than the level S+3 Val for 6 hops $(94-(S+3)/C_2)$. The $Sig/C_2$ term in the equation for Val ensures that route packets at different levels do not produce the same quantity for Val, simplifying updating of the Low Banks.

Referring again to the lower half of FIG. 5, a second route packet arrives with Seq equal to $(b_0, b_1, \ldots, b_{S-1}, 0, 1, 0, \ldots, b_{Nmax})$, Sig equal to S+3, (Opt, Hops) equal to (4, 2) so that (Opt, Val) is equal to (4, $98-(S+3)/C_2$), and Opc equal to 1, indicating that the route packet adds data to the tree. The packet does not add any new nodes to the tree but does change the value of the clipboard at node 8 from $(5, 94-S/C_2)$ to $(4, 98-(S+3)/C_2)$. The level K directory entries A and B have (Opt, Val) fields changed from $(5, 94-S/C_2)$, clipboard contents at nodes 0, 2 and 5, to $(4, 98-(S+3)/C_2)$, clipboard contents at node 8. Level K directory entries at C and D have (Opt, Val) fields that remain filled with $(5, 94-S/C_2)$, clipboard contents at nodes 0, 2 and 5. Addition of the second route packet to the data structure affects the level K directory. A route packet with Opc equal to 1 changes the routing table entry at a terminal node of the tree at a level L<K, altering the level K directory.

In another example of level K directory modification, a route packet RP arriving at a non-terminal node on a level less than K adds to the routing table. Proper level K directory updating uses a partial tour of the associated S-tree. Nodes visited include nodes with clipboard values that are altered by the addition. At node X on the sub-tree having a root defined by Seq and Sig of RP, $Clip_0(X)$ equal to $[CO_0(X), CV_0(X)]$ is the value of the Clip function at X prior to making the change specified by the route packet RP and Clip(X) equal to [CO(X), CV(X)] is the value of the Clip function at X after making the change specified by the route packet RP. The partial tour visits nodes X where $Clip_0(X)$ is not equal to Clip(X).

Figure 3F:
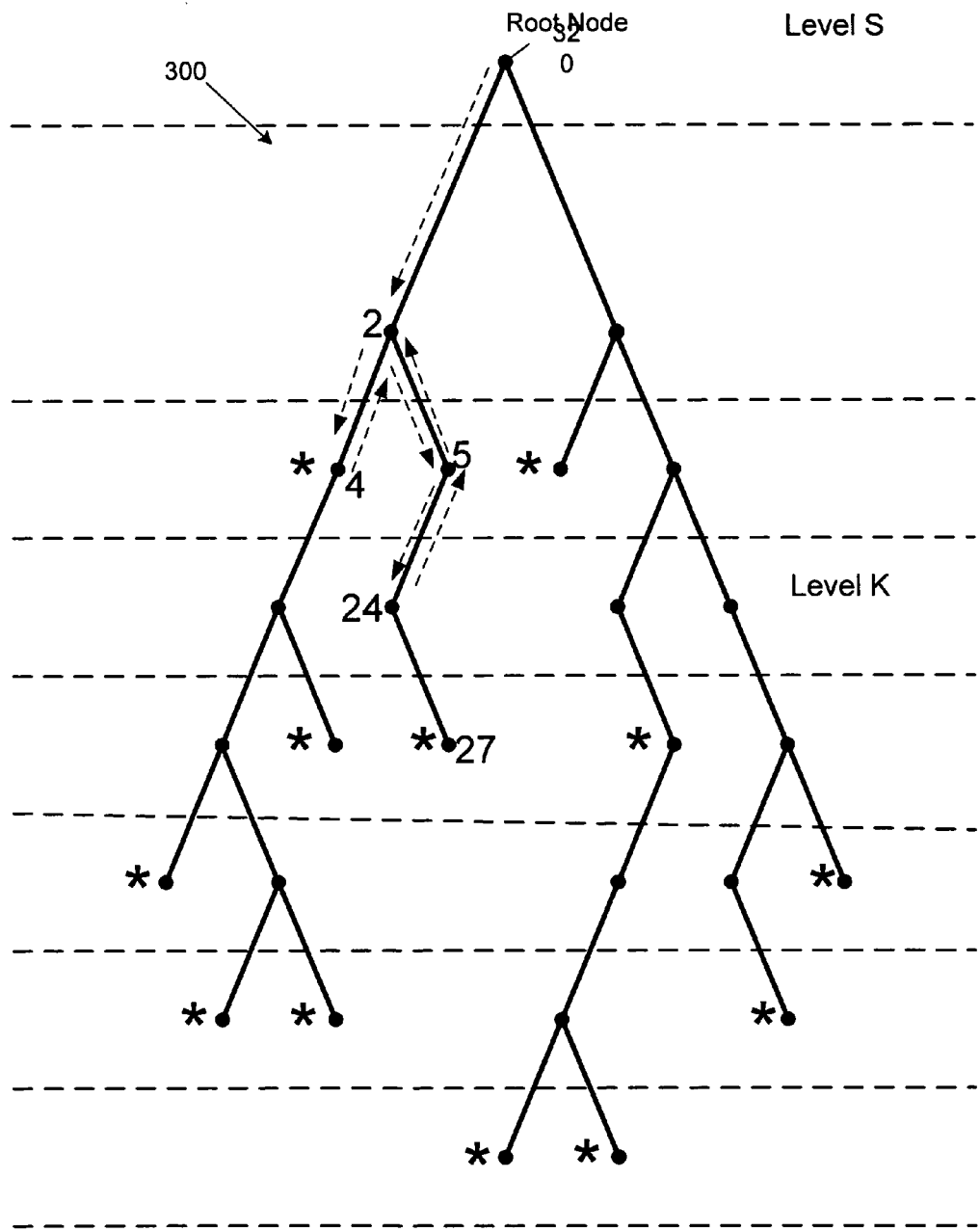

FIG. 4B illustrates S-tree memory and the associated routing table corresponding to the S-tree illustrated in FIG. 3C. For ease of exposition, S is equal to 4, $C_1$ is equal to 100, and $C_2$ is equal to 50. The S-tree directory at address $(b_0, b_1, \ldots, b_{S-1})$ has an (Opt, Val)=(0, 89.94), and thus came from a routing table entry at level three. A first route packet RP equal to (Seq, Sig, Opt, RV, Opc) arrives at the router with Seq equal to $(b_0, b_1, \ldots, b_{S+1}, 0, 1, 0, \ldots, b_{Nmax})$, with Sig=S+1, Opt=7, RV=Hops=8, and Opc=1. Thus, Val=100−Hops−Sig/50=91.9. (Seq, Sig) pair indicates node 2 in the S-tree of FIG. 3C. FIG. 3F illustrates system updating, using backup sequence updating, based on the route packet and the resulting clipboard values illustrated in Table 1. The process includes:

1. Proceeding to the S-tree root node 320 (node 0) and referring to the level S directory to set $Clip_0(0)$ equal to (0, 89.94).
2. Moving from node 0 to node 2. The route packet adds an entry at node 2. Thus, in the S-tree memory the Ad value of node 2 changes from −1 to 13. In the routing table at address 13, (Op*, Val*) is set to (7, 91.9). Since 89.94<91.9, the addition sets Clip(2) equal to (7, 91.9) and also places an asterisk, not shown, at node 2. Since node 2 does not point to the routing table prior to the processing of the route packet, $Clip_0(2)$ and $Clip_0(0)$ are set equal to (0, 89.94).
3. Because LF(2)=1 and $Clip_0(2) \neq Clip(2)$, moving from node 2 to node 4. Since node 4 points to the routing table entry (Opt*, Val*)=(5, 93.88) and since 93.88 is greater than both $Val_0(2)$ and Val(2), both $Clip_0(4)$ and Clip(4) are updated to (5, 93.88). Since $Clip_0(4)=Clip(4)$ and since $(b_0, b_1, \ldots, b_{S-1}, 0, 0)$ is the defining sequence for node 4, no level K directory entry with leading address bits $(b_0, b_1, \ldots, b_{S-1}, 0, 0)$ is altered.
4. Since $Clip_0(4)=Clip(4)$, moving from node 4 back to node 2.
5. Since $Clip_0(2) \neq Clip(2)$, and since RF(2)=1, moving from node 2 to node 5. Since node 5 does not point to the routing table, setting $Clip_0(5)=Clip_0(2)=(0, 89.94)$ and set Clip(5)=Clip(2)=(7, 91.9).
6. Since $Clip_0(5) \neq Clip(5)$, move from node 5 to node 24. Since node 24 does not point to the routing table, setting $Clip_0(24)=Clip_0(5)=(0, 89.94)$ and setting Clip(24)=Clip(5)=(7, 91.9). Node 24 is on level K. The binary address Z of node 24 is $(b_0, b_1, \ldots, b_{S-1}, 0, 1, 0)$. Since $Clip_0(Z)=Clip_0(24) \neq Clip(Z)=Clip(24)$, LKE(Z) is modified by changing (KO(Z), KV(Z)] from $Clip_0(Z)$ to Clip(Z), so that (KO(Z), KV(Z)] changes from (0, 89.94) to (7, 91.9). When one or both of the LKE(Z) fields KO(Z) or KV(Z) is altered, as in the present case, and in addition 1) the KF(Z) is equal to 1, indicating a K-tree with root at Z, and 2) KLB(Z)≥0, indicating a Low Bank entry based on the K-tree with root at Z, then an update-low-bank packet ULB is sent to the appropriate Low Bank processor or processors. If one or more of the conditions 1) and 2) is not satisfied, then no ULB packet is sent.

7. Since nodes on a level greater than K cannot affect the level K directory, the tour ends movement away from the root node and moves back toward the route node by progressing from node 24 to node 5. Since the Tree Memory data item TD(5) field RF(5) is zero, and since $Clip_0(5)$ is not equal to Clip(5), all of the level K directory items Z in RBin(5) have a KO(Z) field set to CO(5) and a KV(Z) field set to CV(5). No K-trees are at any of these locations so the updating of the local part of the level K directory does not cause sending of an update-low-bank packet.

8. Continue using the left-hand rule to move from node 5 to node 2.

9. Since node 2 is associated with the route packet, and since a left-hand rule tour of the sub-tree with root at node 2 cannot continue, the tour terminates.

TABLE 1

| Node | $Clip_0$ | Clip |
|---|---|---|
| 0 | (0, 89.94) | — |
| 2 | (0, 89.94) | (7, 91.90) |
| 4 | (5, 93.88) | (5, 93.88) |
| 2 | (0, 89.94) | (7, 91.90) |
| 5 | (0, 89.94) | (7, 91.90) |
| 24 | (0, 89.94) | (7, 91.90) |
| 5 | (0, 89.94) | (7, 91.90) |
| 2 | (0, 89.94) | (7, 91.90) |

In the above case, a route packet with Opc=1 adds information to a non-terminal node of the tree at a level L<K, resulting in level K directory alteration.

Figure 3G:
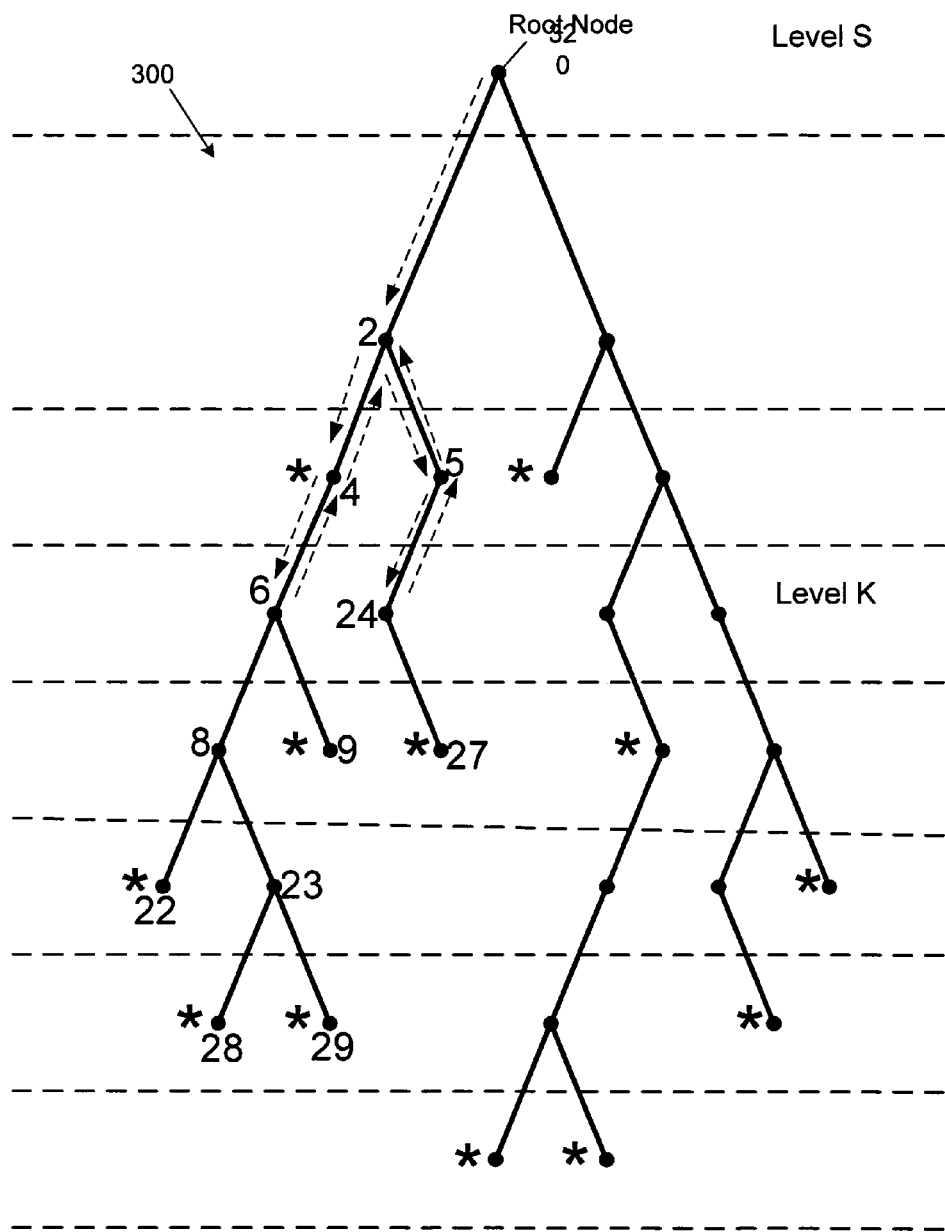

After processing the first route packet, a second route packet arrives with Seq=(b0, b1, ..., bS-1, 0, bs+1, ..., bNmax), with Sig=S+1, Opt=2, RV=Hops=4 and Opc=1. Thus Val=100−Hops−Sig/50=95.9. The clipboard values for the nodes visited during the tour are shown in Table 2. Since Clip0(4)=(5, 93.88)≠Clip(4)=(2, 95.9), the tour extends past node 4 to node 6 as illustrated in FIG. 3G. The level K directory entry at address Z1=(b0, b1, ..., bS-1, 0, 0, 0), for example node 6, is updated by changing KO(Z1) from 5 to 2 and KV(Z1) from 93.88 to 95.9. In general, when a route packet arrives, the tree memory and routing tables are updated and a tour of the affected part of the tree updates the level K directory in exactly the same way as the original filling of the level K directory. If KLB(Z)≠−1, a ULB packet is sent to the Low Bank processor. Leaving node 6, the tour then moves back to node 4, at which point the level K directory entry at address Z2=(b0, b1, ..., bS-1, 0, 0, 1) is modified by setting KO(Z2) to 2 and KV(Z2) to 95.9. Since KF(Z2)=0, no ULB packet is sent. The tour continues as before, visiting node 2, node 5 and node 24, where the level K directory at (b0, b1, ..., bS-1, 0, 1, 0) is modified. Then moving to node 5, the level K directory at (b0, b1, ..., bS-1, 0, 1, 1) is modified. Finally, the tour terminates back at node 2. Arrival of each of the two route packets causes addition to the routing table entry pointed to by node 2; however each packet causes a different tour to occur.

TABLE 2

| Node | $Clip_0$ | Clip |
|---|---|---|
| 0 | (0, 89.94) | — |
| 2 | (7, 91.90) | (2, 95.90) |
| 4 | (5, 93.88) | (2, 95.90) |
| 6 | (5, 93.88) | (2, 95.90) |
| 4 | (5, 93.88) | (2, 95.90) |
| 2 | (7, 91.90) | (2, 95.90) |
| 5 | (7, 91.90) | (2, 95.90) |
| 24 | (7, 91.90) | (2, 95.90) |
| 5 | (7, 91.90) | (2, 95.90) |
| 2 | (7, 91.90) | (2, 95.90) |

In summary, for an addition or a deletion at level N≤K, the tour visit all nodes where $Clip_0$ is not equal to Clip. In case of an addition, $CV>CV_0$, in case of a deletion, $CV \leq CV_0$.

Arrival of a route packet can cause a deletion of data from a routing table entry pointed to by a non-terminal node P. If the node P points to a data item of the form $\{(Opt_1, Val_1), (Opt_2, Val_2), \ldots, (Opt_X, Val_X)\}$ and the route packet deletes $(Opt_n, Val_n)$ with n>1, then the tour is complete and no updating of the level K-directory or of any K-tree occurs. If the route packet deletes $(Opt_1, Val_1)$ and causes a change in Clip(P), then the change may cause updating of the level K directory. For example, route packet (Seq, Sig, Opt, Rv, Opc) can have Seq=$(b_0, b_1, \ldots, b_{S-1}, 0, 0, b_{s+2}, \ldots b_{Nmax-1})$, Sig=S+2=6, Opt=4, RV=Hops=6, Opc=0. Assuming only one entry $(Opt_1, Val_1)$ in the row of the routing table pointed to by node 4, the entry and the pointer at node 4 to the routing table are eliminated. The partial tour includes:

1. Moving from node 4 to node 6 and updating the level K directory.
2. Moving from node 6 back to node 4 and updating the level K directory.
3. Completing the tour.

Figure 3H:
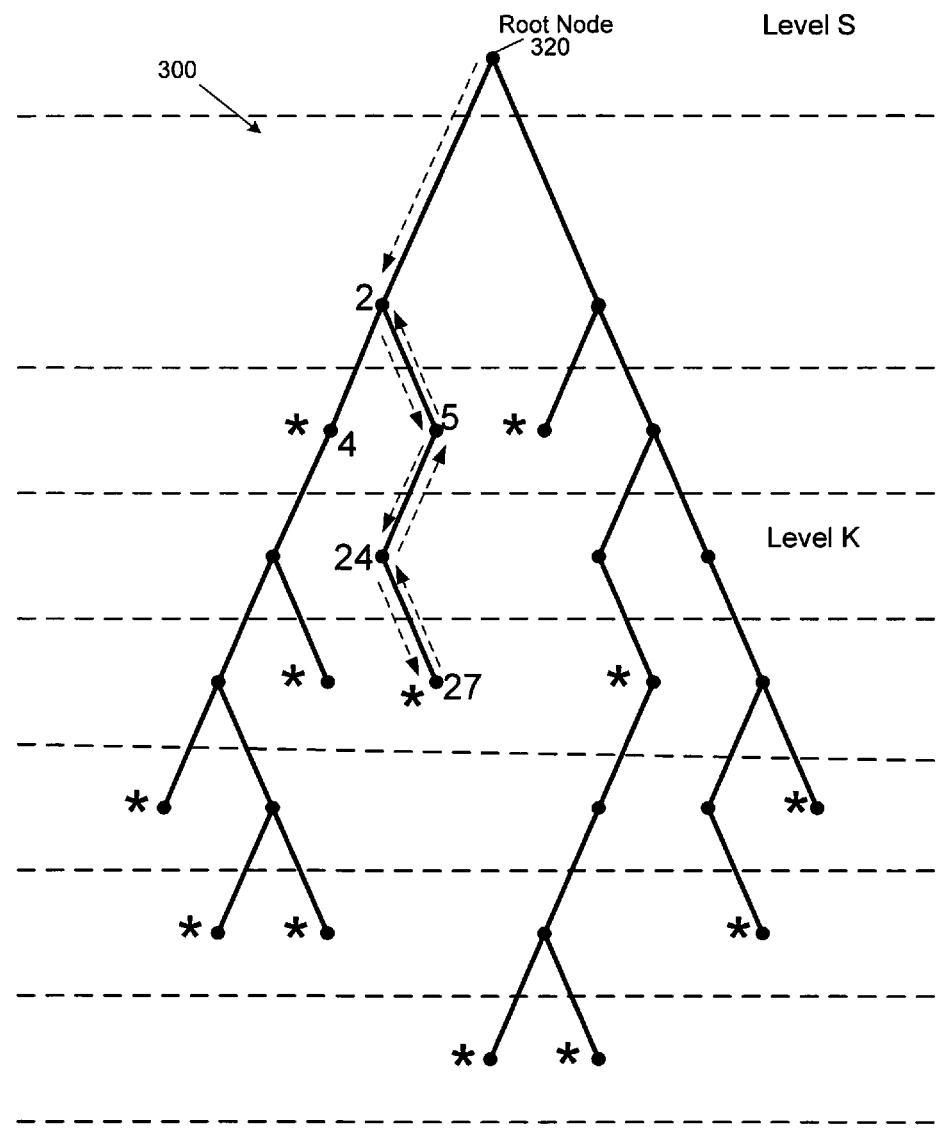
FIG. 3H and FIG. 3I illustrate the removal of nodes and edges from a tree.
Figure 3I:
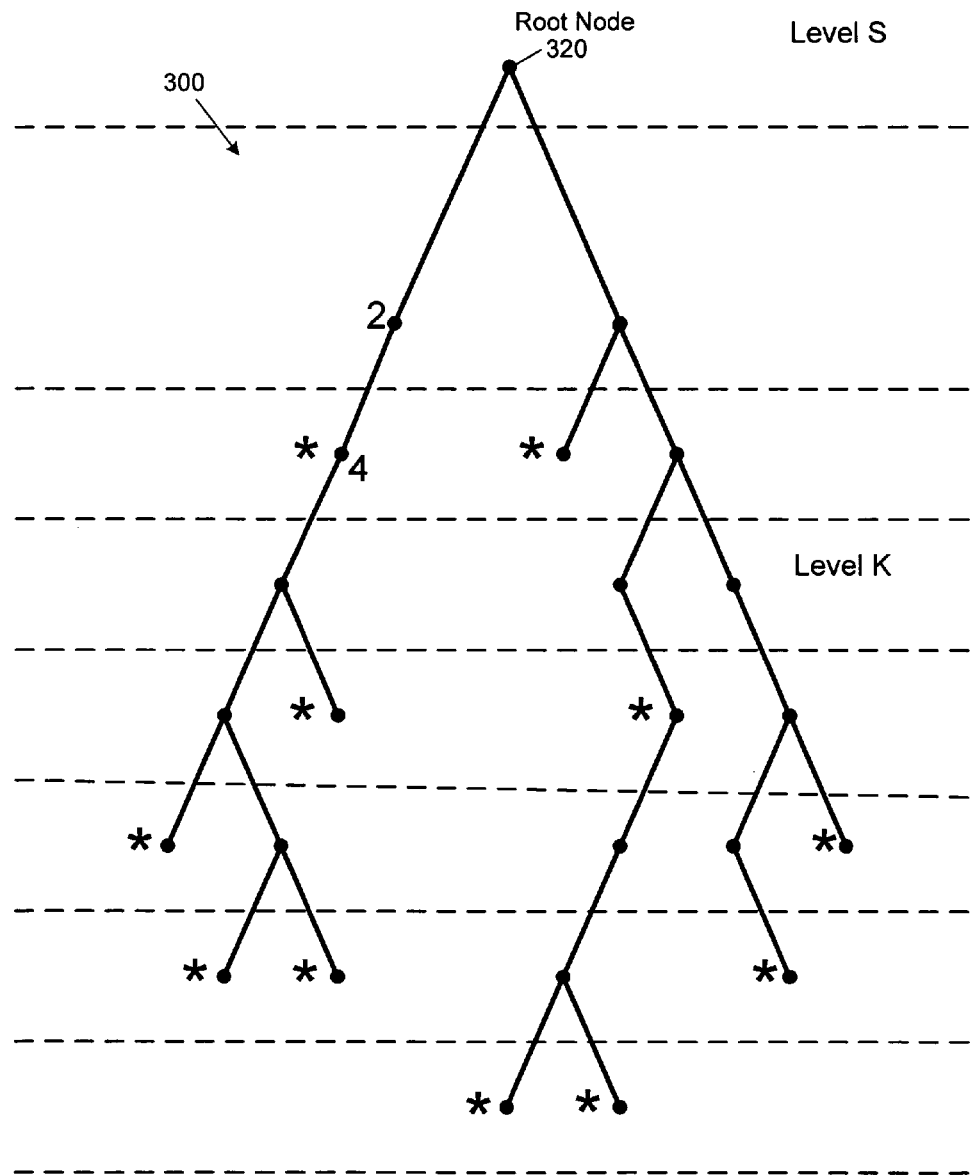

In a final example, a route packet arrives with Seq=$(b_0, b_1, \ldots, b_{S-1}, 0, 1, 0, 1, b_{S+4}, \ldots, b_{Nmax-1})$, Sig=S+4, Opt=5, Hops=4, and Opc=0, the code for deleting data from the tree. S is equal to 4. $C_1$ is equal to 100. $C_2$ is equal to 50. Thus, Val=100−Hops−Sig/$C_2$95.84. The action based on the arrival of the route packet causes a partial tour of the S-tree as shown in FIG. 3H and a possible pruning of the tree, resulting in the S-tree shown in FIG. 3I. In case the route table row pointed to by node 27 has the form $\{(Opt_1, Val_1), (Opt_2, Val_2), \ldots, (Opt_X, Val_X)\}$ with X>1 and (Opt, Val) not equal to $(Opt_1, Val_1)$, then the S-tree memory and routing table are changed, but no change to the level K directory or to the Low Banks occurs. If X is equal to 1, the tree is pruned according to the following steps:

1. Proceed to the S-tree root node 320 (node 0). Refer to the S-tree directory to set $Clip_0(0)$=(0, 89.94).
2. Move from node 0 to node 2. Since node 2 does not point to the routing table, set $Clip_0(2)=Clip_0(0)$=89.94.
3. Move from node 2 to node 5. Since node 5 does not point to the routing table, set $Clip_0(5)=Clip_0(2)$=89.94.
4. Move from node 5 to node 24. Since node 24 does not point to the routing table, set $Clip_0(24)=Clip_0(5)$=89.94.
5. Move from node 24 to node 27. If the routing table row pointed to by node 27 contains (Opt, Val) pairs other than (5, 95.84), choose the most desirable such pair on that row and set it to (Opt*, Val*) and delete the pair (5, 95.84) as specified by the route packet. If, as illustrated in FIG. 4B, (5, 95.84) is the only (Opt, Val) pair, then reset the S-tree memory for node 27 to (0, 0, 0, −1) and return the pointer value 8 to the available pointer list for routing table entries. Each terminal node in the tree points to the routing table. Removal of a terminal node's pointer to the routing table forces the removal of the node from tree. Thus, by setting S-tree memory data for node 27 to (0, 0, 0, −1), node 27 is eliminated from tree. Since the backup sequence indicates that node 27 was a right branch from node 24, the RF flag for S-tree memory node 24 is changed to 0.

6. Use the backup sequence to return to node 24. Because LF(24)=RF(24)=0, change TP(24) from 26 to 0, which results in the S-tree memory for node 24 being set to (0, 0, 0, −1), deletion of node 24, and returning node label 26 to the available node storage area. Since node 24 is a left branch from node 5, LF(5) is set to 0.

7. Use the backup sequence to return to node 5. Because LF(5)=RF(5)=0, change TP(5) from 24 to 0, resulting in the S-tree memory for node 5 being set to (0, 0, 0, −1), deletion of node 5, and returning node label 24 to the available node storage area. Since node 5 is a right branch from node 2, RF(2) is set to 0.

8. Use the backup sequence to return to node 2. While RF(2) has been reset to 0, LF(2) remains 1, and thus node 2 is not deleted. For Z denoting the level K directory address of node 24, since node 27 is on a level L≥K+1, deletion does not affect the level K directory entries KO(Z) and KV(Z). However, because no K-tree now has a root node the directory location, KF(Z) is updated from 1 to 0 and KBN(Z) and KBE(Z) are changed to −1. If KLB(Z)≠−1, then LBP is set to KLB(Z), and ULB packet [0, LBP, RP] is sent to the Low Bank processor, or processors, and then reset KLB(Z) to −1.

The previous example of a route packet with Opc equal to 0 results in deletion of multiple nodes and edges.

The process of backing up in the above algorithm continues until a non-terminal node is reached, as in the above case, or until a node with a pointer to the routing table is encountered. In FIG. 1A, if only one (Opt, Val) pair is in the routing table for node 26, deletion of the (Opt, Val) pair at node 26 deletes nodes 24 and 23, but does not delete node 12 because node 12 has a pointer to the routing table.

A route packet that causes a deletion at a non-terminal node can change the level K directory and the Low Bank memories, but cannot add or delete nodes or edges. As illustrated in FIG. 3C in conjunction with FIG. 4B, for example, removing the routing table pointer from the node 4 entry in the S-tree causes a tour that changes the level K directory entry at address $Z=(b_0, b_1, \ldots, b_S, 0, 0, 1)$ so that [KO(Z), KV(Z)] is changed from (5, 93.88) to the clipboard contents at the root node.

An Algorithm for a Left-Hand-Rule Partial Tour of a Sub-Tree

FIG. 3D illustrates an example of touring a sub tree to load the level K directory. FIG. 3F, depicting examples of restricted sub-tree partial tours to update the level K directory, shows end nodes 4 and 24 as terminal nodes of the sub-tree but not terminal nodes of the main tree. An end node is defined as a terminal node. In a general method for performing a restricted tour, the end node is redefined to limit the tour scope. For the present tour, a node $n_T$ is an end node so long as at least one of the following three conditions is satisfied: 1) $n_T$ is a terminal node of the main tree (LF($n_T$) and RF($n_T$) are both set to zero); 2) $n_T$ is on level K; or 3) Clip($n_T$)=Clip$_0$($n_T$).

An example shows a method for performing a sub-tree partial tour using the left-hand-rule. The algorithm for the sub-tree partial tour can be identical to the algorithm for the entire tour except a different meaning can be ascribed for "end" node. If X is the root node of the sub-tree ST, node X is on level L of the main tree is not an end node of the sub-tree. To identify the sequence SQ=($n_0, n_1, \ldots, n_E$) of nodes visited during a left-hand-rule tour of ST, the first term and last term of SQ is X so that $n_0=n_E=X$, and the steps used to identify the other nodes in SQ are:

1. Begin by examining LF($n_0$) and RF($n_0$). If both fields are set to 0, then X is an end node and the tour is complete.
2. If LF($n_0$)=1, then $n_1$=TP($n_0$) with $n_1$ on level L+1.
3. If LF($n_0$)=0, but RF($n_0$)=1, then level L+1 node $n_1$=TP($n_0$)+1.
4. An inductive step of defining $n_{T+1}$ based on $n_T$ and $n_{T-1}$ considers six cases:
   A. If the level of $n_{T-1}$ is less than the level of $n_T$, $n_T$ is an end node, and LF($n_T$) and RF($n_T$) are both set to zero, then $n_{T+1}=n_{T-1}$ so that $n_{T+1}$ is on a level one less than the level of $n_T$ and an edge is between $n_{T+1}$ and $n_T$.
   B. If the level of $n_{T-1}$ is less than the level of $n_T$, $n_T$ is not an end node so that at least one of LF($n_T$) and RF($n_T$) is not zero), and LF($n_T$)=1, then $n_{T+1}$=TP($n_T$). If LF($n_T$)=0, then RF($n_T$)=1 and $n_{T+1}$=TP($N_T$)+1.
   C. If the level of $n_{T-1}$ is greater than the level of $n_T$ and RF($n_T$)=1, then $n_{T+1}$=TP($n_T$)+1.
   D. If the level of $n_{T-1}$ is greater than the level of $n_T$, RF($n_T$)=0, and $n_T$≠X, then $n_{T-1}$ is the node on the level one less than the level of $n_T$ such that an edge of the tree is between $n_T$ and $n_{T+1}$.
   E. If the level of $n_{T-1}$ is greater than the level of $n_T$, RF($n_T$)=0, and $n_T$=X, then the tour is complete and $n_T=n_E=X$.
   F. If the level of $n_{T-1}$ is greater than the level of nT, RF($n_T$)=1, $n_T$=X and $n_{T-1}$=TP(X)+1, then the tour is complete and $n_T=n_E=X$.

Algorithm for Updating the Level K Directory and the K-Trees

Examples in the previous section illustrating the method of updating the data structures based on the arrival of a route packet are extended to a general algorithm description. As in the examples, the updating begins with arrival of a route packet and involves touring the tree portion that may cause an updating of the level K directory or of a K-tree or both and, as a consequence, may also update the low banks. Low bank updating is covered in a separate section.

A first tour of the entire S-tree made prior to the arrival of the route packet produces a set of values for the clipboard function Clip. The function Clip$_0$ is defined to be identical to the function Clip that would be produced during the tour prior to the arrival of the route packet. The notation for Clip$_0$ at node t is Clip$_0$(t)=[CO$_0$(t), CV$_0$(t)]. Route packet arrival causes a routing table entry change at a location pointed to by a node X, specified by the Seq/Sig pair in the route packet. After the change in the routing table entry, a second tour of the tree produces the Clip function to reflect the current status of the tree. At each node t, Clip(t)=[CO(t), CV(t)]. By the end of the second tour, the two clipboard functions Clip$_0$(t) and Clip(t) are defined. The algorithm can update the directories by making a partial tour of the S-tree, visiting nodes t where Clip(t)≠Clip$_0$(t), for example either CO(t)≠CO$_0$(t) or CV(t)≠CV$_0$(t) or both. The partial tour can be made without computing or storing all the values of the functions Clip$_0$ and Clip. Functions Clip$_0$(X) and Clip(X) can be defined with respect to a route packet RP. If Y is the node defined by Seq and Sig of RP, X is a node on the bridge to Y, and X is on a level less than Sig, then Clip$_0$(X)=[CO$_0$(X), CV$_0$(X)] is the value on the clipboard at X. If X is a node on the sub-tree with root node Y, then Clip$_0$(X)=[CO$_0$(X), CV$_0$(X)] is the value on the clipboard at X before processing RP, and Clip(X)=[CO(X), CV(X)] is the value on the clipboard at X after processing RP. Only $Clip_0(Q)$ and Clip(Q) are stored for the nodes Q in the bridge from the root to the node presently visited in the partial tour.

The updating process is triggered by arrival of a route packet RP of the form (Seq, Sig, Opt, RV, Opc). First, an appropriate Val from RV is derived. If RV is the number of hops to the destination, then one appropriate definition previously used is Val=[$C_1$-RV-(Sig/$C_2$)]. B={$b_0$, $b_1$, . . . , $B_{Sig-1}$} denotes the binary sequence defined by Seq and Sig. Node X is denoted by the main tree node that is defined by the sequence B. In a main tree partial tour, if node X is on a level L and L is less than S, then partial tours may be in a plurality of S-trees and include the root node of each partially toured S-tree. If X is on a level L and S≤L<K, then the tour begins on level S. In an illustrative embodiment, the tour begins at the root of the main tree and travels along a bridge sequence $V_0$, $V_1$, . . . , $V_L$ to X, with $V_0$ being the main tree root and $V_L$ being X. In a more efficient embodiment discussed hereinafter, the tour can begin on a level different from 0. A backup sequence $BU_0$, $BU_1$, . . . is maintained throughout. Tree traversing to node X may cause several nodes, including X, to be added to the tree. When the tour from the root reaches node X, whether node X is a terminal node, for example LF(X)=RF(X)=0, is noted. Three cases are examined: 1) node X is a non-terminal node; 2) data is added and node X is a terminal node; and 3) data is deleted and node X is a terminal node.

Case 1: When adding or deleting data at a non-terminal node X, the tour first proceeds from the root node to node X. The routing table is then updated. For data addition to the routing table, a pointer from X to the routing table is added if the pointer is previously undefined. For data deletion from the routing table, if the only data item pointed to by X is deleted, then the pointer from X to the routing table is removed. If the level L of node X is K or greater, then the tour terminates and the K-banks are not updated. However, Low Banks are updated in some conditions. To determine if an update-low-bank packet is sent, $V_K$ is set to the level K node on the bridge to X and Z is set to Bin($V_K$). If Clip(X)≠ $Clip_0$(X) and KLB (Z)≥0, then an update-low-bank packet is sent. If one or both conditions are not satisfied, then no update-low-bank packet is sent. If L<K, then in some conditions, the tour continues. If Clip(X)=$Clip_0$(X), then the tour terminates at X. If Clip(X)≠ $Clip_0$(X), then a partial left-hand-tour of the sub-tree with root at X is made, with Step 3 conditions on $n_T$ changed so that at least one of the following conditions is satisfied: 1) $n_T$ is a terminal node; 2) $n_T$ is on level K; or 3) Clip($n_T$)=$Clip_0$($n_T$).

When X is not a terminal node, the algorithm for updating of the level K directory and the K-trees while taking the partial tour is depicted using definitions for LBin(V) and RBin(V):

For V on level L with L<K $LBin(V)$=All {$b_0(V), b_1(V), \ldots, b_{L-1}(V), 0, b_{L+1}, b_{L+2}, \ldots, b_{K-1}$} and $RBin(V)$=All {$b_0(V), b_1(V), \ldots, b_{L-1}(V), 1, b_{L+1}, b_{L+2}, \ldots, b_{K-1}$}.

When adding or deleting data at a non-terminal node, changes are made during the partial tour including:

When moving from a node U on level L-1 to a node V on level L with L<K, LF(V)=0 and RF(V)=1, {0, -1, -1, CO(V), CV(V), -1} is written to all level K directory locations with addresses in LBin(V).

When moving from a node U on level L-1 to a node V on level L with L<K and LF(V)=RF(V)=0, {0, -1, -1, CO(V), CV(V), -1} is written to all level K directory locations with addresses in LBin(V) and RBin(V).

When moving from a node U on level L+1 to a node V on level L with L<K, RF(V)=0 and LF(V)=1, {0, -1, -1, CO(V), CV(V), -1} is written to all level K directory locations with addresses in RBin(V).

When reaching a node V on level K and both LF(V) and RF(V) are equal 0, the value {0, -1, -1, CO(V), CV(V), -1} is written to the level K directory location with address Bin(V).

When reaching a node V on level K and at least one of LF(V) and RF(V) is equal to 1, Z is set to Bin(V) and the value {1, KBN(Z), KBE(Z), CO(V), CV(V), KLB(Z)}, with KBN(Z) an available K-bank number and KBE(Z) an available address within $KB_{KBN(Z)}$, is written to the level K directory location with address Bin(V).

Case 2: Data is added and X is a terminal node. The tour moves from the root node to the level L node X and node X is noted as a terminal node. Data is added to the routing table and if the node X is added to the tree, then a pointer from X to the routing table is also added.

If L>K and the process does not add a new K-tree, then the level K directory is not altered. Low Banks are updated in some conditions. To determine if an update-low-bank packet is sent, $V_K$ is set to the level K node on the bridge to X and Z is set to Bin($V_K$). If Clip(X)≠$Clip_0$(X) and KLB(Z)≥0, then an-update-low bank packet is sent. If one or both of the conditions are not satisfied, then no update-low-bank packet is sent. If the process adds a new K-tree, then R is defined to be the root of the new K-tree and Z is set to Bin(R). LKE(Z) is then modified by setting KF(Z) to 1 and choosing appropriate values for KBN(Z) and KBE(Z) from the lists of available values. For example, KO(Z), KV(Z), and KLB(Z) are not altered. Thus, LKE(Z)={1, KBN(Z), KBE(Z), KO(Z), KV(Z), -1}.

If L=K and Clip(X)=$Clip_0$(X), then the level K directory is not altered and no update-low-bank packet is sent. However if Clip(X)≠$Clip_0$(X), then Z is set to Bin(X). LKE(Z) is updated by changing KO(Z) to CO(X) and changing KV(Z) to CV(X). Other fields of LKE(Z) are unchanged. Thus, LKE(Z)={KF (Z), KBN(Z), KBE(Z), CO(X), CV(X), KLB(Z)}.

If L<K and Clip(X)=$Clip_0$(X), then the tour terminates, the level K directory is not altered, and no update-low-bank packet is sent. However, if Clip(X)≠$Clip_0$(X), then the level K directory is altered by changing KO(Z) to CO(X) and by changing KV(Z) to CV(X) for all Z in RBin(X) and also for all Z in LBin(X). All other fields of LKE(Z) are left unchanged. Thus for each Z, LKE(Z)={KF(Z), KBN(Z), KBE(Z), CO(X), CV(X), KLB(Z)}. No update-low-bank packet is sent.

Case 3: Data is deleted and the level L node X is a terminal node. The tour proceeds from the root node to node X. At node X, the process alters the routing table contents by deleting the (Opt, Val) pair of the route packet, which may cause directory updating, described hereinafter. If the node X points to a routing table entry {($Opt_1$, $Val_1$), ($Opt_2$, $Val_2$), . . . , ($Opt_Q$, $Val_Q$)} and Q is greater than 1, then the member of the sequence referred to in the route packet is eliminated from the sequence and the (Q-1) long sequence is written so that ($Opt_1$, $Val_1$) contains the member with the largest Val entry of the sequence. The tour is complete for the cases of Q>1.

If L>K, then the level K directory is not altered. However, if Clip (X)≠$Clip_0$(X) and KLB(Z)≥0, then an update-low-bank packet is sent. If one or both conditions are not satisfied, no update-low-bank packet is sent.

If L=K and Clip(X)=$Clip_0$(X), then the level K directory is not altered. However if Clip(X)≠$Clip_0$(X) then Z is set to Bin(X). LKE(Z) is updated by changing KO(Z) to CO(X) and changing KV(Z) to CV(X). Other fields of LKE(Z) are unchanged so LKE(Z)={KF(Z), KBN(Z), KBE(Z), CO(X), CV(X), KLB(Z)}. No update-low-bank packet is sent.

If L<K and Clip(X)=$Clip_0$(X), then the level K directory is not altered. However, if Clip(X)≠$Clip_0$(X), then the level K directory is altered by changing KO(Z) to CO(X) and by changing KV(Z) to CV(X) for all Z in RBin(X) and also for all Z in LBin(X). Other fields of LKE(Z) are left unchanged. Thus for each Z, LKE(Z)={KF(Z), KBN(Z), KBE(Z), CO(X), CV(X), KLB(Z)}. No update-low-bank packet is sent.

If node X is on level L and points to a routing table entry with only one member of the sequence {($Opt_1$, $Val_1$), (Opt2, $Val_2$), ..., ($Opt_Q$, $Val_Q$)} (i.e. Q=1), one or more nodes and edges are removed from the tree. The node X, the pointer from X to the routing table, and a row of the routing table are removed. The address of the row is returned to the available routing table address list. The tour proceeds to the level L−1 node $V_{L-1}$. In a first case: 1) $V_{L-1}$ does not point to a level L node Y distinct from X; and 2) $V_{L-1}$ does not have a pointer to the routing table, then $V_{L-1}$ is removed from the tree and the tour proceeds to $V_{L-2}$. In a second case one or both of the conditions 1) and 2) are not satisfied, the tour ends at a node SN, called a stop node. The process continues toward the root of the main tree until a node not satisfying both conditions is reached where the partial tour ends at a stop node SN with a level denoted by SL.

If L>K and SL≤K, then the removal of the nodes by the process causes the removal of a K-tree with root node R. Z is set to Bin(R) and LKE(Z) set to {0, −1, −1, $CO_0$(SN), $CV_0$(SN), −1}. If KLB(Z) is non-negative prior to the updating, then the low banks are updated.

If L is equal to K, then Z is set to Bin(X) and the two LKE(Z) fields KO(Z) and KV(Z) are updated so that KO(Z) is equal to $CO_0$(SN) and KV(Z) is equal to $CV_0$(SN). Other fields of LKE(Z) are unchanged. Thus, LKE(Z)={KF(Z), KBN(Z), KBE(Z), $CO_0$(SN), $CV_0$(SN), KLB(Z)}. No update-low-bank packet is sent.

If L<K, then for each Z in either LBin(X) or RBin(X) the two LKE(Z) fields KO(Z) and KV(Z) are updated so that KO(Z) is equal to $CO_0$(SN) and KV(Z) is equal to $CV_0$(SN). Other fields of LKE(Z) are unchanged. Thus for each Z, LKE(Z)={KF(Z), KBN(Z), KBE(Z), $CO_0$(SN), $CV_0$(SN), KLB(Z)}. No update-low-bank packet is sent.

An Alternate Method of Building the Tree Structure

In some embodiments, the tree structure is not updated, for example including the main tree, the S- and K-trees, the S- and K-banks, and the Low Banks. Instead, one copy of the tree structure is actively used to assign output ports for incoming messages, while information is gathered for building a complete, new copy of the tree structure. Periodically, a new tree structure is built, the active tree structure is deleted, and the new tree structure replaces the old one as the active structure for assigning output ports. The process begins again and repeats ad infinitum. In one embodiment of this type, only a subset of the route packets are used in the build process and the Val field is not retained in the final active structure. The method accelerates and simplifies both the build process and the port retrieval process.

Route packets arriving during a data collection cycle are collected and placed into the Sig-files: $SF_1$, $SF_2$, ..., $SF_{Nmax}$, where a route packet with Sig=n is placed into $SF_n$. If a route packet X arrives with Sig equal to n and $Seq_n$ of X, where $Seq_n$ denotes the first Sig=n bits of Seq, is the same as $Seq_n$ of a packet Y already in $SF_n$, then X replaces Y only if the Val field of X is greater than the Val field of Y. If not, the arriving packet Y is discarded. Thus, for each n, no two entries in $SF_n$ have the same $Seq_n$ value. Each entry in $SF_n$ has "the best" possible Val field for all packets containing $Seq_n$ that arrive during a given collection cycle.

At the end of the data collection cycle, the Sig-files are used to build the main tree as described hereinbefore. However, for each n, all of the route packets in $SF_n$ are added to the tree before any of the packets in $SF_{n+1}$, and no packet is added that fails to improve the Val field on the branch. For example, the Val field for a packet in $SF_n$ is to exceed the Val field of each packet in $SF_k$, where k<n and $Seq_k$ is the consecutive subsequence of $Seq_n$ beginning at $b_0$. The condition can be determined either by examining the appropriate members of the previous SF files or by branching away from the root node of the tree using the clipboard CB. After building the main tree, the Val field is no longer used since the method ensures that the desirability of the Opt field increases, or at least does not decrease, during branching away from the tree root node. Thus, when the elements of the tree structure are created and made active, the Val field may be eliminated.

An Embodiment with Modifications to Node Pointers

In the discussion of the main tree structure, each node A is a pointer to a date item in the Main Tree Memory which has the form:

$$TD(A)=\{LF(A), RF(A), TP(A), Ad(A)\}.$$

LF(A) and RF(A) are pointers and give information about whether a branch exists to the left or right from node A. The value 0 indicates no branch exists and the value 1 indicates that a branch does exist. In another embodiment, more information is given about the existence of a branch from node A. While LF(A) or RF(A) set to 0 still means that no branch from node A exists, more information can be given by using both 1 and −1 when a branch from node A does exist. For example, LF(A) (or RF)=1 or −1 still means that a corresponding branch from node A exists although more information is conveyed. Value 1 indicates the branch from node A exists and leads to a terminal node with a more desirable Val field. Value−1 indicates that branching from node A exists but does not lead to a more desirable Val field. Thus, the technique can avoid searching branches of the tree that cannot improve the final results.

Storing the K-banks in Processor in Memory (PIM) Chips.

In disclosed embodiments can store S-banks in random access memory with a separate processor associated with each bank of memory, enabling S-tree, level K directory, and K-bank updates in parallel. The S-trees are not used to look up an output port for an arriving message, but only to update the level K directory and the K-trees. In contrasting embodiments, K-trees are used to look up output ports for arriving messages and, therefore, the speed of tree traversal can be important. If the K-banks are kept below a predetermined size, the processor that updates and uses the K-banks can be placed on the same chip as the memory bank, enabling an efficient and very fast processor that performs only simple operations, for example no floating point arithmetic, and can have a high-bandwidth, low-latency interconnect to the memory on the chip. Since the input/output (I/O) on and off the chip is low, the design conserves power. The number of processor operations can be limited by the number of levels in the K-tree so that the time for a single lookup is bounded.

If the S-tree processor is updating an S-tree and a level K node X is encountered where X is the root node of a K-tree, then the S-tree processor can assign the task of updating the K-tree with root at X to a PIM module. Thus the S-tree processor can continue a tour of nodes on levels not exceeding K.

In a second embodiment of a PIM chip design, a separate processor can be allocated for each level of the K-tree and the node data for each level is kept in a separate memory space. At each step, the processor at a level N accesses the data at level N, updates the clipboard as appropriate, and finds the address of the level N+1 node that is next visited on the tour. The level N+1 address and the clipboard contents are passed to the level N+1 processor. The design, at a particular time, enables a plurality of processors to process data.

An Embodiment without Separate Memory for the K-Trees

In embodiments that do not employ PIM chip architecture, the K-trees can be stored in separate or shared memory banks. In the embodiment, at an address X, the level K directory stores −1 if no K-tree has a root node defined by X. If a K-tree does have a root R defined by Bin(X), then the level K directory stores node R instead of storing the K-bank number and location of the root of the K-tree within that K-bank. The embodiment without separate memory for the K-trees is most appropriate in embodiments employing additional level directories.

An Embodiment with Additional Level Directories

The embodiments disclosed hereinbefore have two directories, one at level S and one at level K. The S-trees are built on level S and are used to build and update the level K directory. Similarly, the K-trees are built on level K and can be used to build and update a directory on a level M, with K<M≤NMax. Fewer than $2^M$ entries can be stored to accommodate the entire level M directory. Storage of only a portion of the $2^M$ entries is enabled by an indirect addressing scheme using a variant of the level K directory. In a simple embodiment, the number of banks Q of the level M directory is equal to the number of K trees. The amount of data in each of the banks is $2^{M-K}$. The level M directory banks are denoted by:

$$MB_0, MB_1, \ldots, MB_{Q-1}.$$

When the level M directory is used, the level K directory is replaced with a slightly modified directory referred to as the K* directory. The two fields KBN(Z) and KBE(Z) of the level K directory entry at Z are replaced by a single field MBN(Z) of the K* directory at Z. The field MBN(Z) points to a bank $MB_{MBN(Z)}$ of the level M directory. The K* directory entry with address the K long binary sequence Z is written:

$$K^*(Z) = \{KF(Z), MBN(Z), KO(Z), KV(Z)\}.$$

Several types of directories can be built at level M. If, in a first case, M is equal to Nmax, then the level M directory simply returns the output port number. If, in a second case, M<Nmax and no additional directory is further from the root than M, then the level M directory can return data of the same form as the level K directory. If, in a third case, yet another directory is at a level greater than M, then the directory on level M can return data in the same form as K*. The method of constructing the level M directory is consistent with the second case. One with ordinary skill in the art can construct similar directories for cases one and three.

In an example of an indirect addressing scheme into the level M directory, P can be an Internet Protocol address, an Nmax long binary sequence $\{b_0, b_1, \ldots, b_{Nmax-1}\}$, in the header of a message packet entering the router. The first K bits of P form a K-long binary sequence $Z = \{b_0, b_1, \ldots, b_{K-1}\}$ that is used as an address into the K* directory. In case K* returns a data item with first field KF(Z) set to 0, then the process is complete and the entering message is targeted for output port KO(Z). In case K* returns a data item with the first field KF(Z)=1, then the second field of K* is MBN(Z), which signifies that the data bank $MB_{MBN(Z)}$ of the level M directory contains the information to locate the target output port of the message packet with IP address $\{b_0, b_1, \ldots, b_{Nmax-1}\}$. The location in the level M directory containing information to obtain the output port for the message packet is in level M directory bank $MB_{MBN(Z)}$ at address $\{b_K, b_{K+1}, \ldots, b_{M-1}\}$. Writing $$Z^* = [MBN(Z), \{b_K, b_{K+1}, \ldots, b_{M-1}\}]$$

and setting $$LME(Z^*) = \{MF(Z^*), MBN(Z^*), MBE(Z^*), MO(Z^*), MV(Z^*)\}.$$

The first field MF(Z*) is a flag that is set to 1 provided that a non-terminal, main-tree node X is defined by $\{b_0, b_1, \ldots, b_K, b_{K+1}, \ldots, b_{M-1}\}$. Otherwise MF(Z*) is set to 0. If MF(Z*) is equal to 1, then MBN(Z*) is a pointer to the level M directory bank $MB_{MBN(Z^*)}$ that contains the M-tree holding output port information for the message and MBE(Z*) is the location of the root node of the M-tree in $MB_{MBN(Z^*)}$. MO(Z*) and MV(Z*) denote the contents of the clipboard at the level M node defined by $\{b_0, b_1, \ldots, b_{M-1}\}$. If MF(Z*) is equal to 0, then MBN(Z*) and MBE(Z*) are set to −1 and MO(Z*) and MV(Z*) denote the contents of the clipboard at the level M node defined by $\{b_0, b_1, \ldots, b_{M-1}\}$.

Figure 6A:
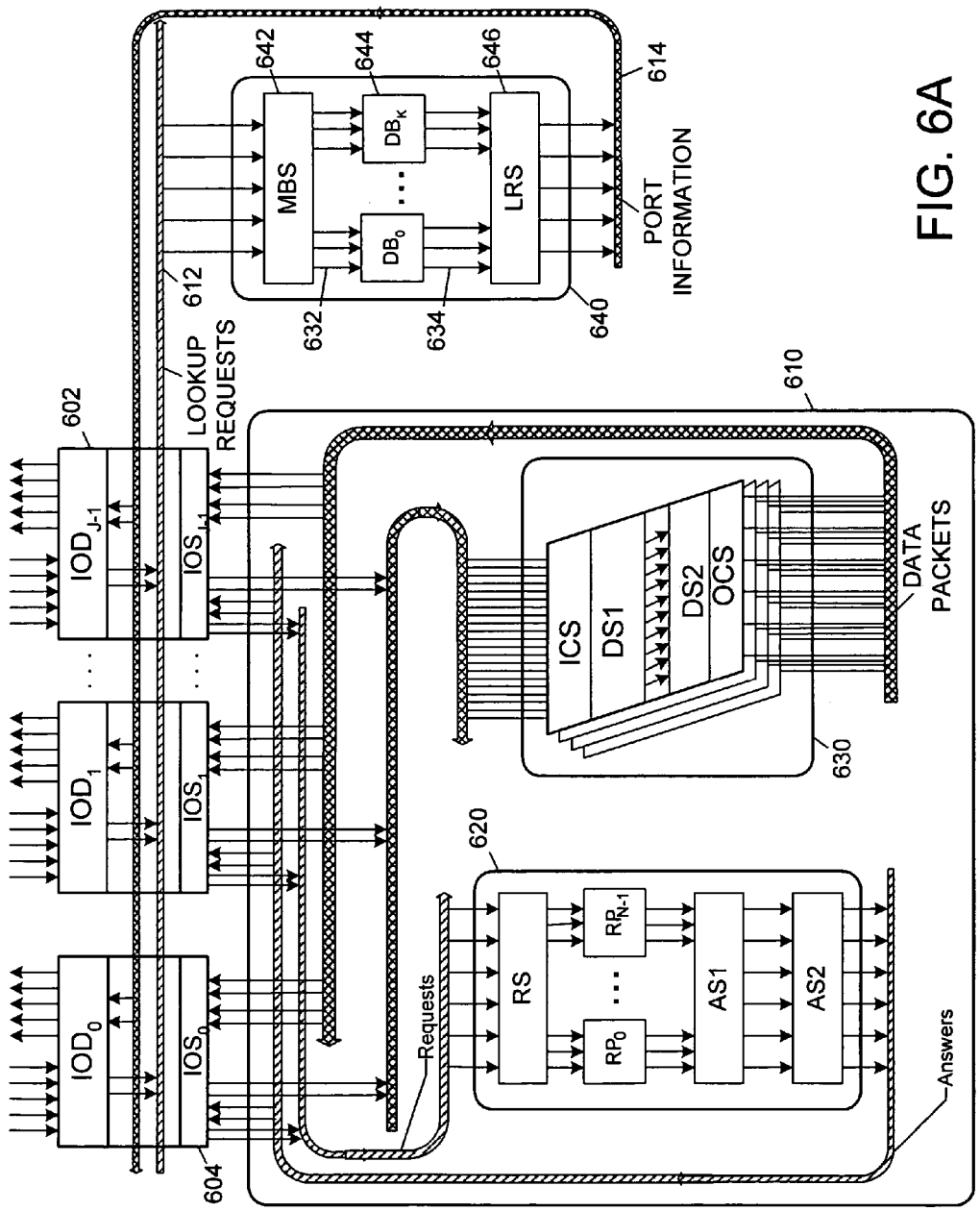
FIG. 6A is a schematic block diagram showing inclusion of the lookup system into a router of the type disclosed in listed related patent application No. 10.

Referring to FIG. 6A, multiple banks of lookup memory DB 644 are included into a Scaleable Congestion Free Switching System with Intelligent Control of the type disclosed in listed referenced patent application No. 10. Message packets enter I/O devices IOD 602 of the type illustrated in FIG. 6C. The I/O device reads the Internet Protocol address from the packet and sends a request-for-port packet through bus 612 to memory bank switch MBS 642, which in turn delivers the request-for-port packet through line 632 to an output port lookup bank DB 644. The lookup bank returns the target output port address through line 634, lookup return switch 646, and bus 614 to the I/O device that made the request. The I/O device then requests a message sending time from system 620, as discussed in listed related patent applications No. 8 and No. 10, and, at the supplied sending time, the packet is sent through the data switch 630 to the appropriate output port.

Figure 6B:
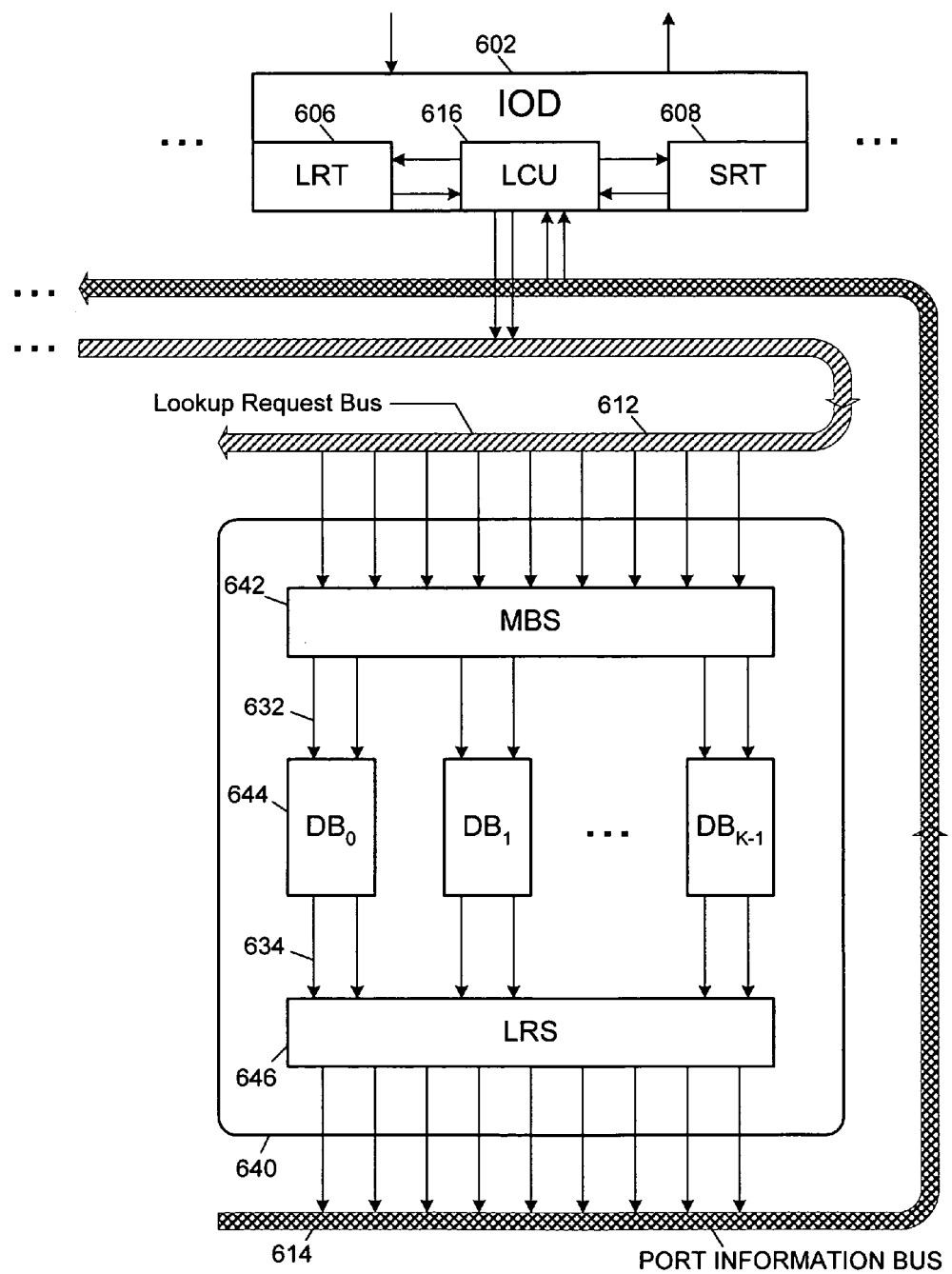
FIG. 6B is a block diagram depicting a multiple level lookup module.
Figure 6C:
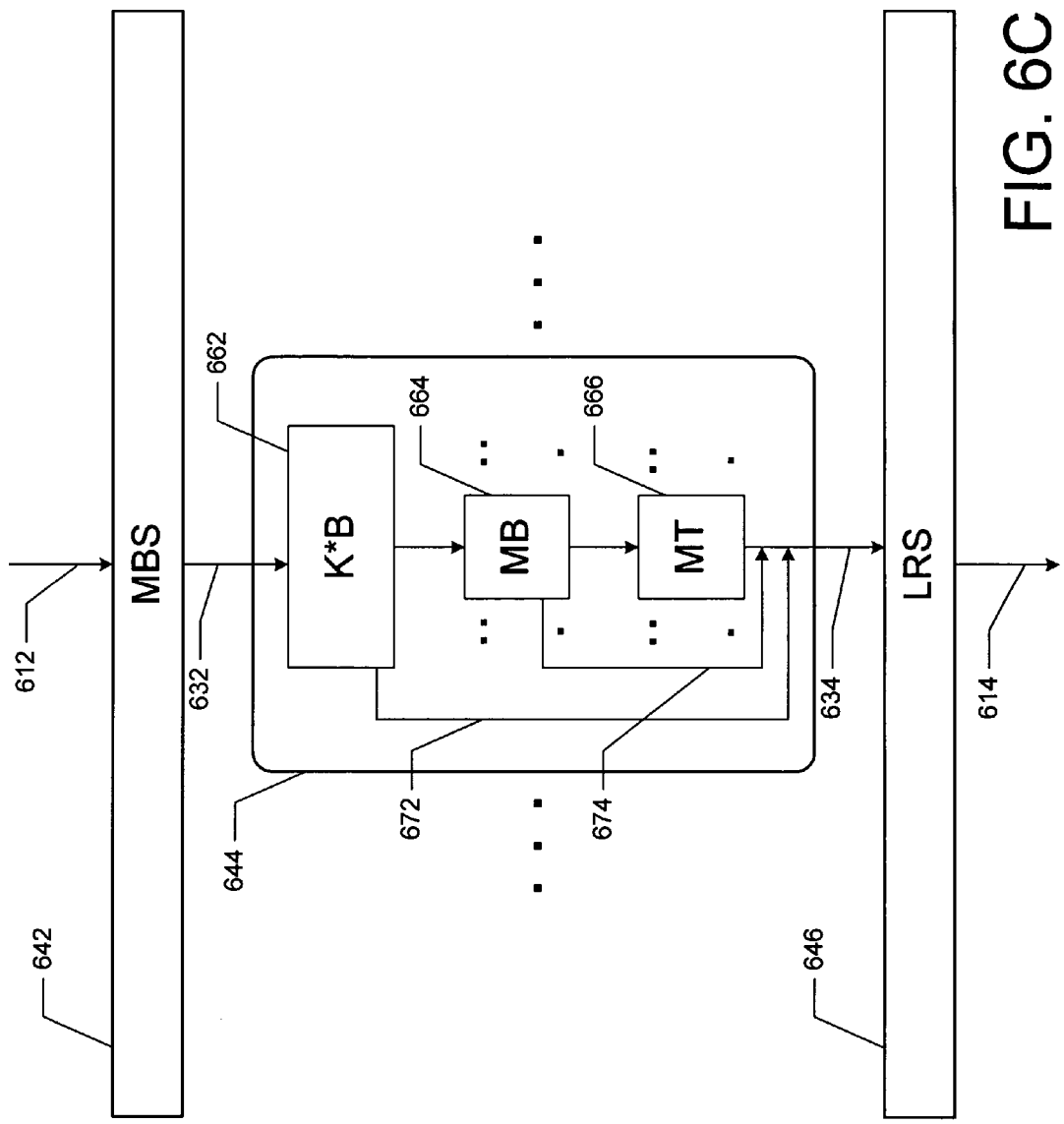
FIGS. 6C and 6D are block diagrams showing embodiments of an I/O device (IOD) of the type used in the router of FIG. 6A.

A simple embodiment depicts incorporation of a single copy of multiple directories into a router system that has no special lookup memories. Referring to FIG. 6C, one copy of the K* directory is divided into multiple directory banks K*B 662. Associated with a bank of the K* directory may be multiple banks MB 664 of the level M directory and multiple banks MT 666 of the M-trees. The memory bank switch MBS 642 of the type taught in the listed and related patents and applications forwards the request-for-port packet to the proper K* directory bank. The system operates as follows:

The input port receiving the message packet sends a request packet through the MBS switch to the bank of the K* directory that holds output port information for the arriving message. The request packet includes an Internet Protocol address with the first K bits of the address denoted by Z. The request packet arrives at the correct bank of the K* directory through line 632, and the following process occurs:

If the contents of the K* directory at address Z has the flag KF(Z) set to 0, then the process is completed and the value KO(Z) is returned to the input port via line 672 and via the lookup return switch LRS 646.

If the K* directory returns an entry with the flag KF(Z) set to 1, then the K* directory entry points to a level M directory bank MB 664.

The interconnect switch between the K* directory bank and the level M directory bank can be a simple tree since no two messages are sent through this switch at the same time. A lookup into the level M directory bank specified by K* at the address specified by bits $\{b_K, b_{K+1}, \ldots, b_{M-1}\}$ in the IP address returns a data item in the form LME(X), as described hereinabove.

If the level M directory entry LME(X) has MF(X)=0, then the process is complete and the output port value MO(X), which was provided by the level M directory, is returned to the I/O port via line 674 and switch LRS 646. Refer to FIG. 6B.

If the level M directory entry LME(X) has MF(X)=1, then the M-tree MT 666 in M bank MBN(X) with root at MBE(X) is traversed to find the value of the output port Opt.

Opt is returned via line 634, switch LRS 646, and lines 614 to the I/O device that requested an output port for the packet.

Figure 6D:
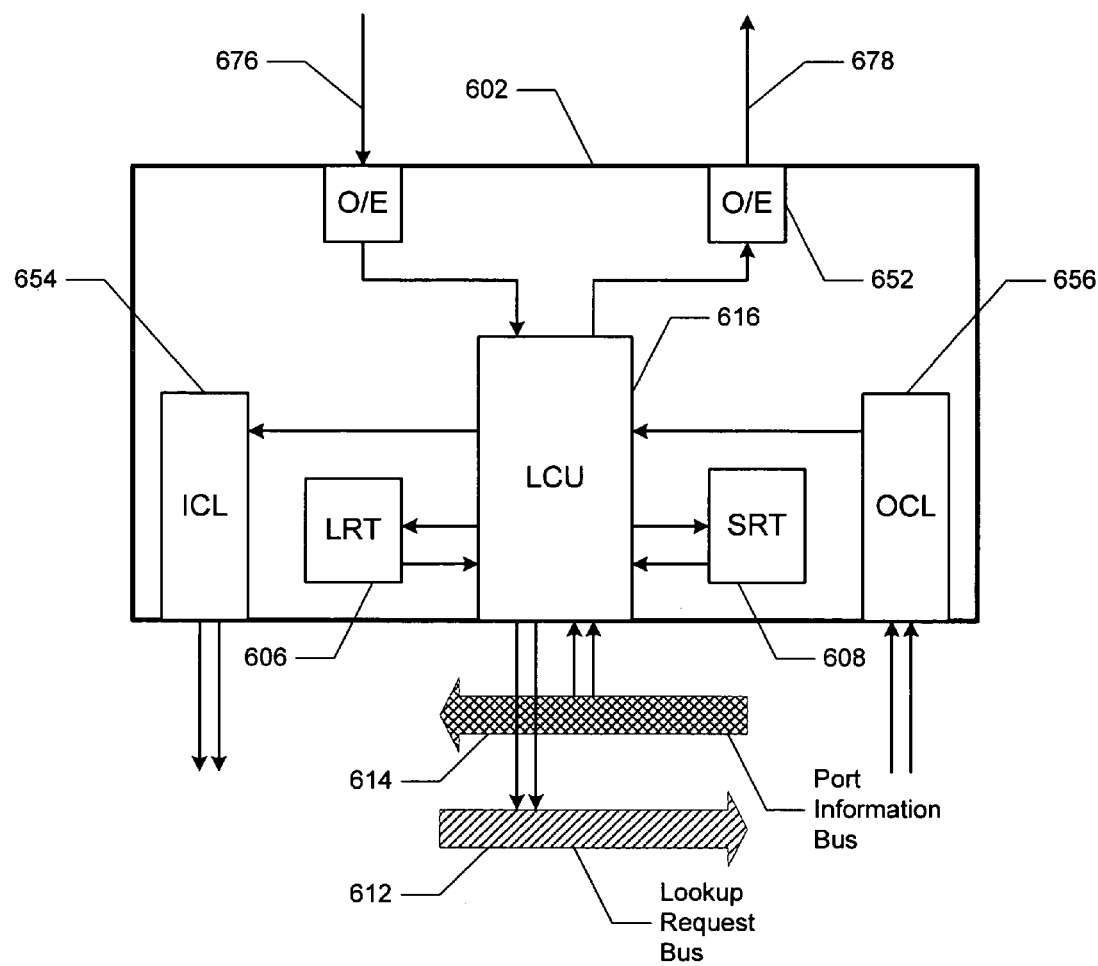

FIG. 6D illustrates details of an I/O device unit 10D 602. Data entering the unit via input line 676 includes Internet Protocol packets, which may be in electronic or optical formats. If the input line is an optical line, the data is converted to electronics by an O/E converter 656. In either case, electronic data is sent to the lookup control unit LCU 616 for processing. The lookup control unit is responsible for resolving the switch output port based on the IP address contained in the header of the data packet. The lookup control unit operates in one of three ways:

1) The output port may be resolved by searching the local router table LRT 606, for example a copy of the level K directory;
2) A special router table SRT 608, if present, may be used to determine the output port as described in the section "Special Router Tables and the Low Banks; and
3) Referring to FIG. 6D in combination with FIG. 6A, if the output port is not resolved by one of the first two methods, then a lookup request packet is sent to the lookup subsystem 640 via data bus 612 to search for the output port in a set of data banks DB 644, for example the K-banks. After resolving the output port for a packet, the packet and associated output port are sent to the input control logic section ICL 654 for processing by the request system 620 and the switching system 630 as shown in FIG. 6A. Output message packets from the switching system are buffered and processed by the output control logic unit OCL 656. If appropriate for the embodiment, message packets are converted back to optics by an O/E converter 652 before exiting the I/O device on line 678. The I/O subsystem IOS 604 depicted in FIG. 6A is composed of the two I/O units ICL and OCL depicted in FIG. 6C.

Efficient operation is facilitated by properties including: 1) the K* directory, the level M directory, and the M-trees can be simultaneously filled by making a tour of the S-trees and 2) both of these directories and the M-trees can be simultaneously updated by making a partial tour of one or more S-trees.

Simultaneously Building and Updating Multiple Directories

The K* directory, the level M directory, and the M-banks are built via a full left-hand tour of all of the S-trees. The K* directory is updated via a partial tour of one or more S-trees. The scope of the partial tour is limited to visiting only those nodes that can, based on modifying the tree due to the arrival of a route packet, affect the updating of one or more of the following: the K* directory, the level M directory, or the M-banks. The operations use functions $Clip_0(X)$ and $Clip(X)$ described hereinbefore. Scope of the partial tour is governed by modifying case A in the definition of the tour to the following:

The level of $n_{T-1}$ is less than the level of $n_T$ and at least one of the following cases holds: 1) $n_T$ is a terminal node so that $LF(n_T)$ and $RF(N_T)$ are both set to zero; 2) $n_T$ is on level M; or 3) $Clip(n_T) = Clip_0(n_T)$". Node $n_T$ is a terminal node so that $LF(n_T)$ and $RF(n_T)$ are both set to zero. Then $n_{T+1}$ is equal to $n_{T-1}$. Node $n_{T+1}$ is on a level one less than the level of $n_T$ and an edge is between $n_{T+1}$ and $n_T$.

The updating process is triggered by the arrival of a route packet of the form (Seq, Sig, Opt, RV, Opc). $B=\{b_0, b_1, \ldots, B_{Sig-1}\}$ denotes the binary sequence defined by Seq and Sig. X denotes the main tree node that is defined by the sequence B. In a partial tour of the main tree, if X is on a level L and L is less than S, then the partial tours is in a plurality of S-trees and include the root node of each of the partially toured S-trees. If the node X is on a level L and L is greater than S, then the partial tour is on a single S-tree. The tour begins at the root of the main tree and travels along a bridge sequence $Z_0, Z_1, \ldots, Z_L$ to X, with $Z_0$ being the main tree root and $Z_L$ being X. A backup sequence $BU_0, BU_1, \ldots$ is maintained throughout. Traversing of the tree to X may cause several nodes, including X, to be added to the tree. Upon reaching the node X, one of the following three cases is true and noted:

Case 1: Opc=1 (add) or Opc=0 (delete) and X is a non-terminal node.
Case 2: Opc=1 and X is a terminal node.
Case 3: Opc=0 and X is a terminal node.

The scope of the tour is defined for each case. Updating of the directories is done at the same time as the partial tour, although directory updating may be described after the partial tour description. To update the K* directory, the level M directory, and the M-trees by a partial S-tree tour, definitions of LBin(V) and RBin(V) are generalized as follows:

For V on level L with L<K $LBin(V) = $ All $\{b_0(V), b_1(V), \ldots, b_{L-1}(V), 0, b_{L+1}, b_{L+2}, \ldots, b_{K-1}\}$ and $RBin(V) = $ All $\{b_0(V), b_1(V), \ldots, b_{L-1}(V), 1, b_{L+1}, b_{L+2}, \ldots, b_{K-1}\}$.

For V on level L with K≤L<M $LBin(V) = $ All $\{b_0(V), b_1(V), \ldots, b_{L-1}(V), 0, b_{L+1}, b_{L+2}, \ldots, b_{M-1}\}$ and $RBin(V) = $ All $\{b_0(V), b_1(V), \ldots, b_{L-1}(V), 1, b_{L+1}, b_{L+2}, \ldots, b_{M-1}\}$.

Case 1: When adding or deleting data at a non-terminal node X, the tour first proceeds from the root node to node X. At that point the routing table is altered. In the case of data addition to the routing table, a pointer from X to the routing table is added if that pointer is not previously defined. In the case of a data deletion from the routing table, if the only data item pointed to by X is deleted, then the pointer from X to the routing table is removed. If the level L of node X≥M, then the tour terminates. Otherwise, under some conditions, the tour continues. If Clip(X) is equal to $Clip_0(X)$, then the tour terminates at X and no changes are made to the routing tables.

Updating the directories during the partial tour:

When moving from a node U on level L−1 to a node V on level L with L<K, LF(V)=0 and RF(V)=1, write {0, 0, CO(V), CV(V)} to all of the K* directory locations with addresses in LBin(V).

When moving from a node U on level L−1 to a node V on level L with K≤L<M, LF(V)=0 and RF(V)=1, write {0, 0, 0, CO(V), CV(V)} to all of the level M directory locations with addresses in LBin(V).

When moving from a node U on level L−1 to a node V on level L with L<K and LF(V)=RF(V)=0, write {0, 0, CO(V), CV(V)} to all of the K* directory locations with addresses in LBin(V) and RBin(V).

When moving from a node U on level L−1 to a node V on level L with K≤L<M and LF(V)=RF(V)=0, write {0, 0, 0, CO(V), CV(V)} to all of the level M directory locations with addresses in LBin(V) and RBin(V).

When moving from a node U on level L+1 to a node V on level L with L<K, RF(V)=0 and LF(V)=1, write {0, 0, CO(V), CV(V)} to all of the K* directory locations with addresses in RBin(V).

When moving from a node U on level L+1 to a node V on level L with K≤L<M, RF(V)=0 and LF(V)=1, write {0, 0, 0, CO(V), CV(V)} to all of the level M directory locations with addresses in RBin(V).

When reaching a node V on level K and both LF(V) and RF(V) equal 0, write the value {0, 0, CO(V), CV(V)} to the K* directory location with address Bin(V).

When reaching a node V on level M and both LF(V) and RF(V) equal 0, write the value {0, 0, 0, CO(V), CV(V)} to the level M directory location with address Bin(V).

When reaching a node V on level K and at least one of LF(V) and RF(V) is equal to 1, set Z=Bin(V) and write the value {1, MBN(Z), CO(V), CV(V)} (with MBN(Z) an available M-bank number) to the K* directory location with address Bin(V).

When reaching a node V on level M and at least one of LF(V) and RF(V) equals 1, set Z=Bin(V) and write the value {1, MBN(Z), MBE(Z), CO(V), CV(V)} (with MBN(Z) an available M-bank number and MBE(Z) an available node label in $MB_{MBN(Z)}$) to the level M directory location with address Bin(Z*) where Z* is defined as discussed in the section entitled "An Embodiment with Additional Level Directories."

Case 2: When adding data at a terminal node, the tour proceeds from the root node to the level L node X. At node X, the process alters the contents of the routing table and, in case the process adds the node X, a pointer to the routing table is added. The K* directory and the level M directory may also be altered and additions may be made to the M-banks. The tour always stops at the terminal node X because no other nodes have clipboard values that are affected by the change at X. If Clip(X) is equal to $Clip_0(X)$, then neither the K* directory nor the level M directory is altered.

If L<K and Clip(X)≠$Clip_0(X)$, then the K* directory entries LKE(Z) are altered so that KO(Z)=CO(X) and KV(Z)=CV(X) for all Z in RBin(X) and also for all Z in LBin(X). The other fields in LKE(Z) are unchanged so that, for each such Z, LKE(Z)={KF(Z), KBN(Z), CO(X), CV(X)}.

If L is equal to K and Clip(X)≠$Clip_0(X)$, then Z is set to Bin(X) and the K* directory entry LKE(Z) is altered so that KO(Z)=CO(X) and KV(Z)=CV(X). The other fields in LKE(Z) are left unchanged, and thus, LKE(Z)={KF(Z), KBN(Z), CO(X), CV(X)}.

If K<L<M and Clip(X)≠$Clip_0(X)$, then level M directory entries LME(Z) are altered so that MO(Z)=CO(X) and MV(Z)=CV(X) for all Z in RBin(X) and also for all Z in LBin(X). The other fields in LME(Z) are left unchanged, and thus, for each such Z, LME(Z)={MF(Z), MBN(Z), MBE(Z), CO(X), CV(X)}.

If L is equal to M and Clip(X)≠$Clip_0(X)$, then Z is set to Bin(X) and level M directory entry LME(Z) is altered so that MO(Z)=CO(X) and MV(Z)=CV(X). The other fields in LME(Z) are left unchanged, and thus, LME(Z)={MF(Z), MBN(Z), MBE(Z), CO(X), CV(X)}.

If L>M route packet processing does not add a new M-tree, then the level M directory is not altered. However, if the process added a new M-tree, then R is defined to be the root of the new M-tree and Z is set to Bin(R). Level M entry LME(Z) is modified by setting MF(Z)=1 and by selecting appropriate values for MBN(Z) and MBE(Z) from the list of available values. The other fields in LME(Z) are left unchanged, and thus, LME(Z)={1, MBN(Z), MBE(Z), MO(Z), MV(Z)}.

Case 3: When deleting data at a terminal node X on level L, the tour proceeds from the root node to node X. At node X, the process alters the contents of the routing table by deleting the (Opt, Val) pair of the route packet, which may cause directory updating (described later). If node X points to a routing table entry {$(Opt_1, Val_1)$, $(Opt2, Val_2)$, ..., $(Opt_Q, Val_Q)$} and Q>1, then the member of the sequence referred to in the route packet is eliminated from the sequence and the (Q−1) long sequence is written so that $(Opt_1, Val_1)$ contains the member with the largest Val entry of the sequence. The tour is complete for the case where Q>1.

If L<K and Clip(X)≠$Clip_0(X)$, then K* directory entries LKE(Z) are altered so that KO(Z)=CO(X) and KV(Z)=CV(X) for all Z in RBin(X) and LBin(X). The other fields in LKE(Z) are left unchanged so that, for each such Z, LKE(Z)={KF(Z), KBN(Z), CO(X), CV(X)}.

If L=K and Clip(X)≠$Clip_0(X)$, then Z is set to Bin(X) and K* directory entry LKE(Z) altered so that KO(Z)=CO(X) and KV(Z)=CV(X). The other fields in LKE(Z) are left unchanged, and thus, LKE(Z)={KF(Z), KBN(Z), CO(X), CV(X)}.

If K<L<M and Clip(X)≠$Clip_0(X)$, then level M directory entries LME(Z) are altered so that MO(Z)=CO(X) and MV(Z)=CV(X) for all Z in RBin(X) and LBin(X). Other fields in LME(Z) are unchanged, and thus, for each such Z, LME(Z)={MF(Z), MBN(Z), MBE(Z), CO(X), CV(X)}.

If L=M and Clip(X)≠$Clip_0(X)$, then set Z=Bin(X) and alter the level M directory entry LME(Z) so that MO(Z)=CO(X) and MV(Z)=CV(X). The other fields in LME(Z) are left unchanged, and thus, LME(Z)={MF(Z), MBN(Z), MBE(Z), CO(X), CV(X)}.

If L>M, the directories are not altered.

If node X is on level L and X points to a routing table entry with only one member of the sequence {$(Opt_1, Val_1)$, $(Opt_2, Val_2)$, ..., $(Opt_Q, Val_Q)$}, for example Q=1, one or more nodes and edges are removed from the tree. Node X is removed from the tree, the pointer from X to the routing table and a row of the routing table are removed, and the address of the removed row is returned to the available routing table address list. The tour proceeds to the level L−1 node $V_{L−1}$. In a first case where $V_{L−1}$ does not point to a level L node Y distinct from X and $V_{L−1}$ does not have a pointer to the routing table, then $V_{L−1}$ is removed from the tree and the tour proceeds to $V_{L−2}$. In a second case where one or both of the above conditions is not satisfied, the tour ends at a node SN, called a stop node. The process continues toward the root of the main tree until a node SN not satisfying both conditions is reached where the partial tour ends at the stop node SN at a level denoted SL.

If L<K, then for each Z in either LBin(X) or RBin(X) the two LKE(Z) fields KO(Z) and KV(Z) are updated to KO(Z)=$CO_0(SN)$ and KV(Z)=$CV_0(SN)$ and other fields of LKE(Z) are unchanged. Thus for each such Z, LKE(Z)={KF(Z), KBN(Z), KBE(Z), $CO_0(SN)$, $CV_0(SN)$}.

If L is equal to K, then Z is set to Bin(X) and the two LKE(Z) fields KO(Z) and KV(Z) are updated so that KO(Z)=$CO_0(SN)$ and KV(Z)=$CV_0(SN)$ and other fields of LKE(Z) are unchanged. Thus, LKE(Z)={KF(Z), KBN(Z), KBE(Z), CO$_0$(SN), CV$_0$(SN)}.

If K<L<M, then for each Z in either LBin(X) or RBin(X) the two LME(Z) fields MO(Z) and MV(Z) are updated so that MO(Z)=CO$_0$(SN) and MV(Z)=CV$_0$(SN) and other fields of LME(Z) are unchanged. Thus for each such Z, LME(Z)={MF (Z), MBN(Z), CO$_0$(SN), CV$_0$(SN)}.

If L=M, then Z is set to Bin(X) and the two LME(Z) fields MO(Z) and MV(Z) are updated so that MO(Z)=CO$_0$(SN) and MV(Z)=CV$_0$(SN) and other fields of LME(Z) are unchanged. Thus, LME(Z)={MF(Z), MBN(Z), MBE(Z), CO$_0$(SN), CV$_0$(SN)}.

If L>M and SL≤M, then node removal by the process causes removal of an M-tree with root node R, setting Z=Bin (R) and LME(Z)={0, −1, −1, CO$_0$(SN), CV$_0$(SN)}. If L>M and SL>M, no alterations are made to the directories.

An Embodiment with Multiple Copies of the Directories

Referring to FIG. 6A, data structures include only one copy of the K* directory, the level M directory and the M banks. Other embodiments have multiple copies of the data structures. One master copy is updated when a route packet arrives. Other copies of the data structure are updated via periodic broadcasts from the master copy. Fewer request packets arrive at a given copy per unit time and the copies can be maintained closer to the line cards, I/O devices. Still another embodiment has multiple copies of the directories with all of the copies updated by the route packets. Other embodiments have only one copy of the directories and multiple copies of the Low Banks.

An Embodiment in which the Lookup System Sends Data Directly to the Request Controller Referring to FIG. 6A, a request-output-port packet is sent from the I/O device IOD 602 to the output port data system 640. An answer packet is returned from the output port data system to the I/O device. The I/O device then sends a request packet to the request processor 620, and the request processor returns an answer packet to the I/O device. In an alternate embodiment, illustrated in FIG. 7, the I/O device sends a request packet to the output port data system. The output port data system then sends a request directly to the request processor and the request processor returns an answer packet to the I/O device. Physical changes for the alternate embodiment are minor, only the port information bus 614 is relocated.

Updating the Low Banks

Figure 8A:
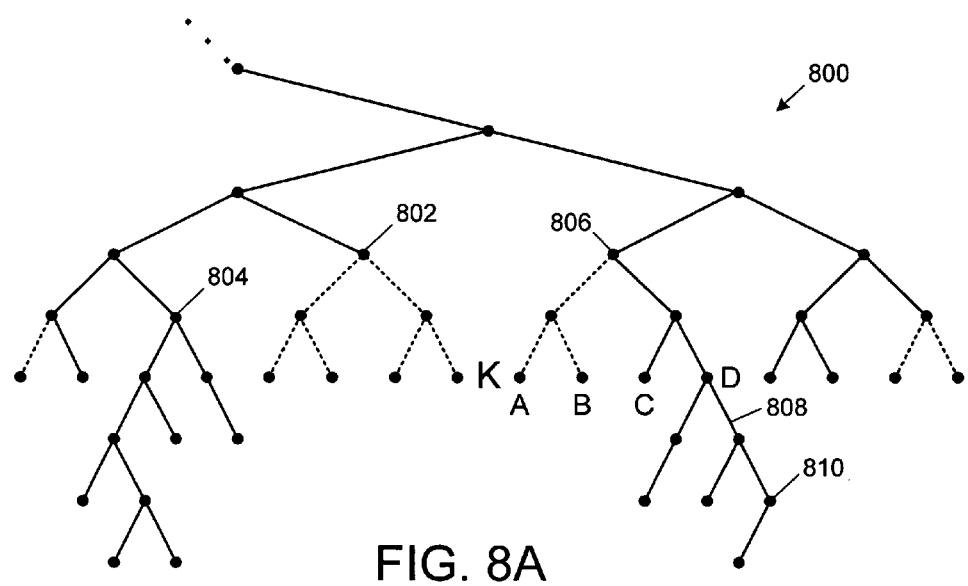
FIG. 8A is a tree diagram showing a section of the main tree structure centered at level K. As illustrated, only two nodes on level K have associated K-trees.
Figure 8B:
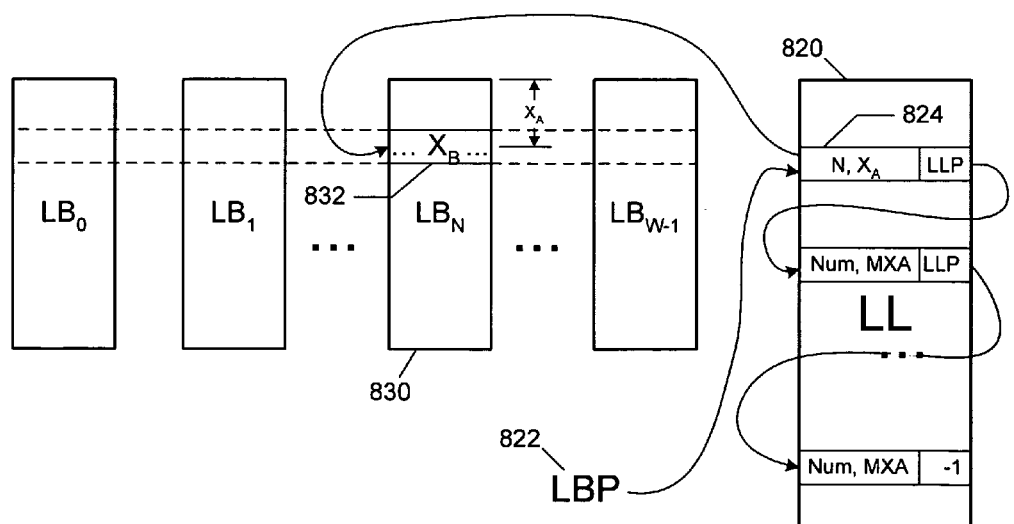
FIG. 8B is a block diagram illustrating use of a link list LL to point to entries in the Low Banks.

A new entry is made in the Low Banks when looking up the output port for a message searches the Low Banks and the search is unsuccessful. An existing entry in the Low Banks may be deleted or overwritten to make room for the new entry. FIG. 8B shows the Low Banks 830 and association with the linked list LL 820. The process of searching and updating the Low Banks proceeds as follows:

Checking the level K directory involves looking up the output port for an IP address X whose first K bits are Z. First the level K directory entry LKE(Z)={KF(Z), KBN (Z), KBE(Z), KO(Z), KV(Z), KLB(Z)} is checked. Assuming that KLB(Z)≥1, the Low Banks are searched for an entry associated with X. If not, as is assumed in this example, a new entry will be added for X.

Searching the Low Banks involves applying masks MA and MB to X, and generating $X_A$ and $X_B$. Each of the W Low Banks 820 is examined at relative address $X_A$ by comparing $X_B$ with MBX($X_A$). If none of the W MBX ($X_A$) values is $X_B$, then an entry 824 for X is generated and placed in one of the Low Banks.

A location for a new entry is selected. If an integer N exists such that LBF($X_A$)=0 for LB$_N$, then the new entry is placed in LB$_N$. If LBF($X_A$)=1 for each Low Bank, for example all entries contain active data, then a Low Bank LB$_N$ with the largest Use($X_A$) value is selected for the new entry. The new entry is placed in Low Bank LB$_N$ at location $X_A$.

An existing entry can be deleted. If LBF($X_A$)=1 at the selected location, the link list entry 824 that points to the location is deleted before adding data for X. $X_A$ is combined with the current value of MBX($X_A$) using the masks MA and MB. The result is an IP address X' having first K bits denoted by Z'. The level K directory entry KBE(Z') is examined to extract the link list pointer KLB (Z'), which is used to chain through the associated set of items in the link list LL 820. One entry has the form {N, $X_A$, LLP}, and thus the entry points to the Low Bank entry are deleted. The item in the link list is deleted and the other items in the chain, if any, are re-linked. If the item deleted is the one pointed to by KLB(Z') 822 and the list contains more than one item, then KLB(Z') is changed to point to the next entry in the chain. If the item deleted is the only entry in the chain, then KLB(Z') is changed to −1.

Data for a new entry is generated. The LBE($X_A$) data to be placed in the selected Low Bank location {LB$_N$, $X_A$} is obtained by touring the K-tree having a root node in the K-banks pointed to by the parameters {KBN(Z), KBE (Z)}. At the start of the tour, the clipboard is initialized to {KO(Z), KV(Z)}. If data on the clipboard at the end of the tour is {CO, CV}, then the selected Low Bank entry is set so that {LBF($X_A$)=1, MBX($X_A$)=$X_B$, LO($X_A$)=CO, LV($X_A$)=CV, Use($X_A$)=0}. Addition of a new entry to the Low Banks is complete and, if the selected location contained an active entry, the process of adding the new entry completes the deletion of the old entry.

A Low Bank entry may also be modified or deleted during the processing of some request packets. The unit that processes the request packets sends an update-low-bank packet ULB to the processing unit or units responsible for updating the Low Banks. One or more ULB packets are sent for each request packet RP that may modify the Low Banks. The ULB packets are sent without looking at any data in the Low Banks or in the link list LL so that some ULBs are sent which are later determined not to affect the Low Banks. FIG. 8A illustrates K-tree branching from nodes on level K of the main tree. Criteria used in creating and sending a ULB={DF, LBP, RP} include:

With respect to a route packet RP, UZ is used to denote the set of all K bit sequences Z such that the leading Sig bits of Z are the same as the leading Sig bits of RP. For a RP, UZ contains only one sequence Z if Sig≥K, but UZ contains a plurality of sequences Z if Sig<K. In FIG. 8A node 806 at level K−2 defines a four member UZ set associated with the nodes A, B, C and D at level K. Only one of the nodes, node D, has an associated K-tree 808. When UZ contains more than one element, each Z in UZ is examined in sequential order for criteria for sending a ULB packet. A single route packet may generate multiple ULB packets.

If Opc=0 designating a delete, Sig>K designating delete of an entry associated with a K-tree node, KLB(Z)≥0 so that the LL pointer in the level K directory before processing RP indicates that data for the K-tree is in the Low Banks, and KF'(Z)=0 designating the K-tree flag in the level K directory after processing RP, then the associated K-tree is removed as a result of RP. In this case, ULB={DF=0, LBP=KLB(Z), RP} is sent to the processor that updates the Low Banks.

If Opc=0, Sig>K, KLB(Z)≥0, and KF'(Z)=1, then an entry associated with a K-tree node is deleted that does not cause the deletion of the K-tree. ULB={DF=1, LBP=KLB(Z), RP} is sent.

If Opc=0 and Sig≤K, then each Z in UZ is examined for criteria of KLB(Z)≥0 and the level K directory pair {KO(Z), KV(Z)} changes as a result of RP. A packet ULB={DF=1, LBP=KLB(Z), RP} is sent for each Z that meets the criteria.

If Opc=1 (add), Sig>K designating adding data to an entry associated with a K-tree node, KLB(Z)≥0, and Val>KV(Z), then data is added for a node associated with a K-tree that has information stored in the Low Banks. Furthermore, the entry to be added has a value that is greater than the value stored in the associated level K directory and thus may affect the Low Banks. ULB={DF=1, LBP=KLB(Z), RP} is sent.

If Opc=1 and Sig≤K, then for each Z belonging to UZ such that KLB(Z)≥0 and KV(Z) increases as a result of RP, a packet ULB={DF=1, LBP=KLB(Z), RP} is sent to the processor that updates the Low Banks.

Processing of the ULB packets can be divided into three cases: 1) ULB={DF=0, LBP, RP} indicating K-tree deletion; 2) ULB={DF=1, LBP, RP} and Opc=0 indicating delete; and 3) ULB={DF=1, LBP, RP} and Opc=1 for an add operation.

In Case 1, ULB={DF=0, LBP, RP}:

DF=0 indicates that an entire K-tree is removed. Therefore, all associated entries in the Low Banks and pointers in the link list LL are deleted. LBP 822 points to an entry 824 in LL 820 having the form {Num, MXA, LLP}. The entry in Low Bank $LB_{Num}$ 830 at address MXA=$X_A$ has the form {LBF($X_A$), MBX($X_A$), LO($X_A$), LV($X_A$), Use($X_A$)}. The entry is deleted by changing LBF($X_A$) to 0, indicating that the data is no longer valid. The integer LBP is returned to the list of available integers A VLL. If LLP is not −1, then LLP points to another entry in LL. The process for the entry at LBP is repeated for the entry at LLP. The process continues until an entry in LL is processed and LLP for the entry is −1. All entries in the Low Banks associated with the deleted K-tree are removed.

Case 2, ULB={DF=1, LBP, RP} and Opc=0:

Since the route packet RP deletes an entry, a Low Bank entry is affected only if the {Opt, Val} pair in RP is the {LO, LV} pair in the Low Bank entry. To determine the condition, the link list pointer LBP 822 is used to chain through the designated set of LL entries 824. For each entry {Num, MXA, LLP}, the Low Bank entry in $LB_{Num}$ 830 at address MXA=$X_A$ is examined. {Opt, Val} from the route packet RP is compared to the Low Bank entry values {LO($X_A$), LV($X_A$)}. If the pairs are equal, then the masks MA and MB are applied to $X_A$ and XB=MBX($X_A$) to form the IP address X. The first Sig bits of X are compared to the first Sig bits of RP. If the two sequences are equal, then the Low Bank entry is updated. With Z denoting the first K bits of X, a tour of the K-tree is made starting at the root node defined by {KBN(Z), KBE(Z)} and the clipboard initialized to {KO(Z), KV(Z)}. The final clipboard values of {CO, CV} are used to replace the LO($X_A$) and LV($X_A$) respectively.

Case 3, ULB={DF=1, LBP, RP} and Opc=1:

A route packet RP that adds data to the routing tables can affect a Low Bank entry 832 only if the Val field in RP is greater than the LV field in the Low Bank entry. To process the packet, the link list pointer LBP 822 is used to chain through the designated set of LL entries 824 of the form {Num, MXA, LLP}. The Low Bank entry in $LB_{Num}$ 830 at address MXA=$X_A$ is located. If Val>LV for this entry, then the masks MA and MB are applied to $X_A$ and $X_B$=MBX($X_A$) to form the IP address X. If the first Sig bits of X equal the first Sig bits of RP, then the pair {LO($X_A$), LV($X_A$)} are replaced by the pair {Opt, Val} from the route packet RP.

System Configurations

Multiple system configurations are possible, including but not limited to the following:

1) The Internet Protocol address has 32 bits and two directories are included, with one of the directories on level 32. A copy of both of the directories is on each of the line cards, and one copy of the tree structure is used to update the directories. No copy of the recently used addresses is maintained, for example no low banks.

2) The Internet protocol address has 32 bits and a copy of a first directory is on each of the line cards. The second directory is on level 32. Only one copy of the second directory is maintained. The single copy of the second directory is divided into banks and the line cards can access the banks by sending requests through a Data Vortex switch of the type described in the listed related patent No. 2. A single copy of the tree data structure is used to update both directories. The structure can be used with or without recently-used addresses on the line cards.

3) The Internet Protocol address has more than 32 bits, and the system has multiple directories with a copy of the first directory on each of the line cards and only one copy of each of the additional directories. The directories not on the line cards are accessed and data is returned using switches described in the listed related patents and applications. A copy of the recently used addresses on each of the line cards may be maintained.

One having ordinary skill in the art can devise many other useful systems using the concepts described herein.

System Configurations for Parallelism

Figure 7:
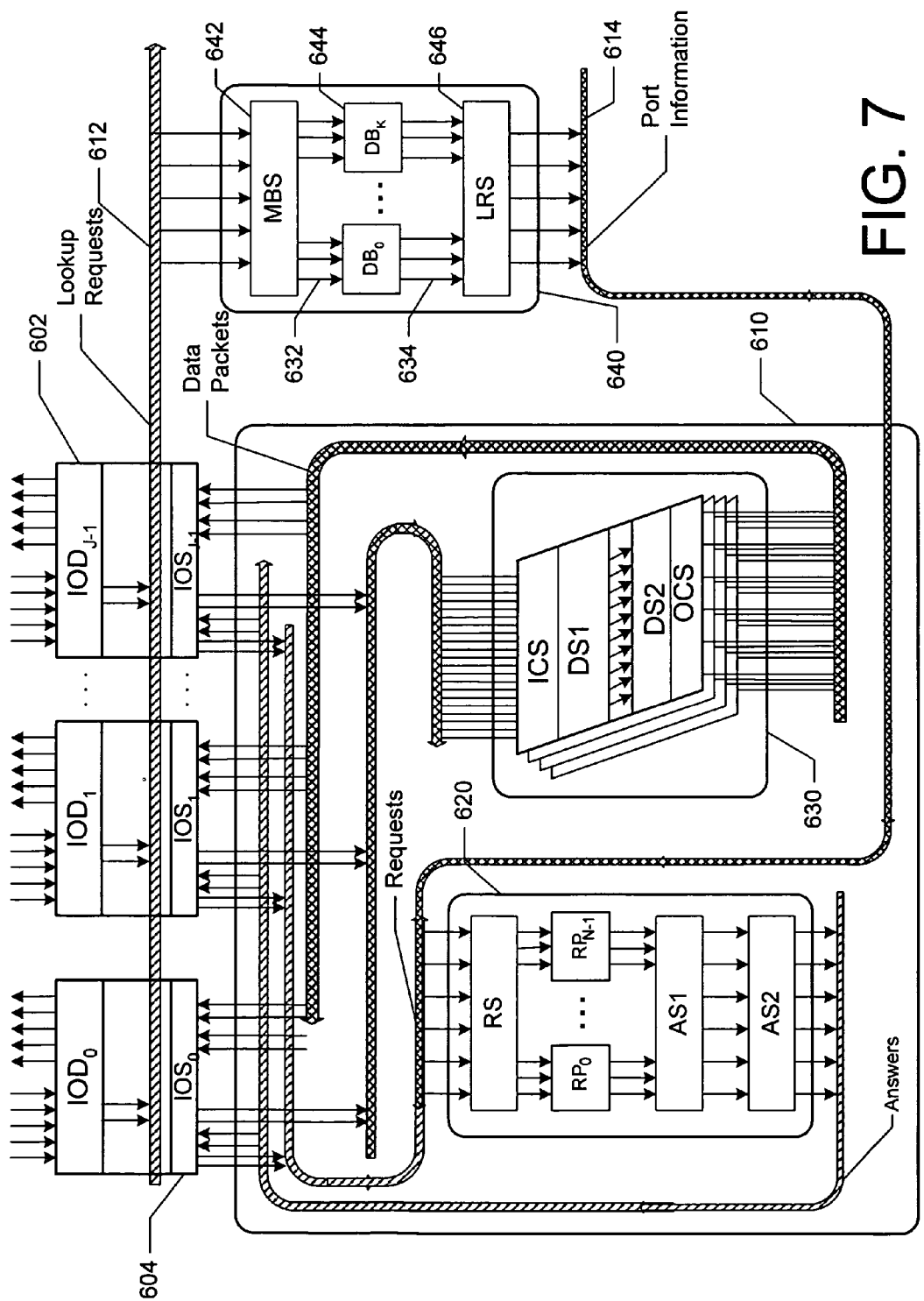
FIG. 7 is a schematic block diagram that illustrates a lookup system included in a router of the type disclosed in listed related patent application No. 10, in which the lookup system sends its output directly to the request processor.

The system illustrated in FIG. 7 increases throughput by "stacking" the N data switch chips 630. Data can be sent through these chips by replicating the header to include N header copies, and dividing the segment into N equal sub-segments, each containing one nth of the payload. Each of the switches in the stack transports a single sub-segment of the set. In another embodiment that also uses a stack of data chips, segments of a message packet are not sub-segmented and the request processors assign a chip in the stack to all of the packet's segments. Another method providing additional parallelism is obtained by using multiple FIG. 7 systems with incoming data divided among the systems. One copy of a first directory may be on each of the line cards and a second copy associated with each FIG. 7 system. Yet another embodiment has only one copy of the second directory shared by all of the FIG. 7 systems. Either case may include one or more tree update systems.

Multicasting

A first type of multicasting has one representative output port member associated with each of the multicast domain sets. One method of multicasting is described in the listed related patent application No. 8. In a second method of multicasting, only the output port of the representative member is looked up. The request processor considers only the representative member and only one copy of the message exits the FIG. 7 system. In this way, the request processor can track only the associated on-chip output buffer. After leaving the chip, the message is replicated and sent to the members of the multicast domain as described in the listed related patent application No. 8.

A second type of multicasting has no prearranged domain. One output port receives all of the multicast messages. When a message arrives at the system, multiple routing table output port lookups are used. The packet is sent through the special multicast output port. On a separate chip, a one-to-many switch is set in accordance with the list of output ports that are to receive the message. The scheduling and output buffer management in the FIG. 7 system is the same as for the non-multicast messages.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, components, and dimensions can be varied to achieve the desired structure as well as modifications, which are within the scope of the claims. Variations and modifications of the embodiments disclosed herein may also be made while remaining within the scope of the following claims.

What is claimed is:

1. A system comprising:
a memory controller in a router that separates a memory into multiple banks and enables a plurality of selected banks to be accessed concurrently, the memory controller further comprising:
logic that creates a representation of a tree structure in memory and builds routing tables accessed by pointers at nodes in the tree memory structure;
logic that finds a target memory address based on a received Internet Protocol (IP) address used by the tree memory structure and the routing table;
logic that uses route packets received by the memory controller from a downstream router downstream of the router to add nodes to the tree structure and add data to the routing table, the route packets comprising information for conditionally forming the nodes based on mutual comparison of the route packets, the information comprising at least a value (Val) field indicating a measure of worth of an output port; and
logic that traverses the tree memory structure and updates the value (Val) field as the tree memory structure is traversed.

2. The system according to claim 1 further comprising:
a data set including a plurality of data items configurable in a sequence $L_1, L_2, L_3, \ldots L_x$, the individual data items comprising at least two data fields; and
a plurality of directories $DL_1, DL_2, DL_3, \ldots DL_x$ corresponding to the sequence $L_1, L_2, L_3, \ldots L_x$, the directories comprising at least an address field and an information field and including pointers whereby directory $DL_i$, points to $DL_{i+1}$ for i from 1 to X and directory $DL_x$ points to a plurality of tree structures adapted to find values in the information field.

3. The system according to claim 1 further comprising:
a first data structure that holds addresses associated with input ports coupled to the memory;
a second data structure that holds at least one directory containing destination information in the route packets;
a third data structure operational as a tree for usage in building and maintaining directories and locate data in routing tables; and
a fourth data structure that uses hashing to store information accessed using the tree structure.

4. The system according to claim 3 wherein the third data structure is further used to locate data in the routing tables.

5. The system according to claim 1 wherein the memory controller further comprises:
logic that receives route packets containing information that assists communication of data through the tree structure including information identifying an Internet Protocol (IP) address, a portion of the IP address for determining routing, a predefined measure of worth of the routing path, and an operation code indicating an operation to perform on the communicated information.

6. The system according to claim 5 wherein:
the route packets are entries into a tree that are received from downstream routers, the route packet information includes an Internet Protocol (IP) address (Seq), a number of bits of the IP address to identify output port (Opt), a predefined measure of worth of the output port (RV), and an operation code identifying an operation to be performed on the route packet (Opc).

7. The system according to claim 1 wherein the memory controller further comprises:
logic responsive to directions contained in the route packet that performs an operation selected from among a group comprising:
determining whether an entry is to be made to the routing table and, if so, making the entry;
removing an entry from the routing table; and
modifying a measure of value indication in a routing table entry.

8. The system according to claim 1 wherein the memory controller further comprises:
a routing table memory configured as a plurality of storage elements that indirectly associate a partial Internet Protocol (IP) address with a list of ordered pairs, the ordered pairs including an output port element and a value element.

9. The system according to claim 8 further comprising:
logic that, under direction of route packets received by the memory controller from the downstream router, selects the output port element as a port capable of transferring a message to a final destination in a minimum number of hops.

10. The system according to claim 1 further comprising:
logic that determines output port information based on packet header information in a message packet received from the downstream router using a plurality of data structures;
logic that modifies content of at least one structure of the plurality of data structures in response to arrival of route packets and data packets at the memory controller; and
logic that builds and modifies data structures using a system of binary trees with a plurality of nodes, each associated with a data item configured as a binary sequence, the nodes being accessed indirectly by proceeding, node by node, through the tree.

11. The system according to claim 10 further comprising:
logic that modifies content of at least one structure of the plurality of data structures in response to arrival of route packets and data packets at the memory controller; and
logic that builds and modifies data structures using a system of binary trees with a plurality of nodes, each associated with a data item configured as a binary sequence, the nodes being accessed indirectly by proceeding, node by node, through the tree.

12. The system according to claim 1 further comprising:
logic that adds an item to a tree structure upon receipt of a route packet with an operation code field designating an add operation, the logic further comprising:
   logic, operative if a path exists through nodes to a designated target node, that steps through a binary sequence of nodes specified in the route packet, and that modifies a routing table element at the target node if the target node indicates an associated routing table element; and
   logic, operative if no path exists through nodes to the designated target, which adds new nodes in route to the designated target node.

13. The system according to claim 12 further comprising:
logic that steps through a binary sequence by stepping through multiple levels of a two-dimensional tree structure in a first dimension, level by level, and advancing left or right based on the binary selection in a second dimension with each step, whereby a node at an Nth level is represented by an N-long binary sequence; and
logic that defines a pointer for a node that is associated with an output port.

14. The system according to claim 1 further comprising:
logic that adds an item to a tree structure upon receipt of a route packet with an operation code field designating an add operation, the logic further comprising:
   logic, operative if a path exists through nodes to a designated target node, that steps through a binary sequence of nodes specified by an Internet Protocol (IP) address in the route packet, and that modifies a flag and pointer value of a routing table element at the target node if the target node indicates an associated routing table element; and
   logic, operative if no path exists through nodes to the designated target, which adds new nodes in route to the designated target node.

15. The system according to claim 1 further comprising:
logic that deletes one or more items from a tree structure upon receipt of a route packet with an operation code field designating a delete operation, the logic further comprising:
   logic that steps through a binary sequence of nodes specified in the route packet to a level in the tree structure beyond which the one or more items are to be deleted, and that deletes pointers to the deleted items and modifies data associated to the deleted items.

16. The system according to claim 1 further comprising:
logic that stores a backup sequence describing the tree structure as the tree structure is created; and
logic that retraces progression in the tree structure that enables movement toward a root node of the tree structure.

17. A system comprising:
a memory controller in a router that separates a memory into multiple banks and enables a plurality of selected banks to be accessed concurrently, the memory controller further comprising:
   logic that creates a representation of a tree structure in memory that is configured into a plurality of sub-trees defined by a sub-tree directory and a plurality of sub-tree-associated banks, the sub-trees having a root at a specified level in a multiple-level tree structure; a
   logic that finds a target memory address based on a received Internet Protocol (IP) address used by the tree memory structure; and
   logic that uses route packets received by the memory controller from a downstream router downstream of the router to add nodes to the tree structure and add data to the routing table, the route packets comprising information for conditionally forming the nodes based on mutual comparison of the route packets, the information comprising at least a value (Val) field indicating a measure of worth of an output port; and
   logic that traverses the tree memory structure and updates the value (Val) field as the tree memory structure is traversed.

18. The system according to claim 17 further comprising:
logic that manages the sub-tree directory to point to sub-tree locations in the sub-tree-associated banks.

19. The system according to claim 17 further comprising:
a plurality of processors that create the plurality of sub-trees and load the sub-trees into the sub-tree-associated banks.

20. The system according to claim 17 further comprising:
logic that builds routing tables that are accessed by pointers at nodes in the tree structure; and
logic that uses route packets received by the memory controller from the downstream router to add nodes to the tree structure and add data to the routing table.

21. The system according to claim 20 further comprising:
logic that tours the sub-tree prior to arrival of a route packet and initializes clipboard functions associated with nodes of the sub-tree.

22. The system according to claim 21 further comprising:
logic that receives a route packet and responds by modifying the routing table at a location identified by the route packet; and
logic that tours the sub-tree after changing the routing table entry and updates clipboard functions associated to reflect current status of the tree.

23. The system according to claim 17 further comprising:
logic that manages a plurality of sub-trees with the individual sub-trees having a root at different levels in the tree structure, the sub-trees being arranged in a hierarchy whereby a bank of a sub-tree at a higher level can spawn multiple sub-trees at a lower level enabling parallel construction and updating of a lower level directory and lower level banks.

24. The system according to claim 17 further comprising:
logic that manages filling of data into a plurality of sub-tree-associated banks whereby the individual banks continuously hold a same data amount, the logic filling the plurality of banks with sub-tree data to a percentage fullness until the percentage fullness is attained, then increasing the percentage to hold additional data.

25. The system according to claim 24 further comprising:
a plurality of processors capable of operating in parallel to fill the data into the plurality of sub-tree-associated banks.

26. The system according to claim 17 further comprising:
logic that backtracks through a tree comprising maintaining a running update containing a backup sequence and enables retracing toward a root node of a tree, the backup sequence including a node label, identification of a binary sequence of the node, and contents of a clipboard at the node.

27. The system according to claim 17 further comprising:
logic that determines output port information based on packet header information in a message packet using a plurality of data structures;

logic that modifies content of at least one structure of the plurality of data structures in response to arrival of route packets and data packets at the memory controller; and logic that builds and modifies data structures using a system of binary trees with a plurality of nodes, each associated with a data item configured as a binary sequence, the nodes being accessed indirectly by proceeding, node by node, through the tree.

28. The system according to claim 27 further comprising:
logic that modifies content of at least one structure of the plurality of data structures in response to arrival of route packets and data packets at the memory controller; and logic that builds and modifies data structures using a system of binary trees with a plurality of nodes, each associated with a data item configured as a binary sequence, the nodes being accessed indirectly by proceeding, node by node, through the tree.

29. The system according to claim 17 further comprising:
logic that adds an item to a tree structure upon receipt of a route packet with an operation code field designating an add operation, the logic further comprising:

logic, operative if a path exists through nodes to a designated target node, that steps through a binary sequence of nodes specified in the route packet, and that modifies a routing table element at the target node if the target node indicates an associated routing table element; and logic, operative if no path exists through nodes to the designated target, which adds new nodes in route to the designated target node.

30. The system according to claim 29 further comprising:
logic that steps through a binary sequence by stepping through multiple levels of a two-dimensional tree structure in a first dimension, level by level, and advancing left or right based on the binary selection in a second dimension with each step, whereby a node at an Nth level is represented by an N-long binary sequence; and logic that defines a pointer for a node that is associated with an output port.

31. The system according to claim 17 further comprising:
logic that adds an item to a tree structure upon receipt of a route packet with an operation code field designating an add operation, the logic further comprising:

logic, operative if a path exists through nodes to a designated target node, that steps through a binary sequence of nodes specified by an Internet Protocol (IP) address in the route packet, and that modifies a flag and pointer value of a routing table element at the target node if the target node indicates an associated routing table element; and logic, operative if no path exists through nodes to the designated target, which adds new nodes in route to the designated target node.

32. The system according to claim 17 further comprising:
logic that deletes one or more items from a tree structure upon receipt of a route packet with an operation code field designating a delete operation, the logic further comprising:

logic that steps through a binary sequence of nodes specified in the route packet to a level in the tree structure beyond which the one or more items are to be deleted, and that deletes pointers to the deleted items and modifies data associated to the deleted items.

33. The system according to claim 17 further comprising:
logic that holds the tree structure constant while maintaining a copy of the tree structure for active usage in assigning output ports for directing incoming messages;

logic that accumulates information for updating a replacement tree structure; and logic that deletes a currently-active tree structure and activates the replacement tree structure for assignment of output ports.

* * * * *